United States Patent
Takaoka et al.

(10) Patent No.: US 11,224,325 B2
(45) Date of Patent: Jan. 18, 2022

(54) SELF-DRIVING CLEANER, METHOD FOR CLEANING BY SELF-DRIVING CLEANER, AND RECORDING MEDIUM

(71) Applicant: Panasonic Intellectual Property Management Co., Ltd., Osaka (JP)

(72) Inventors: Yuki Takaoka, Tokyo (JP); Tomohito Oohashi, Osaka (JP); Kazuyoshi Moritani, Osaka (JP); Yuko Tsusaka, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 306 days.

(21) Appl. No.: 16/359,459

(22) Filed: Mar. 20, 2019

(65) Prior Publication Data
US 2019/0298139 A1    Oct. 3, 2019

(51) Int. Cl.
*G05D 1/02*    (2020.01)
*A47L 11/40*    (2006.01)

(52) U.S. Cl.
CPC ....... *A47L 11/4061* (2013.01); *A47L 11/4066* (2013.01); *G05D 1/0238* (2013.01);
(Continued)

(58) Field of Classification Search
CPC ............. A47L 11/4061; A47L 11/4066; A47L 2201/06; A47L 2201/04; A47L 9/2805;
(Continued)

(56) References Cited

U.S. PATENT DOCUMENTS

2007/0021944 A1* 1/2007 Levy .................... G05D 1/0297
                                                              702/188
2013/0006446 A1* 1/2013 Kim ........................ A47L 9/009
                                                              701/2
(Continued)

FOREIGN PATENT DOCUMENTS

JP    2006-277121    10/2006

OTHER PUBLICATIONS

Masahiro Tomono et al., "Environmental recognition of the mobile robot", The Institute of Systems, control and Information engineers, vol. 60, No. 12, Dec. 15, 2016, pp. 509-514(partial translation).

*Primary Examiner* — B M M Hannan
(74) *Attorney, Agent, or Firm* — Wenderoth, Lind & Ponack, L.L.P.

(57) ABSTRACT

A self-driving cleaner includes a drive unit, a control circuit, a camera, a first sensor for detecting an object, and a second sensor for detecting a stuck state, and a third sensor for detecting a person. The control circuit is configured to (a) identify information about a target object which caused the stuck state, (b) receive information indicating whether the target object is to be cleaned, and (c) control the drive unit and a suction unit, when receiving information indicating that the target object is to be cleaned, to perform a first mode where a space excluding the target object is cleaned first and, thereafter, the target object is climbed if the person is not detected and perform a second mode where the target object is climbed first and, thereafter, the space excluding the target object is cleaned if the person is detected.

5 Claims, 35 Drawing Sheets

(52) U.S. Cl.
CPC ........ *G05D 1/0274* (2013.01); *A47L 2201/04* (2013.01); *A47L 2201/06* (2013.01); *G05D 2201/0203* (2013.01); *G05D 2201/0215* (2013.01)

(58) Field of Classification Search
CPC .... A47L 9/2826; A47L 9/2852; A47L 9/2889; A47L 9/2857; G05D 1/0274; G05D 1/0238; G05D 2201/0215; G05D 2201/0203; G05D 1/0246; G05D 1/0227
USPC .......................................... 700/245, 255, 258
See application file for complete search history.

(56) References Cited

U.S. PATENT DOCUMENTS

| | | | |
|---|---|---|---|
| 2015/0148959 A1* | 5/2015 | Cho | G05D 1/0221 700/257 |
| 2015/0150429 A1* | 6/2015 | Yoo | A47L 11/4061 173/1 |
| 2015/0212500 A1* | 7/2015 | Akabane | G05D 1/0044 700/275 |
| 2016/0106279 A1* | 4/2016 | Gilbert, Jr. | A47L 9/009 15/340.1 |
| 2016/0278599 A1* | 9/2016 | Seo | A47L 11/4066 |
| 2017/0055797 A1* | 3/2017 | Kim | A47L 11/4027 |
| 2017/0231452 A1* | 8/2017 | Saito | A47L 9/28 15/319 |
| 2017/0273531 A1* | 9/2017 | Watanabe | A47L 5/22 |
| 2017/0332862 A1* | 11/2017 | Jun | A47L 11/4069 |
| 2017/0336798 A1* | 11/2017 | Nam | A47L 9/165 |
| 2018/0267489 A1* | 9/2018 | Tango | B08B 13/00 |
| 2019/0176330 A1* | 6/2019 | Noh | B25J 5/007 |
| 2019/0227566 A1* | 7/2019 | Marutani | A47L 9/2852 |
| 2019/0320867 A1* | 10/2019 | Noh | A47L 9/2852 |
| 2020/0345191 A1* | 11/2020 | Furuta | A47L 9/28 |

* cited by examiner

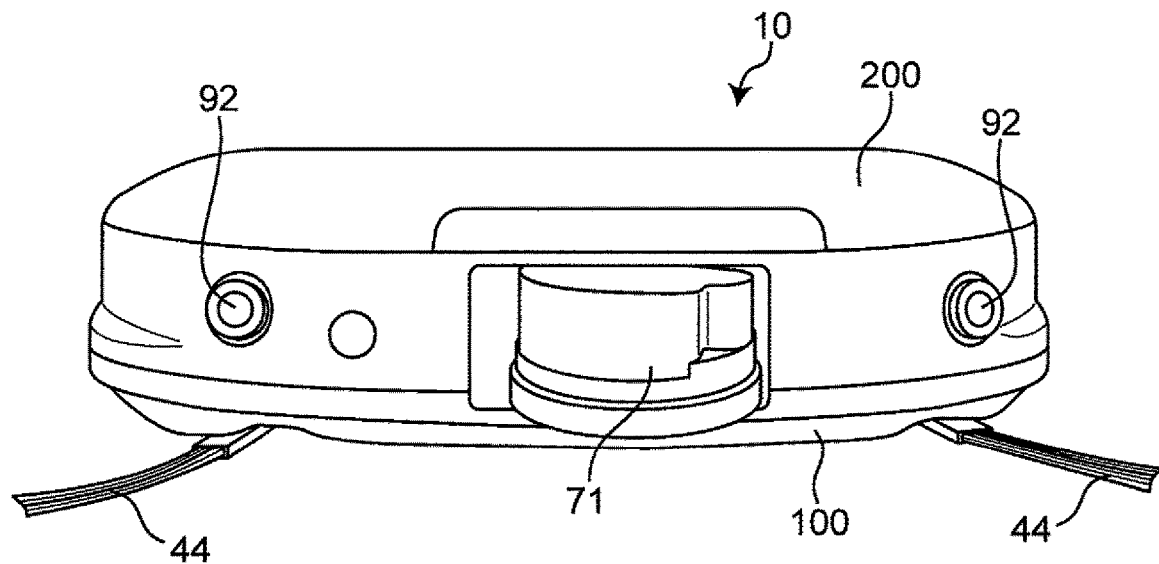
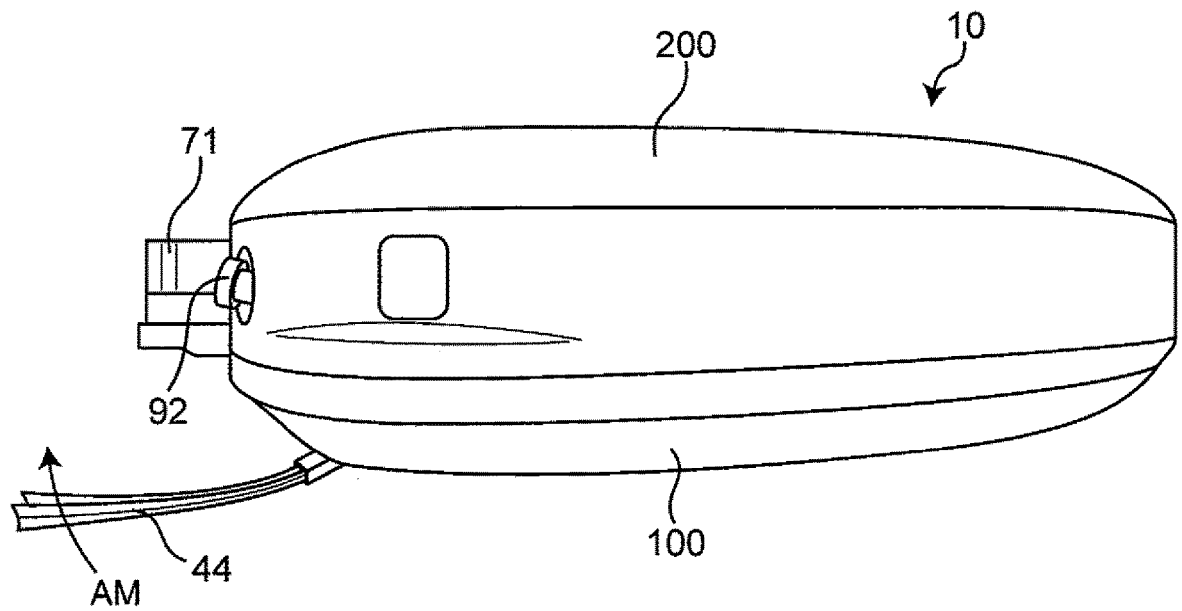

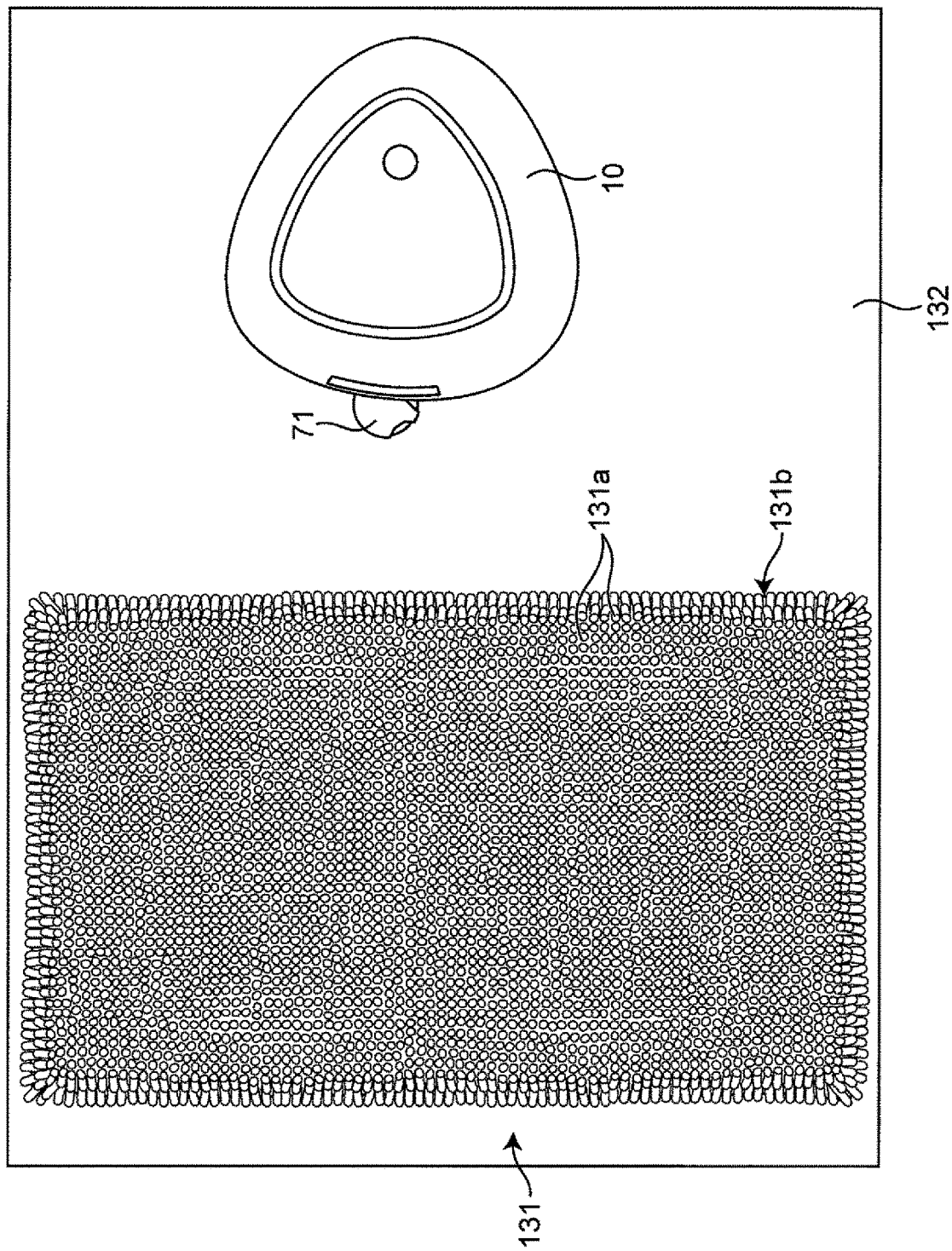

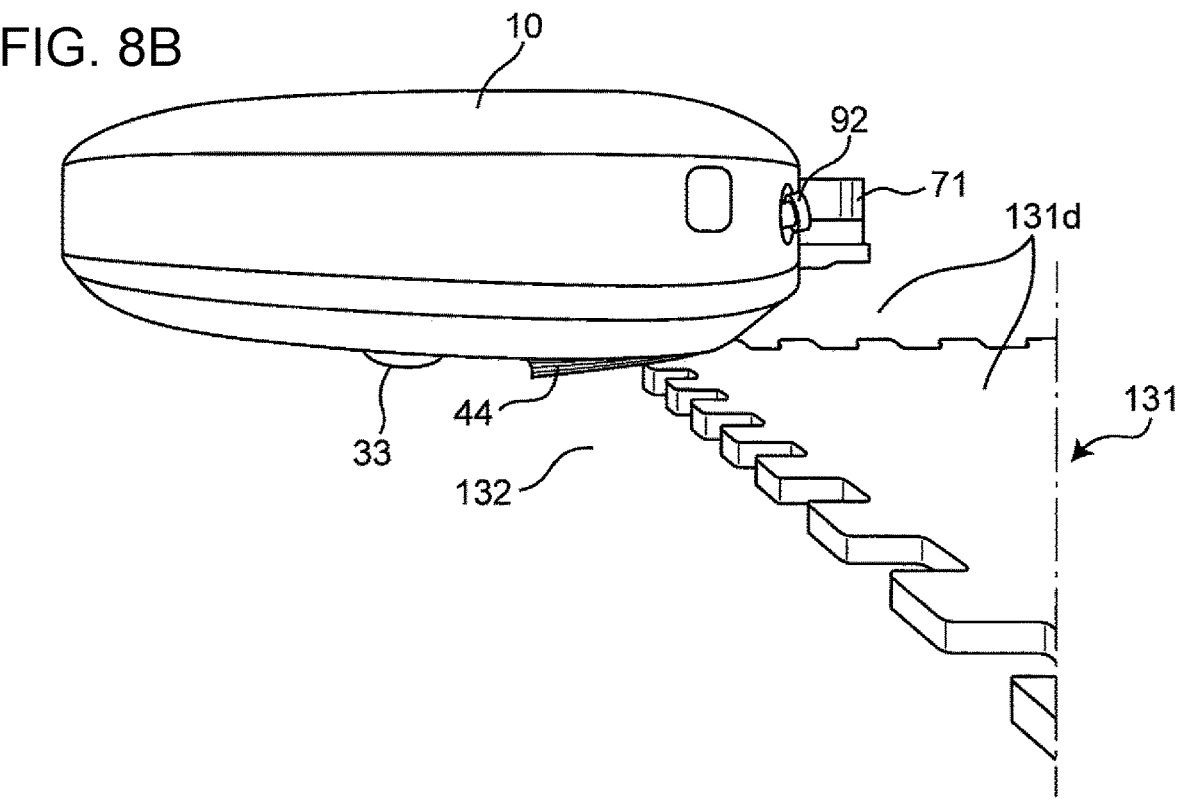
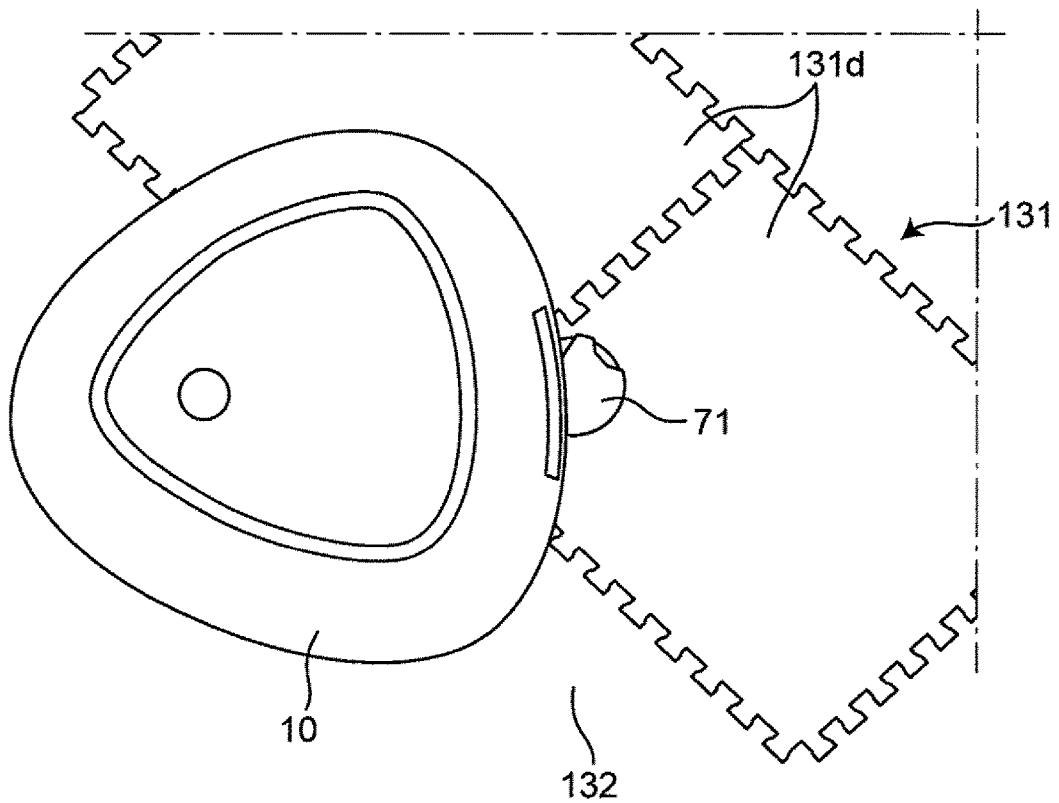

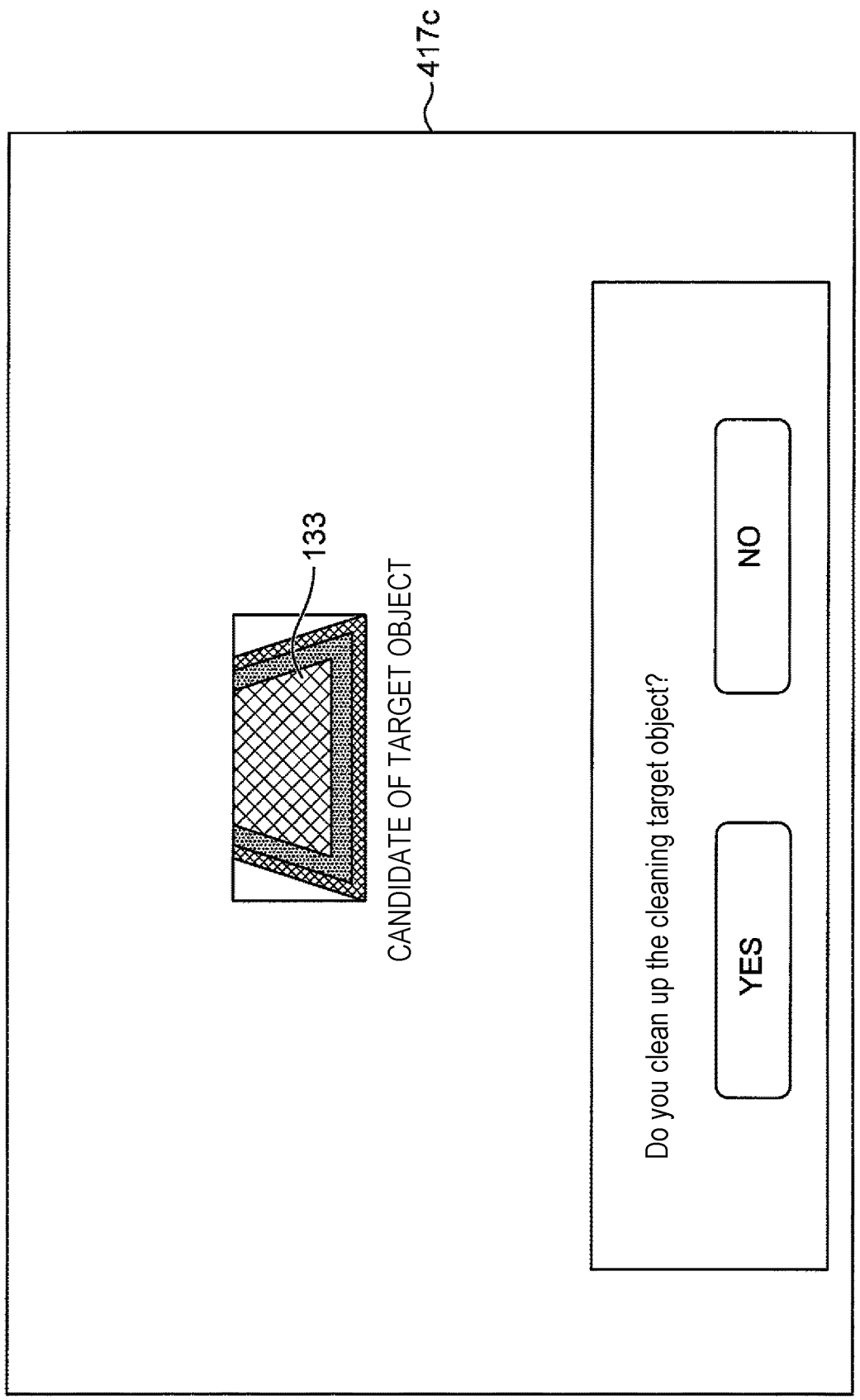

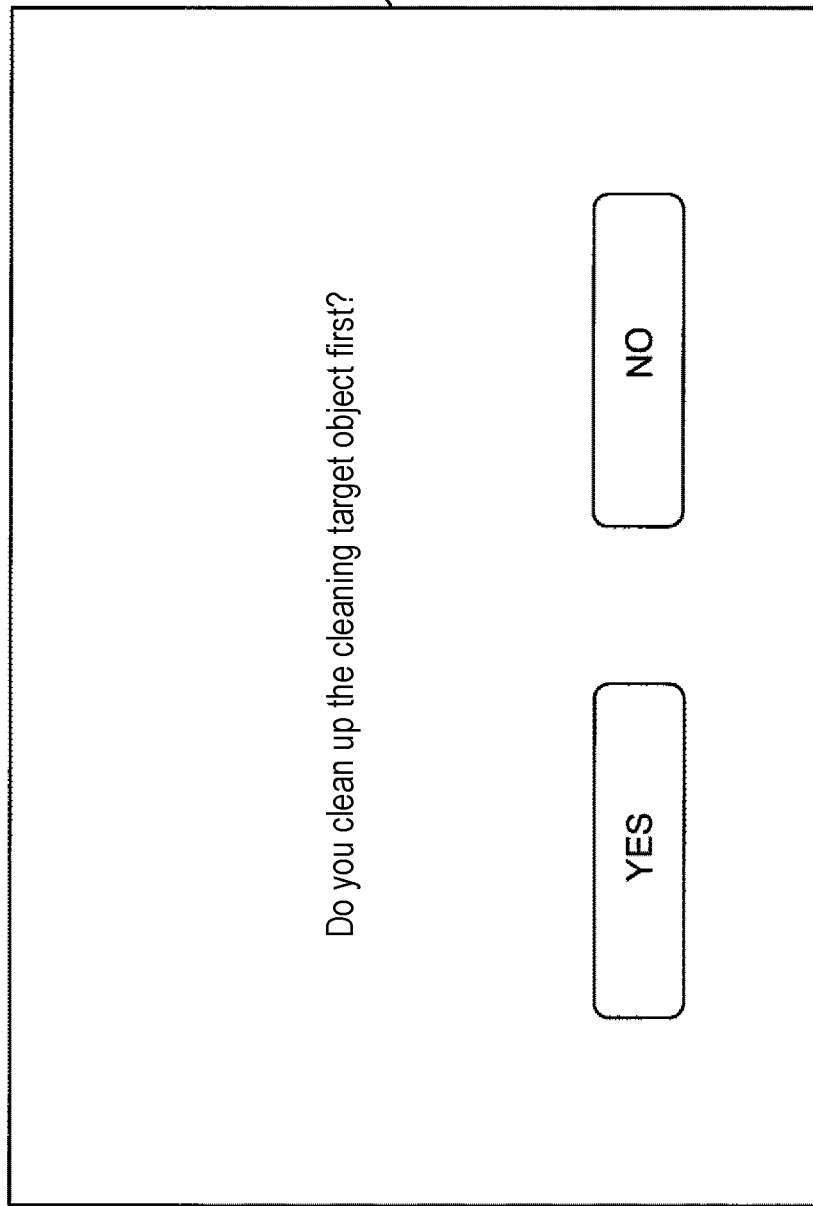

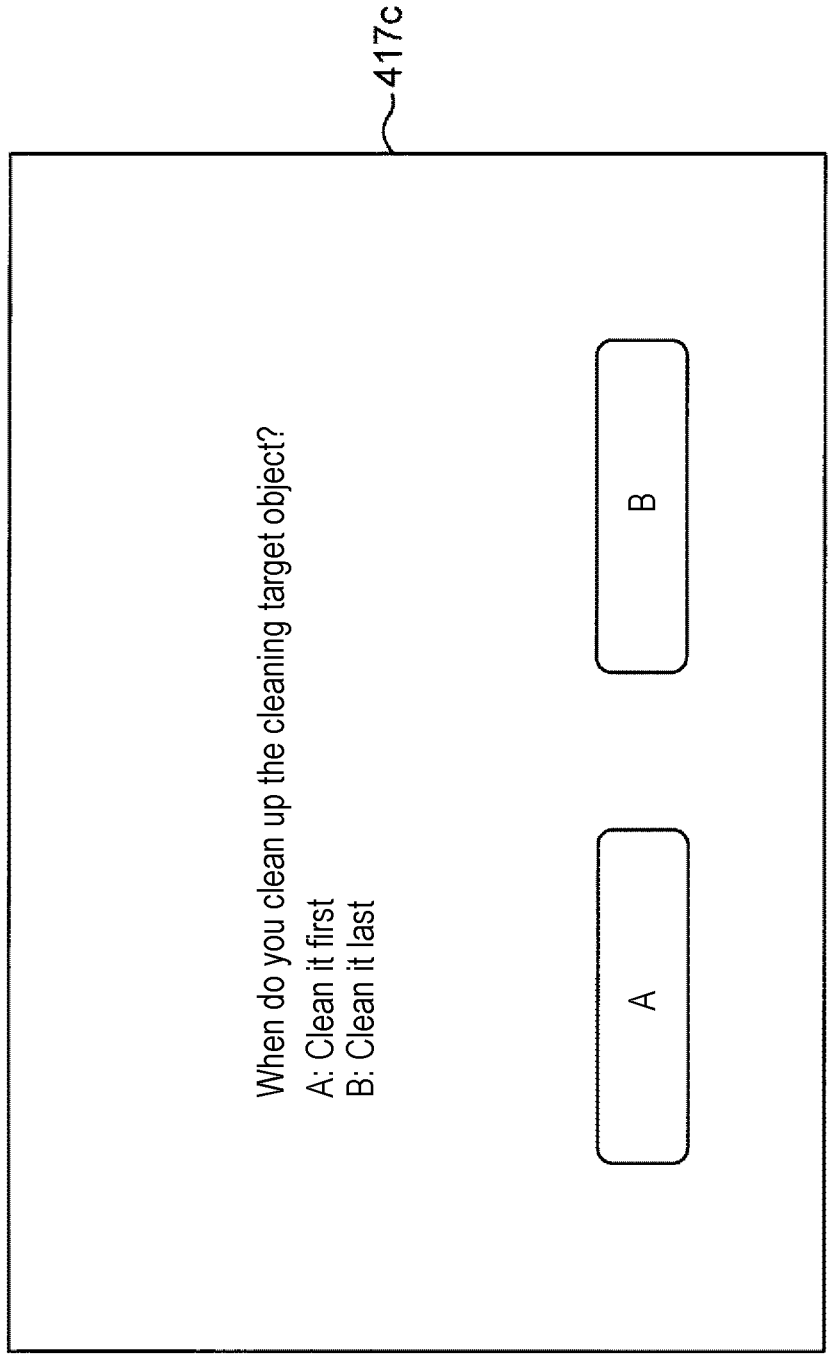

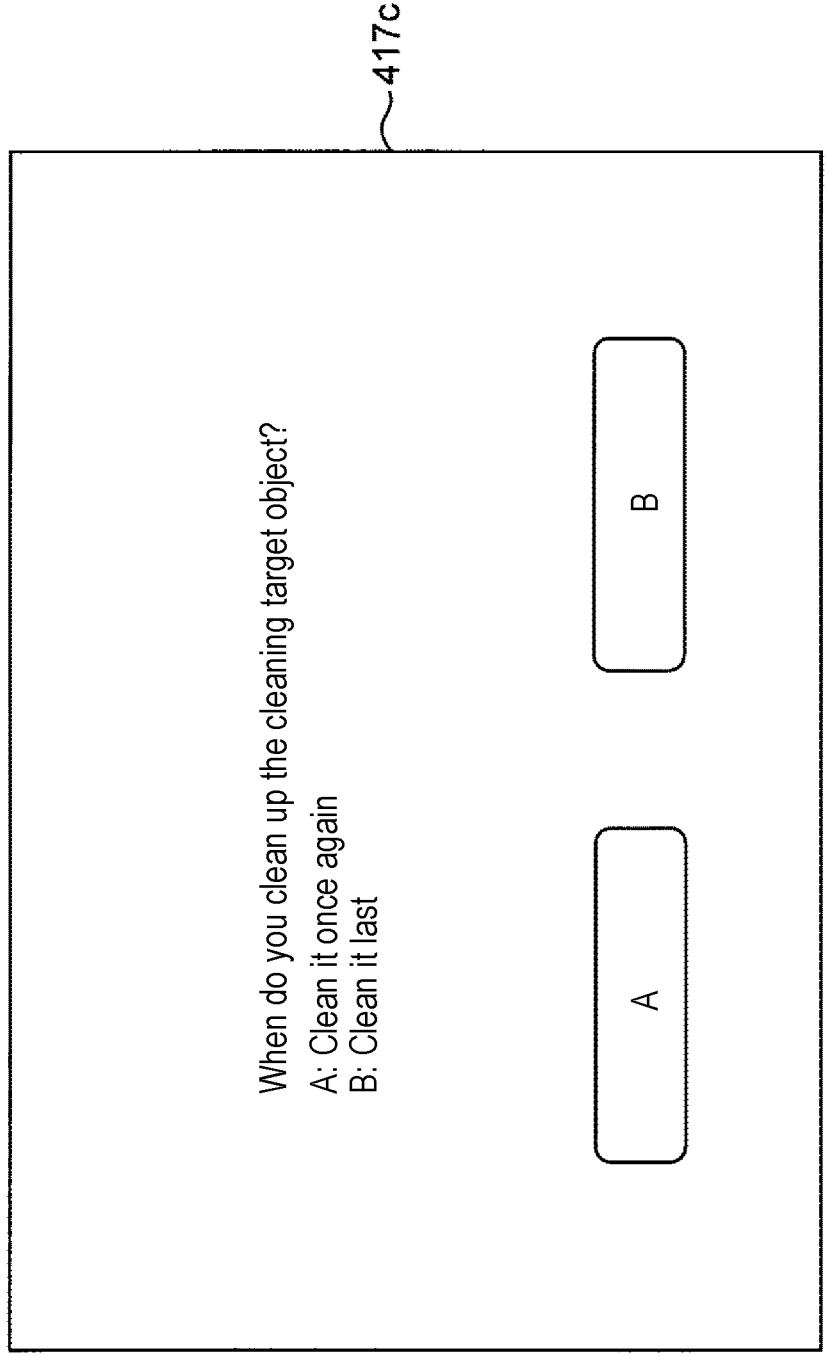

FIG. 16B

| MOVING SPEED | ENTRY ANGLE | ROTATION OF BRUSH |
|---|---|---|
| HIGH | 30 DEGREES | YES |
| HIGH | 60 DEGREES | YES |
| HIGH | 90 DEGREES | YES |
| MEDIUM | 30 DEGREES | YES |
| MEDIUM | 60 DEGREES | YES |
| MEDIUM | 90 DEGREES | YES |
| LOW | 30 DEGREES | YES |
| LOW | 60 DEGREES | YES |
| LOW | 90 DEGREES | YES |
| HIGH | 30 DEGREES | NO |
| HIGH | 60 DEGREES | NO |
| HIGH | 90 DEGREES | NO |
| MEDIUM | 30 DEGREES | NO |
| MEDIUM | 60 DEGREES | NO |
| MEDIUM | 90 DEGREES | NO |

. . .

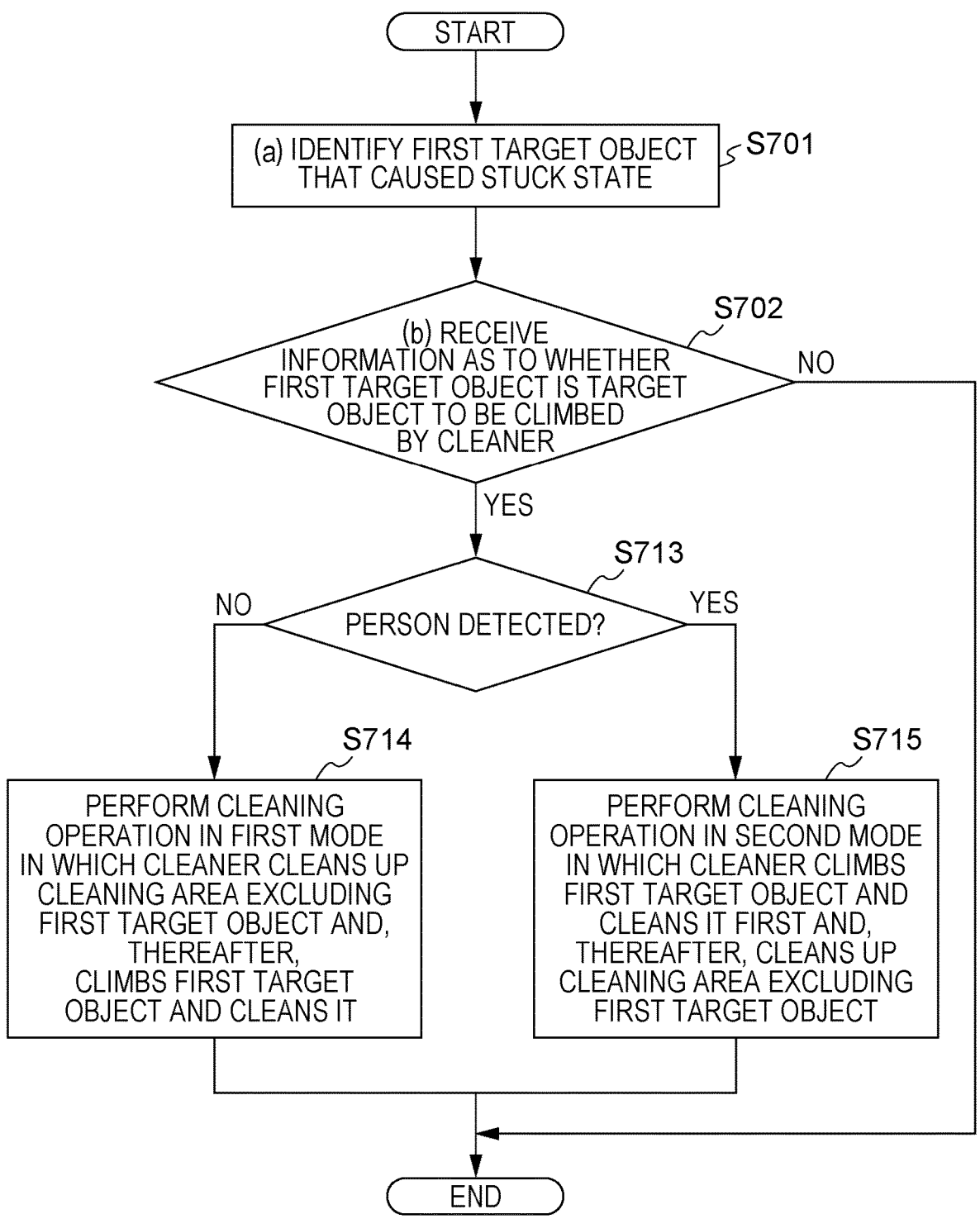

SELF-DRIVING CLEANER, METHOD FOR CLEANING BY SELF-DRIVING CLEANER, AND RECORDING MEDIUM

BACKGROUND

1. Technical Field

The present disclosure relates to a self-driving cleaner, a method for cleaning by a self-driving cleaner, and a recording medium.

2. Description of the Related Art

Japanese Unexamined Patent Application Publication No. 2006-277121 (hereinafter referred to as "patent literature (PTL) 1") describes a movement path generation device that generates a movement path in accordance with a movement area. More specifically, the movement path generation device generates a movement path by using information about an area across which a movable robot is unable to move.

SUMMARY

PTL 1 describes that a movement path is generated by using the information about an area across which a movable robot is unable to move.

However, PTL 1 does not mention or suggest that a movement path is generated in consideration of a course in which the movable robot moves to an area in which a movable robot is difficult to move.

One non-limiting and exemplary embodiment provides a self-driving cleaner, a method for cleaning by a self-driving cleaner, and a recording medium storing a program for a self-driving cleaner capable of automatically generating a movement mode in consideration of the order in which the movable robot cleans a target object that might make the robot unable to move and an object other than the target object and providing the movement mode to a user.

In one general aspect, the techniques disclosed here feature a self-driving cleaner that autonomously moves in a predetermined space. The self-driving cleaner includes a cleaner main body having a suction port in a bottom surface, a suction unit disposed in the cleaner main body, a drive unit that is disposed in the cleaner main body and that drives movement of the cleaner main body, a control circuit that is disposed in the cleaner main body and that controls the suction unit and the drive unit, a camera that is disposed in the cleaner main body and that captures an image including surrounding information in front of the cleaner main body, a first sensor that is disposed in the cleaner main body and that detects an object, a second sensor that detects a state in which the cleaner main body is unable to move, and a third sensor that detects a person. (a) Upon detecting by the second sensor the state in which the cleaner main body is unable to move, the control circuit identifies a first target object that caused the cleaner main body to enter the state in which the cleaner main body is unable to move, by using the image captured by the camera or information about the object detected by the first sensor. (b) After the identifying in (a), the control circuit receives information as to whether the first target object is a target object to be climbed. (c) When receiving in (b) the information indicating that the first target object is a target object to be climbed and when cleaning the predetermined space, the control circuit controls the drive unit to move the cleaner main body in a first mode in which the space excluding the first target object is cleaned first and thereafter the first target object is climbed if the third sensor does not detect the person and controls the drive unit to move the cleaner main body in a second mode in which the first target object is climbed first and thereafter the space excluding the first target object is cleaned if the third sensor detects the person.

According to the present disclosure, a movement mode can be automatically generated in consideration of the order in which a self-driving cleaner cleans a target object that may cause the self-driving cleaner to enter a state in which the cleaner is unable to move and an object other than the target object, and the movement mode is provided to the user.

It should be noted that general or specific embodiments may be implemented as a system, a method, an integrated circuit, a computer program, a computer-readable recording medium, or any selective combination thereof. Examples of a computer-readable recording medium include a nonvolatile recording medium, such as a compact disc-read only memory (CD-ROM).

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a front view of the cleaner illustrated in FIG. 1;

FIG. 4 is a side view of the cleaner illustrated in FIG. 1;

FIG. 7A is a plan view illustrating a state where the cleaner moves in a direction orthogonal to the edge of a target object, such as a carpet with a long pile, which is placed on a floor in a movable manner relative to the floor at a time t1;

FIG. 8B is a view illustrating a state where the cleaner is unable to move at the edge of the target object after the state illustrated in FIG. 8A when viewed diagonally upward from below a side of the cleaner;

FIG. 8C is a plan view illustrating a state where the cleaner moves in a direction diagonal to the edge of the target object illustrated in FIG. 8A in order to avoid a stuck state;

FIG. 14B illustrates a display screen of a display that prompts a user to select whether the cleaning target object is to be cleaned and receives the result of selection;

FIG. 14C illustrates a display screen of a display that prompts a user to select whether the cleaning target object is cleaned first when the cleaning target object is cleaned and receives the result of selection;

FIG. 14D illustrates a display screen of a display that prompts a user to select one of the options "A: the cleaning target object is cleaned first" and "B: the cleaning target object is cleaned last" and receives the result of selection;

FIG. 15E illustrates a display screen of a display that prompts a user to select one of the time points at which the cleaning target object that caused the stuck state is to be cleaned and receives the result of selection in the redetermination of a movement mode in step S603;

FIG. 16B illustrates operation control modes one of which is selected when the cleaning target object that caused the stuck state is cleaned again;

FIG. 16D is a flowchart illustrating step S700 including the minimum required steps of the method for cleaning by the cleaner;

DETAILED DESCRIPTION

Figure 1:
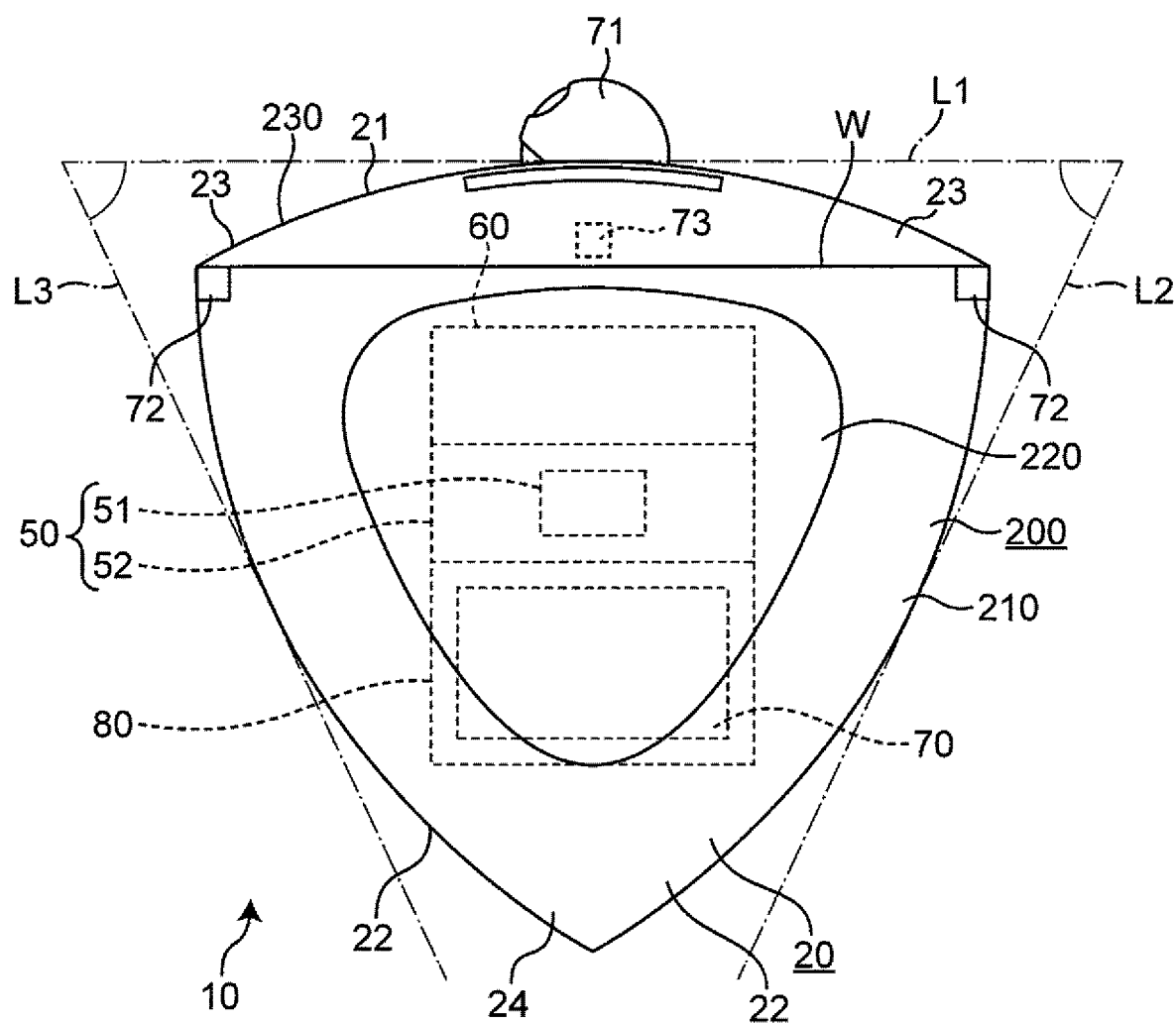
FIG. 1 is a plan view of a self-driving cleaner according to Embodiment 1 of the present disclosure.

Exemplary embodiments of the present disclosure are described below with reference to the accompanying drawings.

Various Aspects of the Present Disclosure

Before describing the exemplary embodiments of the present disclosure with reference to the accompanying drawings, a variety of aspects of the present disclosure are described below.

According to a first aspect of the present disclosure, a self-driving cleaner that autonomously moves in a predetermined space is provided. The self-driving cleaner includes a cleaner main body having a suction port in a bottom surface, a suction unit disposed in the cleaner main body, a drive unit that is disposed in the cleaner main body and that drives movement of the cleaner main body, a control circuit that is disposed in the cleaner main body and that controls the suction unit and the drive unit, a camera that is disposed in the cleaner main body and that captures an image including surrounding information in front of the cleaner main body, a first sensor that is disposed in the cleaner main body and that detects an object, a second sensor that detects a state in which the cleaner main body is unable to move, and a third sensor that detects a person.

(a) Upon detecting by the second sensor the state in which the cleaner main body is unable to move, the control circuit identifies a first target object that caused the cleaner main body to enter the state in which the cleaner main body is unable to move, by using the image captured by the camera or information about the object detected by the first sensor.

(b) After the identifying in (a), the control circuit receives information as to whether the first target object is a target object to be climbed.

(c) When receiving in (b) the information indicating that the first target object is a target object to be climbed and when cleaning the predetermined space, the control circuit controls the drive unit to move the cleaner main body in a first mode in which the space excluding the first target object is cleaned first and thereafter the first target object is climbed if the third sensor does not detect the person and controls the drive unit to move the cleaner main body in a second mode in which the first target object is climbed first and thereafter the space excluding the first target object is cleaned if the third sensor detects the person.

According to the above aspect, the self-driving cleaner is capable of automatically generating a movement mode in consideration of the order in which a target object that may cause a state in which the cleaner main body is unable to move and the other area are cleaned and providing the movement mode to a user.

According to a second aspect of the present disclosure, the self-driving cleaner according to the first aspect further includes a display.

(d) The control circuit causes the display to display between (a) and (b) a first display screen in which whether or not the first target object is a target object to be cleaned is selected.

While the first display screen is being displayed, the control circuit receives in (b) information as to whether the first target object is a target object to be cleaned.

According to a third aspect of the present disclosure, a method for cleaning by a self-driving cleaner that autonomously moves in a predetermined space and cleans the space is provided. The self-driving cleaner includes a cleaner main body having a suction port in a bottom surface, a suction unit disposed in the cleaner main body, a drive unit that is disposed in the cleaner main body and that drives movement of the cleaner main body, a control circuit that is disposed in the cleaner main body and that controls the suction unit and the drive unit, a camera that is disposed in the cleaner main body and that captures an image including surrounding information in front of the cleaner main body, a first sensor that is disposed in the cleaner main body and that detects an object, a second sensor that detects a state in which the cleaner main body is unable to move, and a third sensor that detects a person.
The method includes:

(a) upon detecting by the second sensor the state in which the cleaner main body is unable to move, identifying by the control circuit a first target object that caused the cleaner main body to enter the state in which the cleaner main body is unable to move, by using the image captured by the camera or information about the object detected by the first sensor, (b) after the identifying in (a), receiving by the control circuit information as to whether the first target object is a target object to be climbed, and (c) when receiving in (b) by the control circuit the information indicating that the first target object is a target object to be climbed and when cleaning the predetermined space, controlling the drive unit to move the cleaner main body in a first mode in which the predetermined space excluding the first target object is cleaned first and thereafter the first target object is climbed if the third sensor does not detect the person, and controlling the drive unit to move the cleaner main body in a second mode in which the first target object is climbed first and thereafter the predetermined space excluding the first target object is cleaned if the third sensor detects the person.

According to a fourth aspect of the present disclosure, in the method according to the third aspect, the self-driving cleaner further includes a display, and the method further includes (d) causing by the control circuit the display to display between (a) and (b) a first display screen in which whether or not the first target object is a target object to be cleaned is selected, and receiving in (b) by the control circuit information as to whether the first target object is a target object to be cleaned when the first display screen is being displayed.

According to a fifth aspect of the present disclosure, a non-transitory computer-readable recording medium is provided that stores a program causing a computer to perform a method for cleaning by a self-driving cleaner that autonomously moves in a predetermined space and cleans the space. The self-driving cleaner includes a cleaner main body having a suction port in a bottom surface, a suction unit disposed in the cleaner main body, a drive unit that is disposed in the cleaner main body and that drives movement of the cleaner main body, a control circuit that is disposed in the cleaner main body and that controls the suction unit and the drive unit, a camera that is disposed in the cleaner main body and that captures an image including surrounding information in front of the cleaner main body, a first sensor that is disposed in the cleaner main body and that detects an object, a second sensor that detects a state in which the cleaner main body is unable to move, and a third sensor that detects a person. The method includes (a) upon detecting by the second sensor the state in which the cleaner main body is unable to move, identifying by the control circuit a first target object that caused the cleaner main body to enter the state in which the cleaner main body is unable to move, by using the image captured by the camera or information about the object detected by the first sensor, (b) after the identifying in (a), receiving by the control circuit information as to whether the first target object is a target object to be climbed, and (c) when receiving in (b) by the control circuit the information indicating that the first target object is a target object to be climbed and when cleaning the predetermined space, controlling the drive unit to move the cleaner main body in a first mode in which the predetermined space excluding the first target object is cleaned first and thereafter the first target object is climbed if the third sensor does not detect the person and controlling the drive unit to move the cleaner main body in a second mode in which the first target object is climbed first and thereafter the predetermined space excluding the first target object is cleaned if the third sensor detects the person.

According to the above aspect, a movement mode can be automatically generated in consideration of the order in which a target object that may cause a state in which the cleaner main body is unable to move and the other area are cleaned, and the movement mode can be provided to a user.
Underlying Knowledge Forming Basis of the Present Disclosure The movement path generation device described in PTL 1 acquires information about an area in which the mobile robot cannot move and generates a movement path not including the area in which the mobile robot cannot move. The area in which the mobile robot cannot move is determined on the basis of information as to whether the area is a step that the mobile robot can climb and move over. In addition, it is determine whether the mobile robot can climb and move over the step on the basis of a predetermined step candidate attribute or a question to the user (refer to paragraphs 0040 and 0088 and FIG. 5 of PTL 1).

The present inventors have conceived the idea that if the mobile robot is a self-driving cleaner, a movement path needs to be generated depending on whether the area is an area the user wants to clean, instead of whether the area is an area in which the mobile robot is movable.

If the area the user wants to clean is an area in which a cleaner is difficult to move, the cleaner may fail to move into the area. As used herein, "failing of the cleaner to move" means that the cleaner is unable to move (gets stuck). More specifically, as a result of an attempt of the cleaner to move into a difficult-to-move area, the cleaner is blocked by a target object or the like located in the area and is unable to move. As used herein, the term "target object" refers to an object that is placed in the area the user wants to clean and that has the top surface the user also wants to clean. Typically, the cleaner climbs up the target object and cleans the top surface of the object. Thereafter, the cleaner climbs down from the top surface to a floor.

The state in which the cleaner gets stuck is described below with reference to FIGS. 7A to 7C and FIGS. 8A to 8B. As examples of the stuck state, the following conditions are discussed first.

Figure 7B:
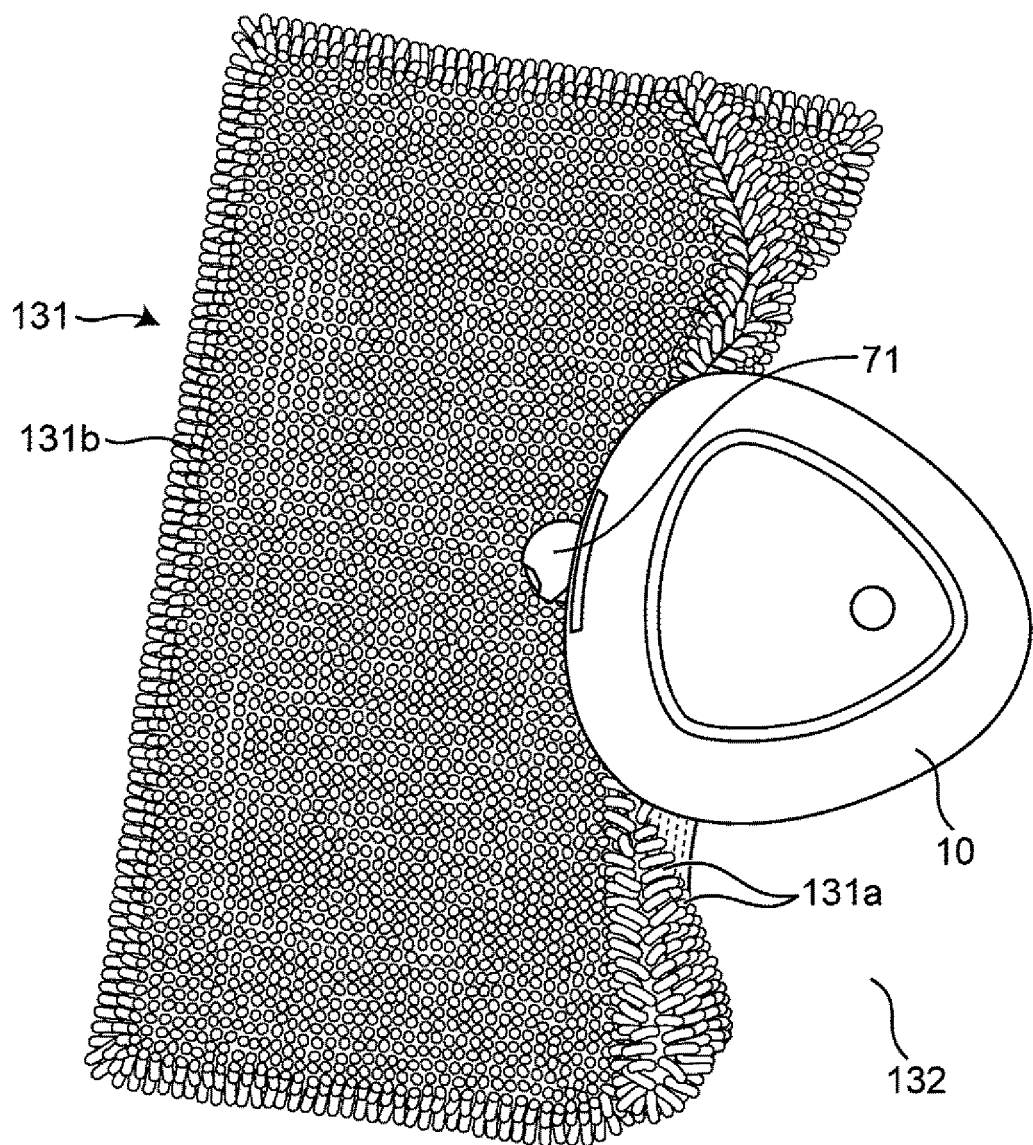
FIG. 7B is a plan view illustrating a state where the cleaner is unable to move at the edge of the target object at a time t2 after the state illustrated in FIG. 7A.
Figure 7C:
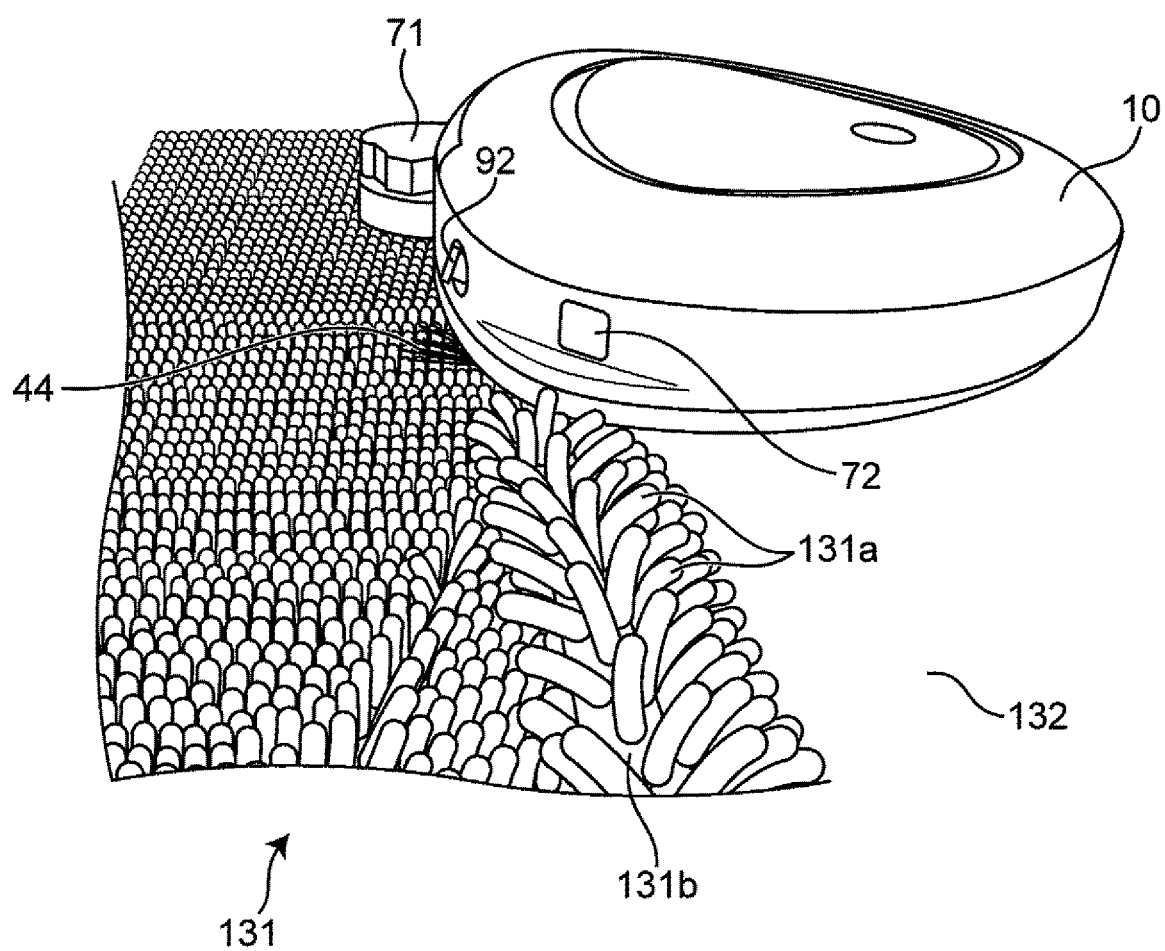
FIG. 7C is a side view, as viewed from diagonally above, of the cleaner illustrated in FIG. 7B in a state where the cleaner is unable to move.

(1) FIGS. 7A and 7B are views of a cleaner 10, viewed from above. As an example of a target object 131, a carpet 131*b* with long pile 131*a* is illustrated in FIG. 7A. The carpet 131*b* is placed on a floor surface 132 so as to be movable relative to the floor surface 132. As illustrated in FIG. 7B, when the cleaner 10 moves on the floor surface 132 and is brought into contact with the target object 131, the target object 131 may move relative to the floor surface 132 together with the cleaner 10. FIG. 7C is a side view of the cleaner 10 and the target object 131 illustrated in FIG. 7B. As illustrated in FIG. 7C, if the target object 131 is caught in the cleaner 10 under the bottom surface of the cleaner 10, the height of the target object 131 is greater than or equal to a predetermined height (for example, 2 cm or greater). At this time, if the cleaner 10 moves toward the target object 131, the cleaner 10 is pushed up from the floor surface 132 by the target object 131. As a result, wheels 33 of the cleaner 10 cannot apply the driving force to the floor surface 132, or the wheels 33 of the cleaner 10 are raised up in the air from the floor surface 132. Thus, the cleaner 10 is unable to move. Such a state is defined as a "stuck state".

Figure 8A:
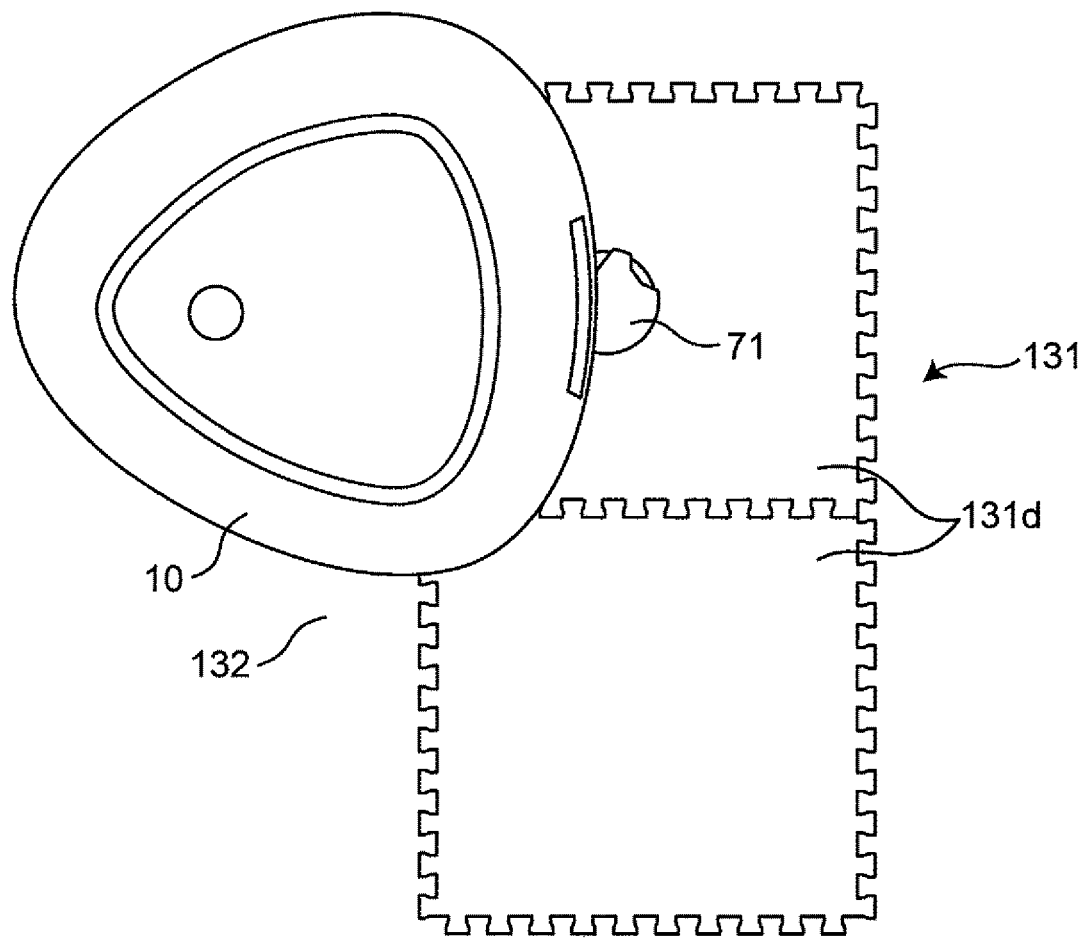
FIG. 8A is a plan view illustrating a state where the cleaner moves in a direction orthogonal to the edge of a target object, such as a foam joint mat, which is placed on a floor in a movable manner relative to the floor.

(2) FIGS. 8A and 8B are views of the cleaner 10, viewed from above. As another example of the target object 131, a foam joint mat 131*d* is illustrated in FIG. 8A. The joint mat 131*d* is placed on the floor surface 132 so as to be movable relative to the floor surface 132. The target object 131 is soft. Accordingly, as illustrated in FIG. 8B, when the wheel 33 of the cleaner 10 reaches the edge portion of the target object 131, the edge portion elastically deforms and, thus, the wheel 33 slips. As a result, the cleaner 10 is unable to move. Such a state is defined as the "stuck state".

(3) As another example of the target object 131, like the example of the target object 131 illustrated in FIG. 7A, the target object 131 is the carpet 131*b* with the long pile 131*a*. In this case, a side brush 44 of the cleaner 10 for scraping out dust and dirt from, for example, a corner of a room is entangled with the pile 131*a* of the target object 131. Thus, the cleaner 10 is unable to move. Such a state is also defined as the "stuck state".

If at least one of the above-described conditions (1) to (3) is satisfied, the cleaner 10 enters the "stuck state".

As described above, an area where the cleaner is difficult to move is also referred to as a "difficult-to-move area".

When the cleaner 10 attempts to move into the difficult-to-move area, the user selects one of several moving techniques. The cleaner 10 repeatedly receives the result of selection by the user in the form of an instruction (hereinafter referred to as "selection instruction") and accepts to move into the area by using the selected moving technique. As a result, the cleaner 10 can lean the moving technique by which the cleaner 10 successfully moved into the difficult-to-move area.

When attempting to move into the difficult-to-move area, the cleaner 10 may fail to move and enters the stuck state. In this case, for example, the user or another robot or the like can lift the cleaner 10 from the difficult-to-move area to clear the stuck state of the cleaner 10. Thereafter, the cleaner 10 can attempt to move into the difficult-to-move area again by using another moving technique.

However, it is not realistic from the viewpoint of convenience that the user or a robot stays in the vicinity of the cleaner 10 at all times in order to clear the stuck state of the cleaner 10.

However, the present inventors found that in the case where the cleaner moves and performs a cleaning operation with a person present in the vicinity of the cleaner body, even when the cleaner main body enters a stuck state as a result of cleaning a target object that may cause the cleaning main body to enter the state in which the cleaner main body is unable to move, the person present in the vicinity of the cleaner main body can clear the stuck state.

That is, the present inventors found that by detecting whether a person is present in the vicinity of the cleaner main body, a movement mode can be automatically generated that takes into account the order in which a target object that may cause a stuck state and the other target object are cleaned. More specifically, the following first mode and second mode are provided. That is, in the first mode, a target object that may cause the stuck state is cleaned last. In the second mode, a target object that may cause the stuck state is cleaned first. If a person is not present in the vicinity of the cleaner main body, the first mode is employed. However, if a person is present in the vicinity of the cleaner main body, the second mode is employed.

That is, the present inventors conceived the idea of, by employing the above-described configuration, a cleaner capable of automatically setting the movement mode in accordance with the situation of the user.

Embodiment 1

An exemplary embodiment of the present disclosure is described below with reference to the accompanying drawings.

Overall Configuration

Figure 2:
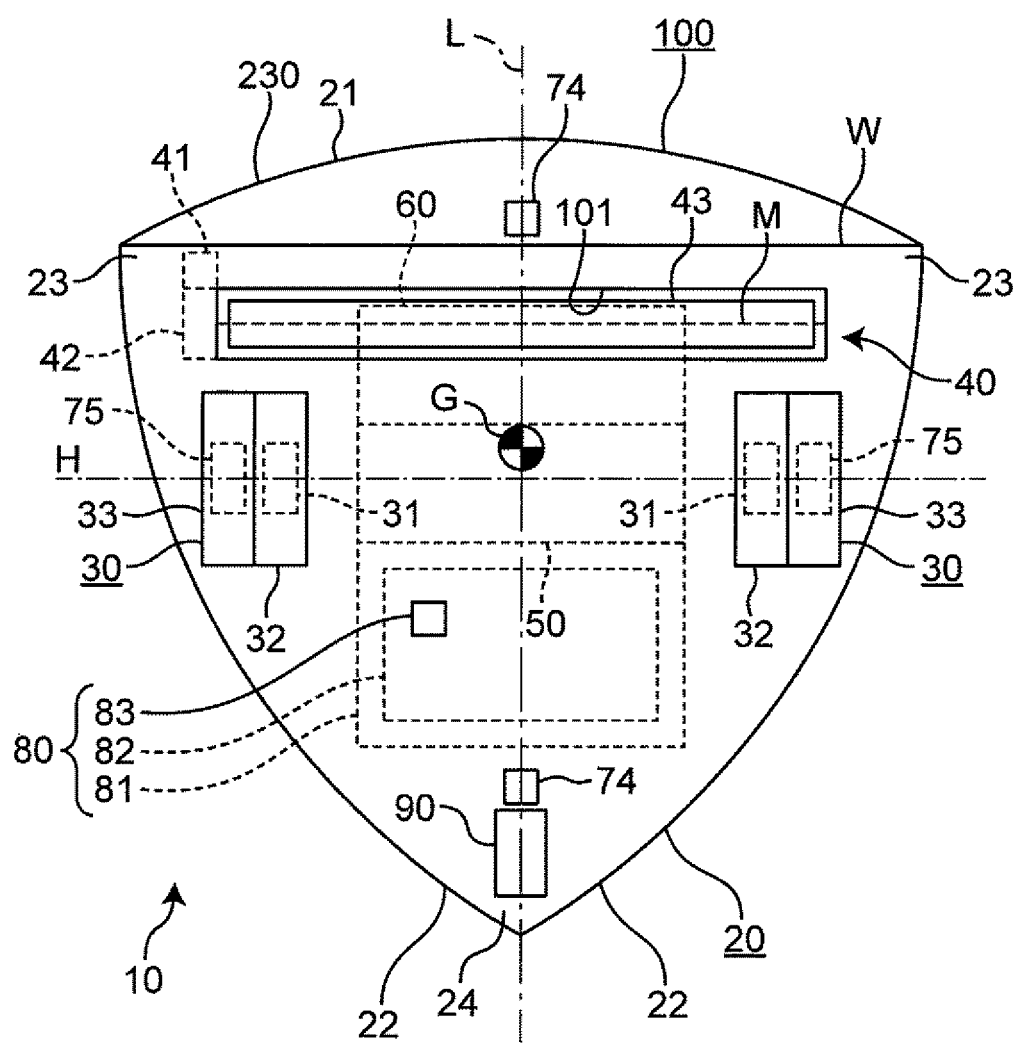
FIG. 2 is a bottom view of the cleaner illustrated in FIG. 1.

FIG. 1 is a plan view of the cleaner 10 according to Embodiment 1. FIG. 2 is a bottom view of the cleaner 10. FIG. 3 is a front view of the cleaner 10. FIG. 4 is a side view of the cleaner 10.

The cleaner 10 illustrated in FIG. 1 autonomously moves on a surface to be cleaned of an area that a user wants to clean in a predetermined space (hereinafter, the area is also referred to as a "cleaning area" or simply a "target area").

That is, the cleaner 10 is a self-moving robot vacuum cleaner which sucks dust and dirt present on the cleaning surface. An example of the area to be cleaned is a room, and an example of the cleaning surface is a floor surface or a wall surface of the room.

Figure 5:
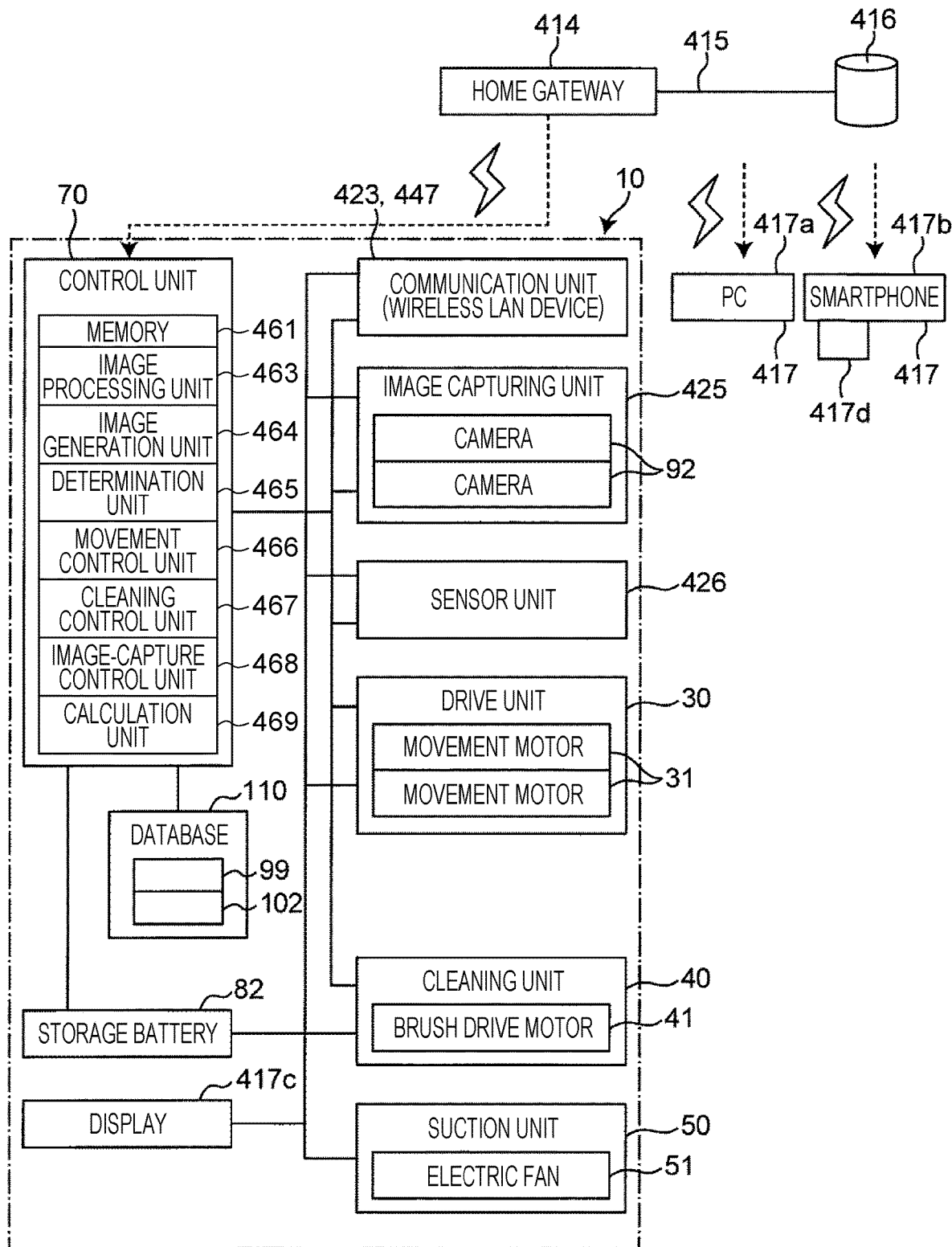
FIG. 5 is a functional block diagram of the cleaner illustrated in FIG. 1.
Figure 6:
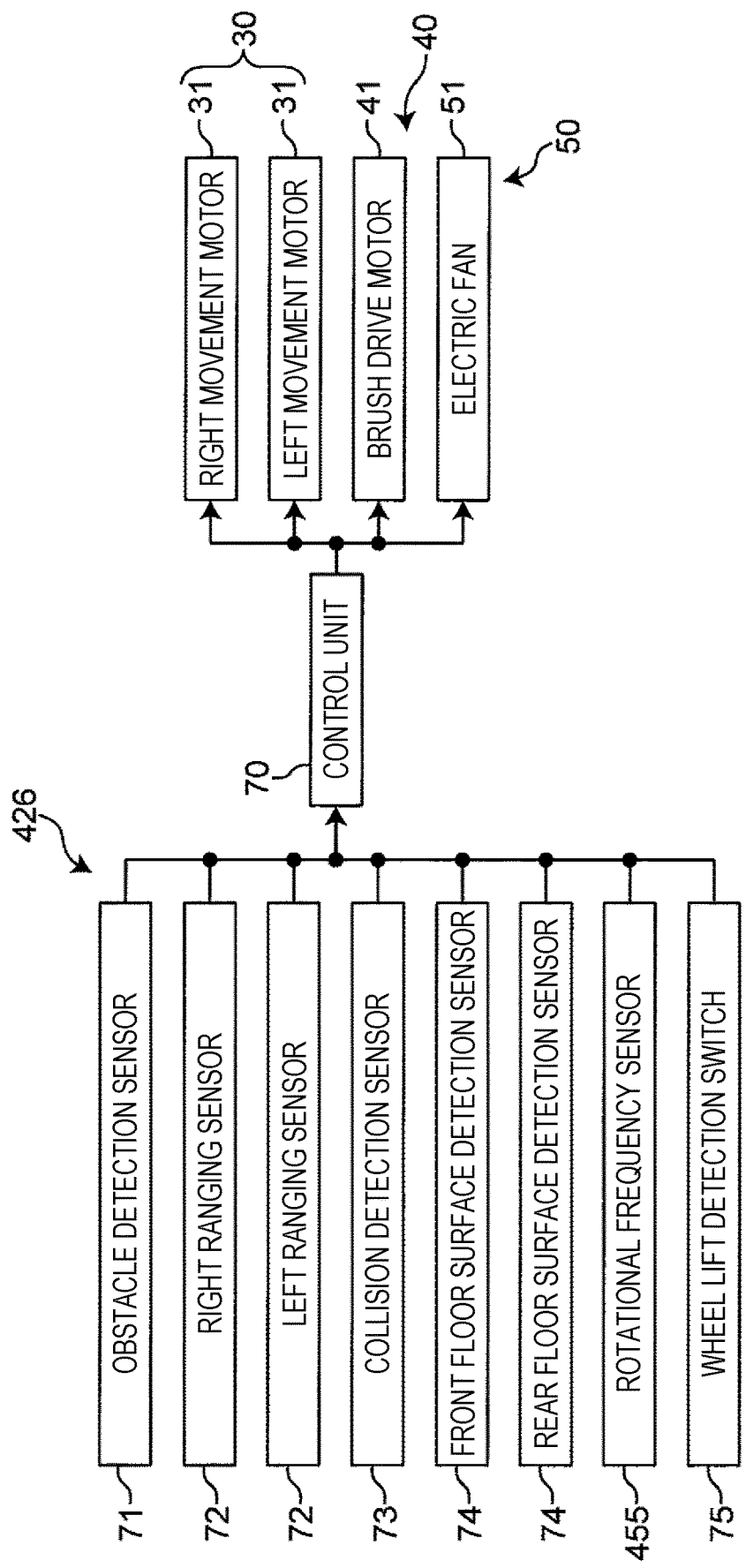
FIG. 6 is a block diagram of a sensor unit and related units of the cleaner illustrated in FIG. 1.

FIG. 5 is a functional block diagram of the cleaner 10. FIG. 6 is a functional block diagram illustrating some of the constituent elements of the cleaner 10 illustrated in FIG. 5 in more detail. The cleaner 10 illustrated in FIGS. 1 to 5 includes at least a cleaner main body 20, a drive unit 30, and a suction unit 50. Furthermore, the cleaner 10 includes a cleaning unit 40. The cleaner main body 20 has, mounted therein, the variety of constituent elements, that is, the drive unit 30, the cleaning unit 40, and the suction unit 50. The drive unit 30 drives the movement of the cleaner main body 20. The cleaning unit 40 collects dust and dirt present in a cleaning area CA (refer to FIG. 9) in a predetermined space. The suction unit 50 sucks the collected dust and dirt into the inside of the cleaner main body 20 through a suction port.

The cleaner 10 further includes a dust box 60 and a control unit 70 in the cleaner main body 20. The dust box 60 collects the dust and dirt sucked by the suction unit 50. The control unit 70 controls at least the drive unit 30 and the suction unit 50. Furthermore, the control unit 70 can control the cleaning unit 40.

The cleaner 10 further includes the wheels 33 and a power supply unit 80. The wheels 33 rotate according to the rotational drive of the drive unit 30. The power supply unit 80 supplies power to, for example, the drive unit 30, the cleaning unit 40, the suction unit 50.

In FIGS. 1 and 2, the upward direction corresponds to the forward direction of the cleaner main body 20, and the downward direction corresponds to the backward direction of the cleaner main body 20. The width direction of the cleaner 10 is defined on the basis of the forward direction of the cleaner 10 (for example, the upward direction in FIG. 1). For example, according to Embodiment 1, a direction substantially perpendicular to the forward direction of the cleaner 10 (for example, the right-left direction in FIGS. 1 and 2) is defined as the width direction of the cleaner 10.

According to Embodiment 1, the drive unit 30 is provided in a pair. In the plan view of the cleaner main body 20, one drive unit 30 is disposed on the right side and the other is disposed on the left side of the middle point of the cleaner main body 20 in the width direction. Hereinafter, the left drive unit 30 is also referred to as a "first drive unit", and the right drive unit 30 is also referred to as a "second drive unit". Note that the number of the drive units 30 is not limited to two. For example, the number of the drive units 30 may be one or three or more. The drive unit 30 is described in more detail later. The forward direction is also referred to as a "forward movement direction", and the backward direction is also referred to as a "backward movement direction".

Cleaner Main Body

The cleaner main body 20 includes a lower housing 100 (refer to FIG. 2) that forms the outer shape of the lower portion of the cleaner main body 20 and an upper housing 200 (refer to FIG. 1) that forms the outer shape of the upper portion of the cleaner main body 20). By connecting the lower housing 100 and the upper housing 200 with each other, the cleaner main body 20 is formed. As illustrated in FIG. 1, the upper housing 200 includes a cover 210 that forms almost entire portion of the upper housing 200, a lid 220 attached to the cover 210 in an openable and closable fashion, and a bumper 230 displaceable with respect to the cover 210.

The planar shape of the cleaner main body 20 may be a Reuleaux triangle, a Reuleaux polygon having shapes of vertexes substantially the same as those of a Reuleaux triangle, or one of a Reuleaux triangle and a Reuleaux polygon having vertexes of R shapes. Such a shape enables the cleaner main body 20 to have properties that are the same as or similar to the geometrical properties of a Reuleaux triangle. That is, since a Reuleaux triangle is a curve of constant width, the Reuleaux triangle can be inscribed in a rectangle having a predetermined width (the length of a side of an equilateral triangle inscribed in the Reuleaux triangle) and can roll in the rectangle extending in all directions. As a result, the cleaner main body 20 can draw a trajectory of a quadrangle (that is, a substantially square). According to Embodiment 1, as illustrated in FIG. 1, the cleaner main body 20 has a planar shape that is substantially the same as a Reuleaux triangle. Other examples of the planar shape of the cleaner main body 20 include a circle and an ellipse.

Furthermore, the cleaner main body 20 has outer peripheral surfaces and vertex portions. According to Embodiment 1, the outer peripheral surfaces include a front face 21 located at a front end of the cleaner main body 20 in the forward movement direction of the cleaner 10 (for example, the upward direction in FIG. 1), a right side face 22 extending from the front face 21 to the right rear, and a left side face 22 extending from the front face 21 to the left rear in plan view of the cleaner main body 20. In addition, according to Embodiment 1, the front face 21 is a curved surface curved so as to protrude outward. The bumper 230 may have a curved surface curved so as to protrude outward. Each of the side faces 22 is a curved surface having at least one portion that is curved so as to protrude outward. According to Embodiment 1, a curved surface curved so as to protrude outward is formed as each of the side face of the bumper 230 and the side face of the cover 210.

According to Embodiment 1, the vertex portions include a right front vertex portion 23 defined by the front face 21 and the right side face 22 and a left front vertex portion 23 defined by the front face 21 and the left side face 22. The vertex portions may further include a rear vertex portion 24 defined by the right side face 22 and the left side face 22. As illustrated in FIG. 1, an angle formed by a tangent L1 of the front face 21 and each of tangents L2 and L3 of the two side faces 22 is acute.

The maximum width of the cleaner main body 20 is defined by the distance between the vertexes of the vertex portions of the cleaner main body 20. According to Embodiment 1, the maximum width of the cleaner main body 20 is defined by the vertex of the right front vertex portion 23 and the vertex of the left front vertex portion 23. According to the example illustrated in FIG. 1 and some other figures, the maximum width of the cleaner main body 20 is the distance between the vertex of the right front vertex portion 23 and the vertex of the left front vertex portion 23, that is, the distance between two of the three vertices of the Reuleaux triangle.

In the cleaner main body 20, a line W connecting the vertex of the right front vertex portion 23 and the vertex of the left front vertex portion 23 (hereinafter referred to as a "maximum width line W of the cleaner main body 20") and the vicinity of the maximum width line W are referred to as a "portion having the maximum width of the cleaner main body 20" or a "maximum width portion of the cleaner main body 20". In addition, the phrase "vicinity of the maximum width line W of the cleaner main body 20" and a "portion in the vicinity of the maximum width line W of the cleaner main body 20" refer to a portion in the vicinity of the maximum width line W of the cleaner main body 20, that is, a portion between the maximum width line W of the cleaner main body 20 and the center of gravity G of the cleaner 10 (refer to FIG. 2) and a portion between the maximum width line W and the front face 21 of the cleaner main body 20 and, more specifically, a portion between the maximum width line W of the cleaner main body 20 and the front end of the drive unit 30 in the forward movement direction of the cleaner main body 20 and a portion between the maximum width line W of the cleaner main body 20 and the front face 21.

Alternatively, the maximum width portion of the cleaner main body 20 may be defined as a position close to the front face 21 of the cleaner main body 20. In addition, the extending direction of the maximum width line W of the cleaner main body 20 may be defined as a direction substantially perpendicular to the forward movement direction of the cleaner main body 20.

As illustrated in FIG. 2, the cleaner main body 20 further includes a suction port 101 through which dust and dirt are sucked into the inside of the cleaner main body 20. The suction port 101 is formed in the bottom surface of the lower housing 100 of the cleaner main body 20. The suction port 101 may have a horizontally long shape, a rectangular shape, or a substantially rectangular shape. However, the shape of the suction port 101 is not limited thereto. The shape may be an elliptical shape, a trapezoidal shape, a shape curved along the outer peripheral shape of the cleaner main body 20, or the like. According to Embodiment 1, the shape of the suction port 101 is rectangular. In addition, according to Embodiment 1, the suction port 101 is formed in the bottom surface of the lower housing 100 of the cleaner main body 20 such that the long direction is substantially the same as the width direction of the cleaner main body 20 and the short direction is substantially the same as the front-rear direction of the cleaner main body 20.

The suction port 101 may be formed in an area of the bottom surface of the lower housing 100 of the cleaner main body 20 close to a portion having the maximum width of the cleaner main body 20 or may be formed in an area close to the maximum width line W of the cleaner main body 20. A more detailed positional relationship is determined by the positional relationship of the suction port 101 relative to other constituent elements of the cleaner 10 and the like. For example, the positional relationship is determined by one or both of the following two types of positional relationships.

The first positional relationship is that the suction port 101 is positioned in the cleaner main body 20 in front of the center of gravity G (refer to FIG. 2) of the cleaner 10. More specifically, the suction port 101 is positioned in the cleaner main body 20 such that a center line M of the suction port 101 extending in a direction substantially the same as the long direction of the suction port 101 (hereinafter referred to as a "center line in the long direction of the suction port 101") is located in front of the center of gravity G of the cleaner 10 (refer to FIG. 2), that is, in the front portion of the cleaner main body 20 (i.e., the maximum width portion of the cleaner main body 20). Note that the center line in the long direction of the suction port 101 may be located in a portion of the cleaner main body 20 closer to the front face 21 than the maximum width line W.

The second positional relationship is that the suction port 101 may be located in a portion closer to the maximum width line W of the cleaner main body 20 than the drive unit 30, may be located at a position on the maximum width line W or in the vicinity of the maximum width line W of the cleaner main body 20, or may be located in a portion of the cleaner main body 20 closer to the front face 21 than the maximum width line W.

In addition, according to Embodiment 1, the width in the long direction of the suction port 101 is set so as to be wider than the inner distance between the right drive unit 30 and the left drive unit 30. Such a configuration can be achieved by using, for example, the above-described second positional relationship relating to the suction port 101 and the like. By employing the configuration, the suction port 101 having a wider width can be provided, so that dust and dirt can be more reliably sucked directly through the suction port 101. In addition, the amount of dust and dirt sucked by the suction unit 50 (described in more detail below) can be increased.

Drive Unit

The drive unit 30 is located in the cleaner main body 20.

As illustrated in FIG. 2, each of the drive units 30 is disposed on the bottom surface of the lower housing 100 and includes elements, such as the wheels 33 that move on the floor surface. According to Embodiment 1, in addition to the wheels 33 that move on the floor surface, the drive unit 30 includes a movement motor 31 for applying torque to the wheels 33 and a housing 32 for housing the movement motor 31. Each of the wheels 33 is accommodated in a recess formed in the lower housing 100 and is supported by the lower housing 100 in a rotatable manner relative to the lower housing 100.

Each of the wheels 33 is disposed on the outer side in the width direction of the cleaner main body 20 than the movement motor 31 for applying torque to the wheels 33. By employing such a configuration, the distance between the right wheel 33 and the left wheel 33 can be increased more than that in the case where the wheels 33 are disposed inwardly from the movement motor 31 in the width direction. As a result, the stability of the cleaner main body 20 is improved when the cleaner main body 20 moves.

A technique for driving the cleaner 10 according to Embodiment 1 is of a two-facing-wheel type. That is, the right drive unit 30 and the left drive unit 30 are disposed to face each other in the width direction of the cleaner main body 20. In addition, according to Embodiment 1, as illustrated in FIG. 2, a rotation axis H of the right wheel 33 and a rotation axis H of the left wheel 33 are disposed so as to be substantially collinear.

The distance between the rotation axis H and the center of gravity G of the cleaner 10 is set such that the cleaner 10 has a predetermined turning performance, for example. The term "predetermined turning performance" refers to a turning performance that enables the cleaner main body 20 to form a trajectory the same as or similar to the quadrangle trajectory formed by the above-mentioned contour of the Reuleaux triangle. According to Embodiment 1, the position of the rotation axis H is set so as to be in the rear portion of the cleaner main body 20 behind the center of gravity G of the cleaner 10, and the distance between the rotation axis H and the center of gravity G is set to a predetermined distance. The cleaner 10 of a two-facing-wheeled type can form the above-described trajectory by employing the above-described configuration and using contact of the cleaner main body 20 with objects located around the cleaner main body 20.

Cleaning Unit

As illustrated in FIG. 2, the cleaning unit 40 is disposed inside and outside of the cleaner main body 20. The cleaning unit 40 has elements, such as a brush drive motor 41. According to Embodiment 1, in addition to the brush drive motor 41 disposed inside the cleaner main body 20 (for example, on the left of the suction port 101), the cleaning unit 40 includes a gearbox 42 and a main brush 43 disposed in the suction port 101 of the cleaner main body 20.

The brush drive motor 41 and the gearbox 42 are attached to the lower housing 100. The gearbox 42 is connected to an output shaft of the brush drive motor 41 and the main brush 43, and the gearbox 42 transfers the torque of the brush drive motor 41 to the main brush 43.

The main brush 43 has a length substantially the same as the length of the suction port 101 in the long direction. The main brush 43 is supported by a bearing unit so as to be rotatable relative to the lower housing 100. The bearing unit is formed on at least one of the gearbox 42 and the lower housing 100. FIG. 4 is a side view of the cleaner 10. According to Embodiment 1, as indicated by an arrow AM in FIG. 4, the turning direction of the main brush 43 is set to a direction from the front to the rear of the cleaner main body 20 on the floor surface.

Suction Unit

As illustrated in FIG. 1, the suction unit 50 is disposed inside the cleaner main body 20. The suction unit 50 has elements, such as a fan case 52. According to Embodiment 1, the suction unit 50 is disposed at the rear of the dust box 60 and in front of the power supply unit 80 (described below). The suction unit 50 includes the fan case 52 attached to the lower housing 100 (refer to FIG. 2) and an electric fan 51 disposed inside the fan case 52.

The electric fan 51 is used to suck the air inside the dust box 60 and output the air to the outside of the electric fan 51. The air output from the electric fan 51 passes through the space inside the fan case 52 and the space around the fan case 52 inside the cleaner main body 20. Thereafter, the air is exhausted to the outside of the cleaner main body 20.

Dust Box

As illustrated in FIG. 2, the dust box 60 is disposed at the rear of the main brush 43 and in front of the suction unit 50 inside the cleaner main body 20 and is disposed between the drive units 30. The cleaner main body 20 and the dust box 60 have a detachable structure so that a user can freely attach the dust box 60 to the cleaner main body 20 and detach the dust box 60 from the cleaner main body 20.

Sensor Unit

As illustrated in FIGS. 1, 2, 5, and 6, the cleaner 10 further includes a sensor unit 426 including sensors.

The sensor unit 426 includes an obstacle detection sensor 71, ranging sensors 72, a collision detection sensor 73, and floor surface detection sensors 74.

The obstacle detection sensor 71 detects both an object including an obstacle and a person present in front of the cleaner main body 20 (refer to FIG. 1). The obstacle detection sensor 71 is an example of a first sensor and a third sensor. For example, the obstacle detection sensor 71 is disposed so as to protrude from the front surface of the cleaner main body 20. The obstacle detection sensor 71 functions as the first sensor that can detect the presence/absence of an object, the shape of the object, and the distance to the object and further functions as the third sensor that can detect the presence/absence of a person. The obstacle detection sensor 71 is not limited to one mounted on a front surface. For example, the obstacle detection sensor 71 may be mounted so as to protrude from the top surface of the cleaner main body 20. The obstacle detection sensor 71 may include a light emitter that emits a laser beam and a light receiver that receives the laser beam that is reflected by an object or a person. The obstacle detection sensor 71 may calculate the distance between the cleaner main body 20 and the object or the person on the basis of the difference between the light reception time at which the light receiver receives the reflected laser beam and the light emission time at which the light emitter emits the laser beam. For example, the obstacle detection sensor 71 may protrude from the cleaner main body 20 so that the emitted laser beam is not blocked by the cleaner main body 20.

For example, the presence/absence of a person can be detected by determining whether the shape of a pair of legs of a person (for example, refer to reference numeral 233 in FIG. 11C) is detected in an image acquired by the third sensor and including the shape of a pair of legs of a person through pattern matching performed by an image processing unit 463.

Note that the third sensor is not limited to the obstacle detection sensor 71. One of a pair of cameras 92 (described in more detail below), an infrared sensor, a lidar, and an ultrasonic sensor can be used as the third sensor. Alternatively, the presence/absence of a person can be detected by detecting whether a smartphone is present around the cleaner main body 20. The presence of a smartphone can be detected by using the communication unit 423 that detects communication performed by the smartphone or by receiving information from a remote controller (not illustrated). In this manner, the presence of a person can be detected. Still alternatively, if a home appliance (e.g., an air conditioner) installed in a space in which the cleaner main body is located includes an infrared sensor capable of providing an infrared image, the presence/absence of a person may be detected by determining whether an object having a temperature corresponding to the body temperature of a person is detected in the infrared image.

Each of the ranging sensors 72 detects the distance between the cleaner main body 20 and an object present around the cleaner main body 20 (refer to FIG. 1).

The collision detection sensor 73 detects that the cleaner main body 20 has collided with an object therearound (refer to FIG. 1).

Each of the floor surface detection sensors 74 detects the floor surface on which the cleaner main body 20 is located (refer to FIG. 2).

Each of the obstacle detection sensor 71, the ranging sensor 72, the collision detection sensor 73, and the floor surface detection sensor 74 inputs a detection signal to the control unit 70.

As the obstacle detection sensor 71, for example, a laser ranging device (a laser range finder) is used that performs a ranging operation by emitting a laser beam within a range of 180 degrees at predetermined time intervals (for example, one-second intervals). The obstacle detection sensor 71 can detect whether the target object 131, such as a rug or a carpet, in addition to an object, such as a desk or a chair, is present on the floor on the basis of the distance between the object or the target object 131 and the cleaner main body 20. If the target object 131 is present, the obstacle detection sensor 71 can detect the shape of the object or the target object 131 and the distance between the object or the target object 131 and the obstacle detection sensor 71.

As each of the ranging sensor 72 and the floor surface detection sensor 74, an infrared sensor or a laser ranging device (a laser range finder) is used, for example. Each of the ranging sensor 72 and the floor surface detecting sensor 74 has a light emitting unit and a light receiving unit. For example, a contact displacement sensor is used as the collision detection sensor 73. For example, the collision detection sensor 73 is disposed in the cleaner main body 20.

The collision detection sensor 73 includes a switch that is switched on when the bumper 230 is pushed into the cover 210.

As illustrated in FIG. 1, according to Embodiment 1, the ranging sensors 72 are disposed on the right side and the left side of the middle point of the width of the cleaner main body 20 as viewed in plan view. The ranging sensor 72 on the right side is disposed in the right front vertex portion 23. The right ranging sensor 72 emits light diagonally forward and to the right of the cleaner main body 20. The ranging sensor 72 on the left side is disposed in the left front vertex portion 23. The left ranging sensor 72 emits light diagonally forward and to the left of the cleaner main body 20. By employing such a configuration, the cleaner 10 can detect the distance between the cleaner main body 20 and one of the surrounding objects that is the closest to the outline of the cleaner main body 20 when turning.

As illustrated in FIG. 2, for example, the floor surface detection sensors 74 are disposed in portions of the cleaner main body 20 in front of and behind the drive unit 30 and detect the heights of the portions from the floor surface. If any one of the heights exceeds a predetermined value, the corresponding floor surface detection sensor 74 outputs an abnormal signal to prevent the cleaner main body 20 from falling off from the floor surface if stairs or the like lie ahead.

The sensor unit 426 further includes a rotational frequency sensor 455, such as an optical encoder for detecting the rotational frequency of each of the wheels 33 (that is, the rotational frequency of each of the movement motors 31). The rotational frequency sensor 455 detects the turning angle or one of the moving distance and the moving amount of the cleaner 10 (that is, the cleaner main body 20) by using the measured rotational frequency of each of the wheels 33 (that is, each of the movement motors 31) and inputs the detected value to the control unit 70. Consequently, the rotational frequency sensor 455 serves as a position detection sensor that detects the position of the cleaner 10 (for example, the cleaner main body 20) relative to a reference position, such as the position of a charging device that charges the storage battery 82.

Figure 9:
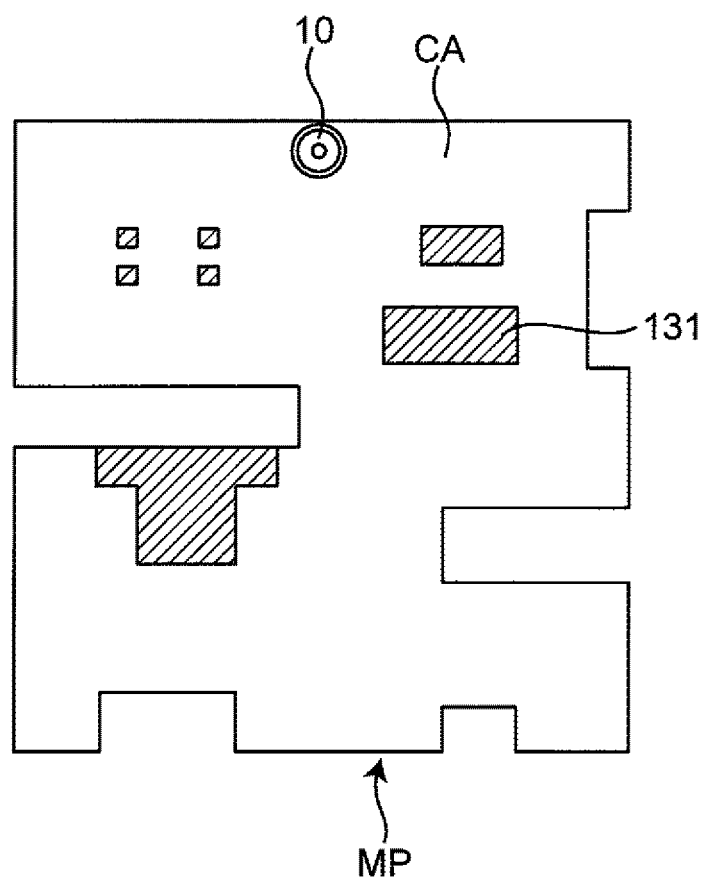
FIG. 9 illustrates a map including a positional relationship among objects located in a cleaning area.

The cleaner 10 calculates, from the position of the cleaner 10 detected by the rotational frequency sensor 455, the positional relationship between the cleaning area CA in a predetermined space in which the cleaner 10 is placed and each of objects located in the cleaning area CA and builds a map MP (refer to FIG. 9).

It should be noted that the above-mentioned relative position can also be used as the "current position" of the cleaner 10 (described in more detail below).

In addition, two cameras 92 are disposed on the front surface of the cleaner main body 20 on either side of the obstacle detection sensor 71. Each of the cameras 92 captures an image including information about the surroundings of the cleaner main body 20. The two cameras 92 are described in more detail below.

Control Unit

In the example illustrated in FIG. 1, the control unit 70 is disposed on the rear side of the suction unit 50 inside the cleaner main body 20. More specifically, the control unit 70 can be constituted by a control circuit.

A particular example of the hardware of the control unit 70 is a microcomputer including a central processing unit (CPU), a read only memory (ROM) that is a storage unit storing fixed data, such as programs loaded by the CPU, and a random access memory (RAM) that is a storage unit dynamically forming a variety of memory areas, such as a work area used for data processing performed by a program.

As illustrated in FIG. 5, the control unit 70 further includes a memory 461, the image processing unit 463, an image generation unit 464, and a determination unit 465.

The memory 461 functions as a storage unit that stores, for example, the data of images captured by the two cameras 92, the information regarding the presence/absence and shape of an object acquired by the obstacle detection sensor 71, a distance to the object, the initial position of the cleaner main body 20, and one of a movement amount from the initial position and the current position. The memory 461 can further store matching patterns (for example, images), object information, such as the presence/absence and the shape of an object, and the name, and the information about the shape of legs of a person, which are used by the image processing unit 463.

The image processing unit 463 functions as a map generation unit that builds the map MP of the cleaning area CA on the basis of the data of images captured by the two cameras 92 and the presence/absence and the shape of the object and the distance to the object acquired by the obstacle detection sensor 71. In addition, the image processing unit 463 performs pattern matching on the basis of the information about the shape of the legs of a person acquired by the obstacle detection sensor 71. Thus, the image processing unit 463 can determine the presence/absence of a person.

The image generation unit 464 functions as an image generation unit that generates a distance image on the basis of the data of the images captured by the two cameras 92, the presence/absence and the shape of an object acquired by the obstacle detection sensor 71 and the distance to the object.

The determination unit 465 functions as an obstacle determination unit that determines whether an object is an obstacle on the basis of the data of the images captured by the two cameras 92, the presence/absence and the shape of the object acquired by the obstacle detection sensor 71, and the distance to the object.

The control unit 70 further includes a movement control unit 466, a cleaning control unit 467, an image-capture control unit 468, and a calculation unit 469.

The movement control unit 466 controls the operation performed by each of the left and right movement motors 31 of the drive unit 30 (that is, the movement control unit 466 controls the two wheels 33).

The cleaning control unit 467 controls the operation performed by the brush drive motor 41 of the cleaning unit 40 and the operation performed by the electric fan 51 of the suction unit 50.

The image-capture control unit 468 controls the two cameras 92 of an image capturing unit 425.

The calculation unit 469 performs calculation by using the rotational frequency detected by the rotational frequency sensor 455 and obtains, as the position information about the cleaner main body 20, the information about the amount of movement of the cleaner main body 20 driven by the drive unit 30.

The control unit 70 has the following three modes: a movement mode for enabling the cleaner 10 (that is, the cleaner main body 20) to autonomously move by using two wheels 33 (that is, by driving two movement motors 31), a charge mode for charging the storage battery 82 (described in more detail below), and a standby mode in which the cleaner 10 is on standby. The information regarding the current mode is recorded in the memory 461.

The movement mode includes at least the following two modes:

(i) a first movement mode in which after cleaning the cleaning area CA in the space excluding the target object, the cleaner 10 runs over the target object, and (ii) a second movement mode in which after running over the target object first, the cleaner 10 cleans the cleaning area CA in the space excluding the target object.

As used herein, the term "running over" refers to, for example, climbing up a target object, cleaning the top surface of the target object and, thereafter, climbing down the target object. Note that the positions in the target object at which the cleaner 10 climbs up and down the target object may or may not be the same. In addition, after climbing up the target object, the cleaner 10 may move on the top surface of the target object in a variety of directions to clean the top surface. Alternatively, after climbing up the target object, the cleaner 10 may move in a straight line while cleaning the top surface and, thereafter, climb down the target object.

When the image processing unit 463 functions as a map generation unit that builds the map MP of the cleaning area CA, the image processing unit 463 can employ a variety of well-known map generation processing techniques. For example, the cleaner 10 can employ a technique known as SLAM (simultaneous localization and mapping) to build the map MP and estimate its own position. The SLAM is a technique for enabling the cleaner 10 to simultaneously estimate its own position and generate an environmental map on the basis of the information about the distance from the cleaner 10 to each of objects detected by the sensor unit 426.

The concept of SLAM is briefly described below.

(1) The position of an observation point on a map is estimated on the basis of the position of the cleaner 10.

(2) The position of the cleaner 10 is sequentially estimated over time by using a technique, such as Odometry, which gives the movement amount of the cleaner 10 from the rotational frequency of the wheel 33.

(3) The position of the cleaner 10 is corrected by observing the points already registered on the map MP again.

The image processing unit 463 create simultaneous equations by combining the equations for the above-described operations (1) to (3). By solving the simultaneous equations using the least-square method, the image processing unit 463 can estimate the position of the cleaner 10 and the map MP. In addition, the cumulative error is reduced.

The above-described processing is described in detail in "Mobile Robot Perception: Mapping and Localization", Masahiro TOMONO, Journal of the Institute of Systems, Control and Information Engineers "System, Control and Information", vol. 60, No. 12, pp. 509-514, 2016.

The built map MP is stored in a map database 99 of a database 110 (described below), and the estimated position of the cleaner 10 is stored in the memory 461 together with the time of estimation.

The memory 461 holds various types of recorded data regardless of whether the power of the cleaner 10 is switched on or off. The memory 461 is a nonvolatile memory, such as a flash memory.

The image processing unit 463 uses the data of the images captured by the two cameras 92, the presence/absence and the shape of an object acquired by the obstacle detection sensor 71, and the distance to the object and calculates the distance between the object around the cleaner 10 (that is, the cleaner main body 20) and the cleaner 10 (that is, the cleaner main body 20). The image processing unit 463 uses the distance and the position of the cleaner 10 (that is, the cleaner main body 20) detected by the rotational frequency sensor 455 of the sensor unit 426 and calculates the positional relationship between the cleaning area CA in which the cleaner 10 (that is, the cleaner main body 20) is located and each of the objects located in the cleaning area CA. Thus, the image processing unit 463 builds the map MP (refer to FIG. 9).

The image generation unit 464 generates a distance image representing the data of the images captured by the two cameras 92, the presence/absence and the shape of an object acquired by the obstacle detection sensor 71, and the distance to the object. To generate the distance image, the image generation unit 464 converts the data of the images captured by the two cameras 92 and the shape of the object and the distance to the object acquired by the obstacle detection sensor 71 into a gray scale identifiable by the eyes, such as at luminosity values or a color tone, for each of predetermined pixel group of the images (e.g., on a pixel-by-pixel basis). According to Embodiment 1, the image generation unit 464 generates a monochrome distance image such that the luminosity value decreases with increasing distance. That is, for example, the image generation unit 464 generates the distance image as a 256-level (i.e., 8-bit=$2^8$) gray scale image such that the image becomes darker as the distance from the cleaner 10 (that is, the cleaner main body 20) increases in the forward direction and becomes brighter as the distance decreases. As a result, this distance image is a visualized collection of distance data of objects positioned within the image-capture range in front of the two cameras 92 in the movement direction of the cleaner 10 (that is, the cleaner main body 20).

The determination unit 465 determines whether the object acquired by the obstacle detection sensor 71 is an obstacle on the basis of the data of the images captured by the two cameras 92, the shape of an object acquired by the obstacle detection sensor 71, and the distance to the object. That is, the determination unit 465 extracts a predetermined range (for example, part of the predetermined rectangular image range) of the distance image on the basis of the data of the images captured by the two cameras 92, the shape of an object acquired by the obstacle detection sensor 71, and the distance to the object. Thereafter, the determination unit 465 compares the distance between the cleaner 10 and the object in the extracted range of the image with a set distance serving as a preset or variably set threshold value. Subsequently, the determination unit 465 determines that the object located at the distance (that is, the distance from the cleaner 10 (that is, the cleaner main body 20) to the object) equal to or less than the set distance is an obstacle. The image range is set in accordance with the sizes of the cleaner 10 (that is, the cleaner main body 20) in the vertical and horizontal directions. That is, the vertical and horizontal sizes of the image range are set to the sizes of a range which the cleaner 10 (that is, the cleaner main body 20) is in contact with when the cleaner 10 moves straight forward.

The movement control unit 466 controls the magnitudes and directions of electric currents flowing in the two movement motors 31 so as to rotate the two movement motors 31 clockwise or counterclockwise. By controlling driving of each of the two movement motors 31 in this way, the movement control unit 466 controls driving of each of the two wheels 33.

The cleaning control unit 467 separately controls the conduction angles of the electric fan 51 and the brush drive motor 41 to control driving of the electric fan 51 and the brush drive motor 41. Note that a control unit may be provided for each of the electric fan 51 and the brush drive motor 41.

The image-capture control unit 468 includes a control circuit for controlling the shutter operation performed by each of the cameras 92. The image-capture control unit 468 controls each of the shutters to operate at predetermined time intervals so that images are captured by the two cameras 92 at the predetermined time intervals.

Displays

Figure 10A:
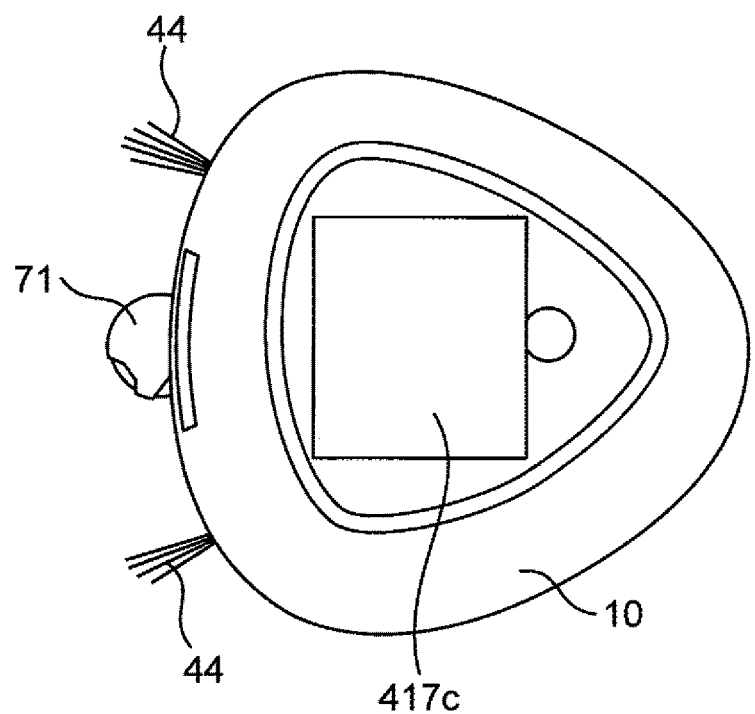
FIG. 10A illustrates a display disposed on a cleaner main body.

As illustrated in FIG. 10A, a display 417c is mounted on the cleaner main body 20.

Figure 10B:
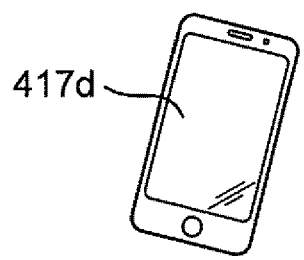
FIG. 10B illustrates a display disposed on an external terminal, such as a smartphone.

Instead of mounting the display 417c on the cleaner main body 20, a display screen may be displayed in the display 417d of an external device, such as a smartphone, as illustrated in FIG. 10B. Alternatively, in addition to mounting the display 417c in the cleaner main body 20, a display screen may be displayed in the display 417d of an external device.

Each of the displays 417c and 417d can function as an example of an input/output device having a touch panel on the surface of a liquid crystal display unit thereof, for example. Accordingly, the cleaner 10 can display a variety of display screens on the displays 417c and 417d and receive an input from the user.

Power Supply Unit

The power supply unit 80 is located in the cleaner main body 20 and supplies electric power to a communication unit 423, the image capturing unit 425, the drive unit 30, the cleaning unit 40, the suction unit 50, the sensor unit 426, and the like. The power supply unit 80 is disposed in the cleaner main body 20 on the rear side of the center of gravity G of the cleaner 10 and on the rear side of the suction unit 50. The power supply unit 80 includes elements, such as a power supply case 81. According to Embodiment 1, the power supply unit 80 includes, as particular hardware, the power supply case 81 attached to the lower housing 100, the storage battery 82 accommodated in the power supply case 81, and a main switch 83 that switches between supply of electric power and stoppage of supply of the electric power to the above-described elements.

For example, a secondary battery is used as the storage battery 82. The storage battery 82 is housed in the cleaner main body 20 and is electrically connected to, for example, charging terminals (not illustrated) which serve as connection portions exposed on either side of the rear portion of the lower surface of the cleaner main body 20. When the charging terminals are electrically and mechanically connected to the charging device, the storage battery 82 is charged by the charging device.

Camera

The cleaner 10 further includes the two cameras 92 that capture images including information about the surroundings of the cleaner main body 20 under the control of the image-capture control unit 468.

The two cameras 92 constitute an image capturing unit 425 for capturing images. The cameras 92 are disposed on the front face 21 of the cleaner main body 20. One of the cameras 92 is disposed on the left side of the obstacle detection sensor 71, and the other is disposed on the right side. That is, according to Embodiment 1, the two cameras 92 are disposed on the front face 21 of the cleaner main body 20 such that one of the cameras 92 is located at a position inclined to the left of a center line L of the cleaner 10 (that is, the cleaner main body 20) in the width direction at a predetermined angle (e.g., an acute angle), and the other is located at a position inclined to the right of the center line L at the same angle. That is, the two cameras 92 are substantially symmetrically disposed to each other on the cleaner main body 20 in the width direction, and the middle position between the two cameras 92 substantially coincides with the middle point of the cleaner 10 (that is, the cleaner main body 20) in the width direction which crosses (e.g., is orthogonal to) the front-rear direction (that is, the movement direction) of the cleaner 10. In addition, the two cameras 92 are disposed at substantially the same position in the vertical direction, that is, at substantially the same height. Accordingly, the two cameras 92 are set such that when the cleaner 10 is placed on the floor surface, the heights from the floor surface are substantially the same. Therefore, the two cameras 92 are disposed at positions apart from each other (for example, positions shifted from each other in the right-left direction). In addition, each of the two cameras 92 is a digital camera that digitally captures an image in front (in the movement direction of the cleaner main body 20) with a predetermined horizontal angle of view (for example, 105° at predetermined small time intervals (for example, time intervals of several ten milliseconds) or at predetermined normal time intervals (for example, time intervals of several seconds). More specifically, for example, each of the two cameras 92 includes a recording unit that captures and records a moving image for a predetermined time period (an example of the image captured by the camera and including information about the surroundings in front of the cleaner main body 20). The camera 92 records a new moving image at 15 to 30 frames per second while automatically erasing an old moving image captured a predetermined time before the current time. Furthermore, the fields of view of the two cameras 92 are overlapped with each other, and areas of two images captured by the two cameras 92 and including a position located in front and on the extension line of the center line L of the width of the cleaner 10 (that is, cleaner main body 20) overlap in the right-left direction. According to Embodiment 1, the two cameras 92 capture images within the visible light spectrum, for example. Note that the images captured by the two cameras 92 can be compressed to a predetermined data format by, for example, an image processing circuit (not illustrated).

The images captured by the two cameras 92 are input to the image processing unit 463 of the control unit 70, and the control unit 70 acquires the information about the objects including the target object 131 (for example, the presence/absence of an object and the shape of the object).

For example, the image processing unit 463 can acquire object information, such as the presence/absence and the shape of the object, and the name information about the object, by inputting the images captured by the cameras 92 to a pre-trained learner disposed in the image processing unit 463. Alternatively, the image processing unit 463 can acquire object information, such as the presence/absence and the shape of the object and the name information of the object, by matching the image captured by the camera against patterns (for example, images) held in advance in the image processing unit 463.

In addition, the image processing unit 463 can acquire the information about the presence/absence of a person (the presence/absence of the leg of a person) by matching the image captured by the camera against patterns (for example, images) held in advance in the image processing unit 463.

In this way, when acquiring the object information from the image captured by the camera, the control unit 70 acquires, as a "position of the object", the position at a predetermined distance away from the position of the cleaner 10 at the time of image capture in the direction in which the cleaner 10 (or the camera 92) faces (that is, the distance between the object and the cleaner 10).

Figure 11A:
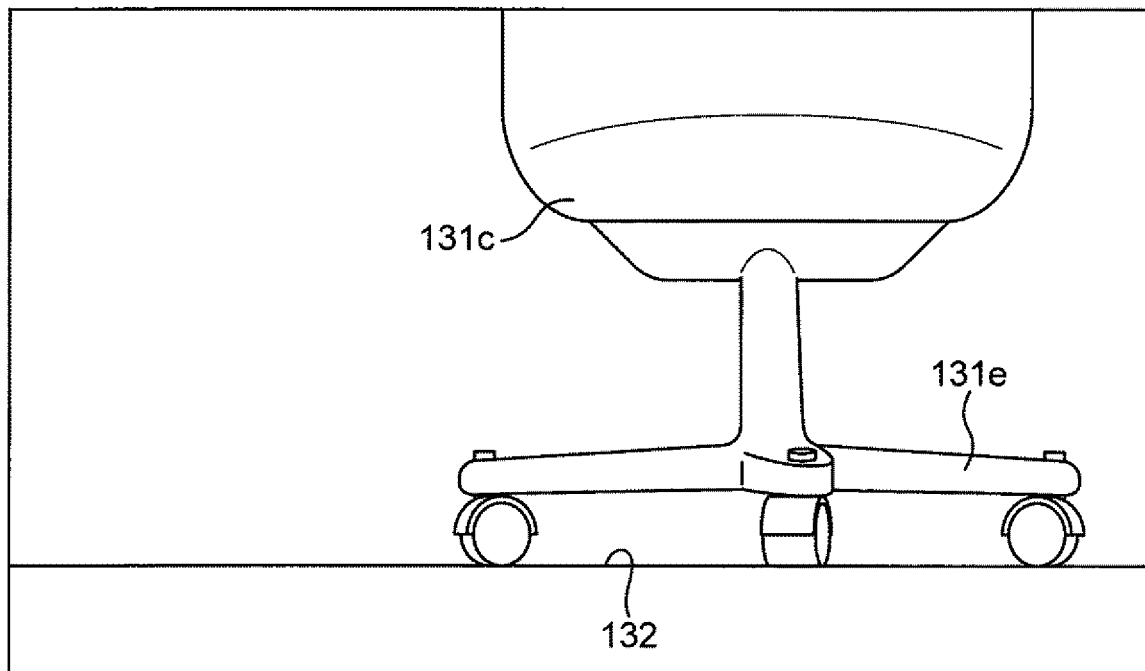
FIG. 11A illustrates an example of an image from which information about a chair (an example of an object) is acquired on the basis of an image captured by a camera and including information about the surroundings of the cleaner main body.
Figure 11B:
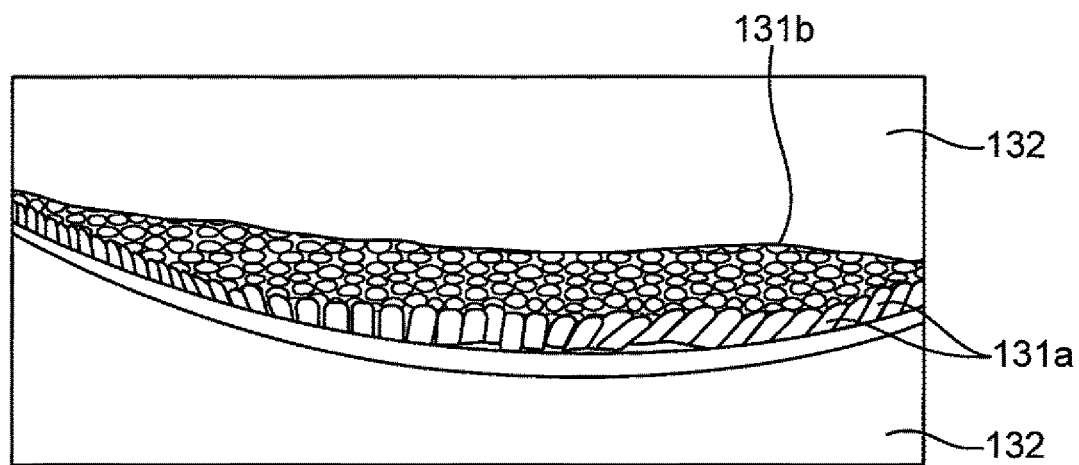
FIG. 11B illustrates an image captured by a camera at a time t1, where the image is an example of a carpet image which is an example of the target object.
Figure 11C:
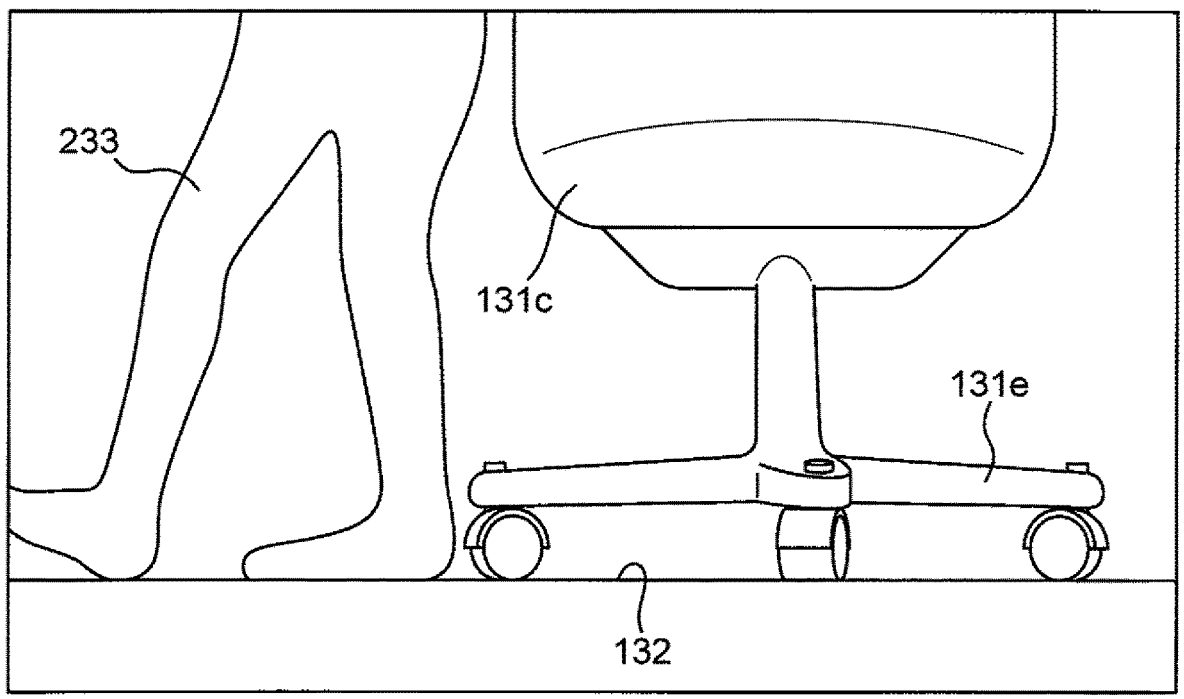
FIG. 11C illustrates an example of an image from which the legs of a person are detected on the basis of an image captured by a camera and including the surrounding information about a cleaner main body.

Examples of acquisition of the object information on the basis of the image captured by the camera are described below. FIG. 11A illustrates an example of acquisition of the information about a leg 131e of a chair 131c from the image captured by the camera and including the information about the surroundings of the cleaner main body. In addition, FIG. 11B illustrates an example of acquisition of the information about the carpet 131b, which is an example of a target object.

Database

The database 110 is connected to, for example, the communication unit 423, the control unit 70, the image capturing unit 425, and the sensor unit 426. The database 110 includes a map database 99 and a path database 102.

The map database 99 stores map information regarding the cleaning area CA. As the map information regarding the cleaning area CA, the map database 99 may store map information regarding the cleaning area CA generated in advance or generated by the cleaner 10.

The path database 102 stores the movement path P of the cleaner 10 in the map information regarding the cleaning area CA and further stores information regarding a path generation rule (described in more detail below). As described in more detail below, the movement paths P generated on the basis of the path generation rule are prestored in the path database 102. The user can select at least one of the stored movement paths P, and the cleaner 10 receives the selection instruction. As used herein, the term "movement path P" refers to a path along which the cleaner main body 20 moves while carrying out a cleaning operation.

Other Configurations

In addition, the cleaner 10 may further include the communication unit 423 that communicates with an external device 417 constituted by a personal computer (PC) or an external terminal device, such as a smartphone.

The communication unit 423 includes a wireless LAN device 447, a transmission unit (not illustrated), and a reception unit (not illustrated). The wireless LAN device 447 functions as a wireless communication unit that wirelessly communicates with the external device 417 via a home gateway 414 and a network 415 and a cleaner signal reception unit. The transmission unit transmits a wireless signal (e.g., an infrared signal) to, for example, the charging device. An example of the transmission unit is an infrared light emitting device. The reception unit receives a wireless signal (e.g., an infrared signal) from the charging device (not illustrated) or a remote controller (not illustrated). An example of the reception unit is a phototransistor.

The wireless LAN device 447 transmits a variety of types of information from the cleaner 10 to the network 415 and receives a variety of types of information from the network 415 via the home gateway 414. The wireless LAN device 447 is incorporated into the cleaner main body 20, for example.

The home gateway 414 is also referred to as an "access point". The home gateway 414 is installed in a building and is connected to the network 415 by, for example, a wire.

A server 416 is a computer connected to the network 415. An example of the server 416 is a cloud server. The server 416 can store a variety of types of data.

Inside a building, the external device 417 can communicate with the network 415 via, for example, the home gateway 414 by wire or wirelessly. Outside a building, the external device 417 can communicate with the network 415 by wire or wirelessly. Examples of the external device 417 are general-purpose devices including a PC 417a (for example, a tablet terminal (e.g., a tablet PC)) and a smartphone 417b (or a mobile phone).

The external device 417 includes the displays 417c or 417d (refer to FIG. 10A or 10B) having a display function of displaying at least an image.

Modification 1

Figure 12A:
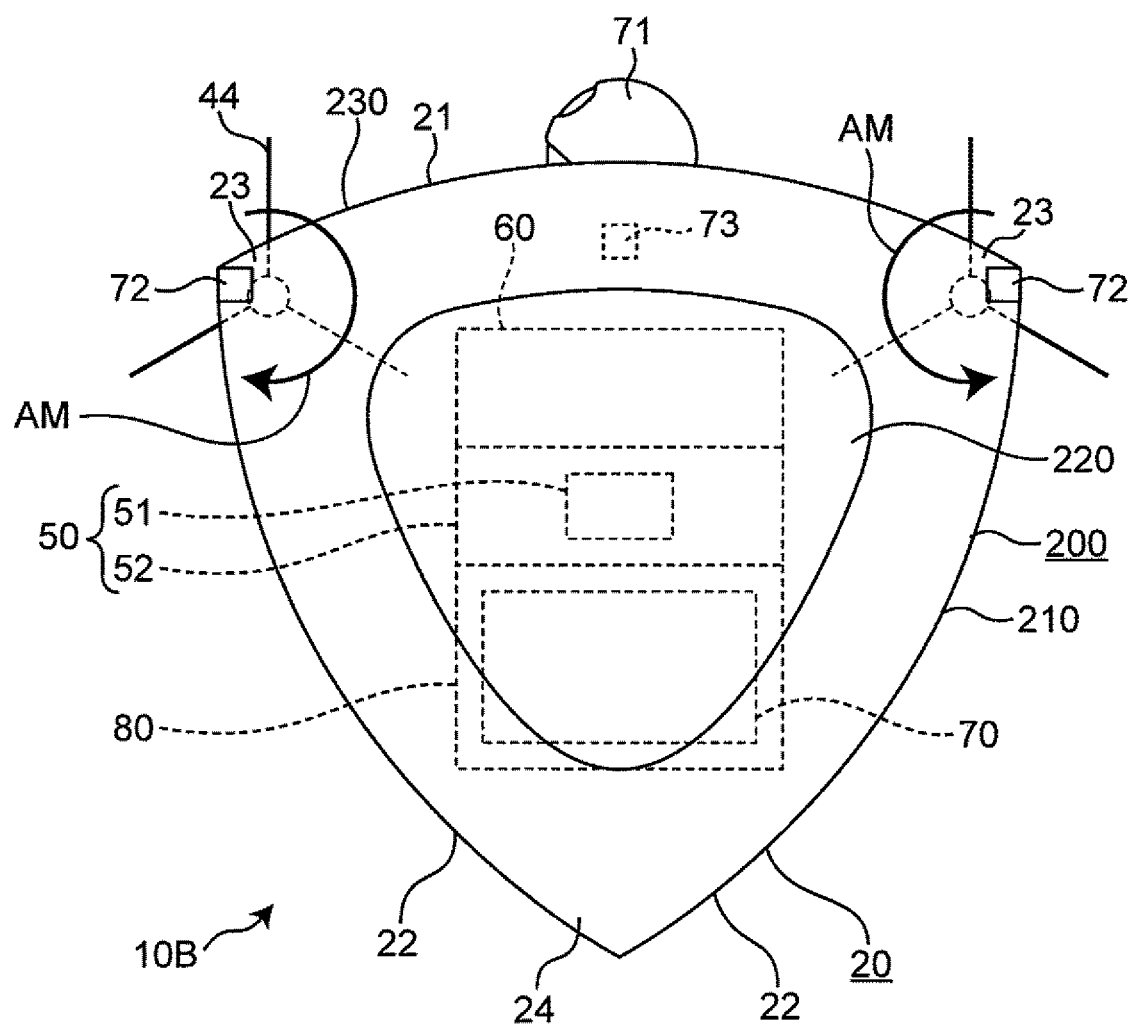
FIG. 12A is a plan view of a cleaner according to Modification 1 of Embodiment 1 of the present disclosure.
Figure 12B:
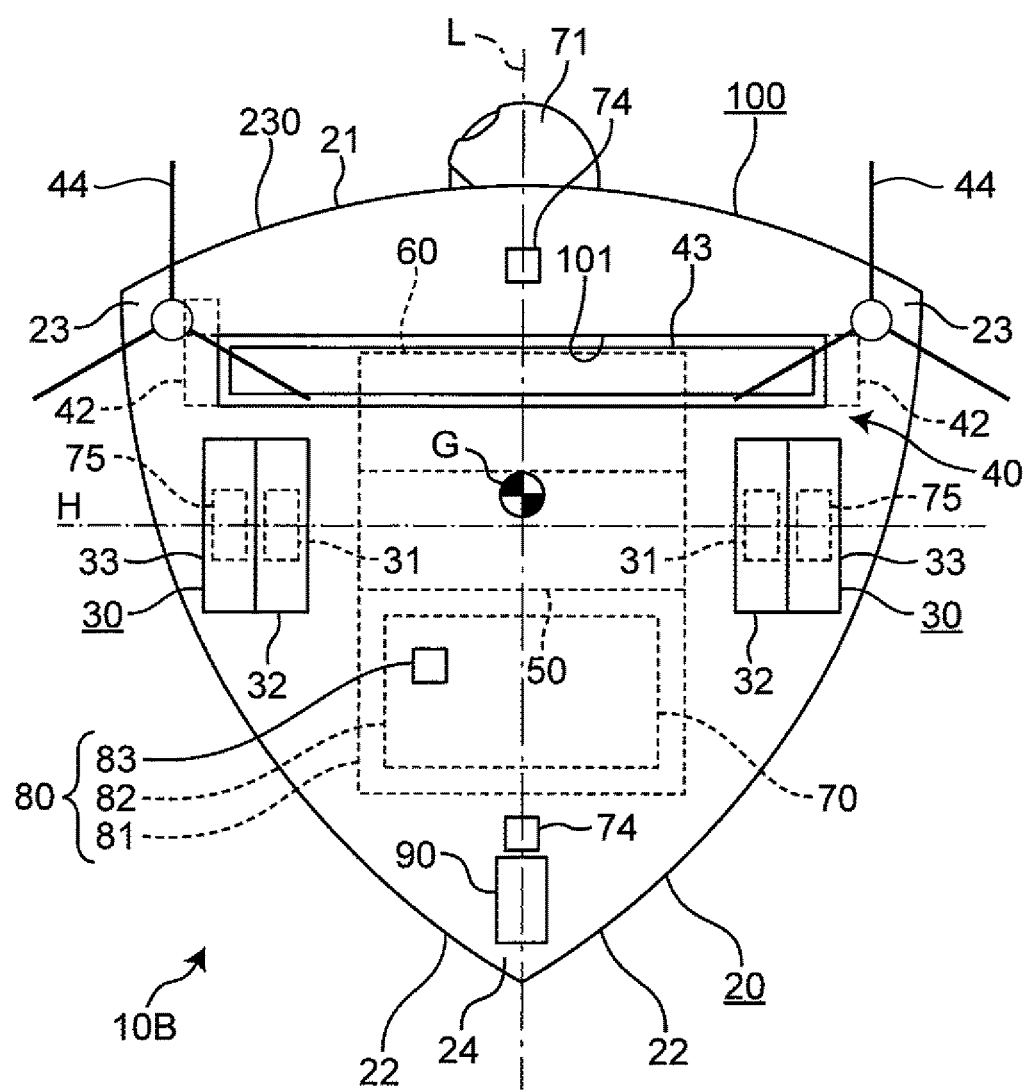
FIG. 12B is a bottom view of the cleaner according to Modification 1.

As illustrated in FIGS. 12A and 12B, unlike the cleaner 10 according to Embodiment 1, a cleaning unit 40 of a cleaner 10B according to Modification 1 of Embodiment 1 can further have two side brushes 44 disposed on the bottom surface of the lower housing 100 of the cleaner main body 20 and two gearboxes 42 disposed on either side of the suction port 101 (one on the left and one on the right side of it). The two side brushes 44 are disposed on the bottom surface of the lower housing 100 of the cleaner main body 20 on either side of the suction port 101 (one on the left and one on the right side of it). Note that according to the present disclosure, the cleaning operation in the cleaning method performed by the cleaner 10 may be read as the cleaning operation performed by the cleaner 10B. Thus, the cleaning operation may be applied.

One of the gearboxes 42 (e.g., the right gearbox 42 illustrated in the plan view of the cleaner main body 20) is connected to the output shaft of the brush drive motor 41, the main brush 43, and one of the side brushes 44. Thus, the gearbox 42 transfers the torque of the brush drive motor 41 to the main brush 43 and the one of the brushes 44. The other gearbox 42 (e.g., the left gearbox 42 illustrated in the plan view of the cleaner main body 20) is connected to the main brush 43 and the other side brush 44. Thus, the gearbox 42 transfers the torque of the main brush 43 to the other side brush 44.

According to Modification 1 of Embodiment 1, each of the two side brushes 44 has a brush shaft 44A attached to one of the two front vertex portions 23 of the cleaner main body 20 and bristle bundles 44B attached to the brush shaft 44A. The position of the side brush 44 in the cleaner main body 20 is determined so that part of the rotational trajectory of the side brush 44 capable of collecting dust into the suction port 101 (i.e., a circular trajectory drawn by one rotation of the tip of the side brush 44; the same apples hereinafter) is located at the maximum width portion of the cleaner main body 20. According to Modification 1 of Embodiment 1, the number of the bristle bundles 44B attached to each brush shaft 44A is three, and the three bristle bundles 44B are attached to the brush shaft 44A at equal angular intervals.

Each of the brush shafts 44A has a rotation shaft that extends in a direction the same or substantially the same as the height direction of the cleaner main body 20. The brush shaft 44A is supported by the cleaner main body 20 in a rotatable manner relative to the cleaner main body 20. The brush shaft 44A is disposed in the cleaner main body 20 and in front of the long center line of the suction port 101.

Each of the bristle bundles 44B is composed of bristles and is fixed to the brush shaft 44A so as to extend in a direction the same or substantially the same as the radial direction of the brush shaft 44A. According to Modification 1 of Embodiment 1, the length of each of the bristle bundles 44B is set to such a length that the tip of each of the bristle bundles 44B protrudes outward beyond the outline of the cleaner main body 20.

As indicated by arrows AM in FIG. 12A, the rotational direction of each of the side brushes 44 is set such that the rotational trajectory of the side brush 44 extends from the front to the rear of the cleaner main body 20 as viewed from the middle point of the width of the cleaner main body 20. That is, the two side brushes 44 rotate in opposite directions. According to Modification 1 of Embodiment 1, the side brushes 44 rotate from the front to the rear of the cleaner main body 20 in a portion in which their rotational trajectories are close to each other.

Method for Controlling Cleaner

A method used by the control unit 70 to control the cleaner 10 is described below.

FIG. 6 is a block diagram illustrating the function of an electric system of the cleaner 10.

The control unit 70 is disposed on the power supply unit 80 (refer to FIGS. 1 and 2) in the cleaner main body 20. The control unit 70 is electrically connected to the power supply unit 80. Furthermore, the control unit 70 is electrically connected to the communication unit 423, the image capturing unit 425, the sensor unit 426, the pair of movement motors 31, the brush drive motor 41, the electric fan 51, and the like.

The control unit 70 uses the determination unit 465 to determine whether an object that is likely to prevent the movement of the cleaner 10 is present within a predetermined area in front of the cleaner main body 20 on the basis of a detection signal input from the obstacle detection sensor 71 of the sensor unit 426. The detection signal includes the information about the presence/absence of an object, the shape of the object, and the distance to the object.

The control unit 70 calculates the distance between the outline of the cleaner main body 20 and each of the objects present around the right and left front vertex portions 23 of the cleaner main body 20 on the basis of the detection signals input from the left and right ranging sensors 72.

The control unit 70 determines whether the cleaner main body 20 has collided with the surrounding object on the basis of the detection signal input from the collision detection sensor 73.

The control unit 70 determines whether the floor surface of the cleaning area CA is present below the cleaner main body 20 on the basis of the detection signal input from the floor surface detection sensor 74.

The control unit 70 controls the movement motor 31, the brush drive motor 41, and the electric fan 51 by using at least one of the above-described results of determination and calculation so that the cleaner 10 cleans the floor surface in the cleaning area CA.

Method for Controlling Movement of Cleaner

Figure 13A:
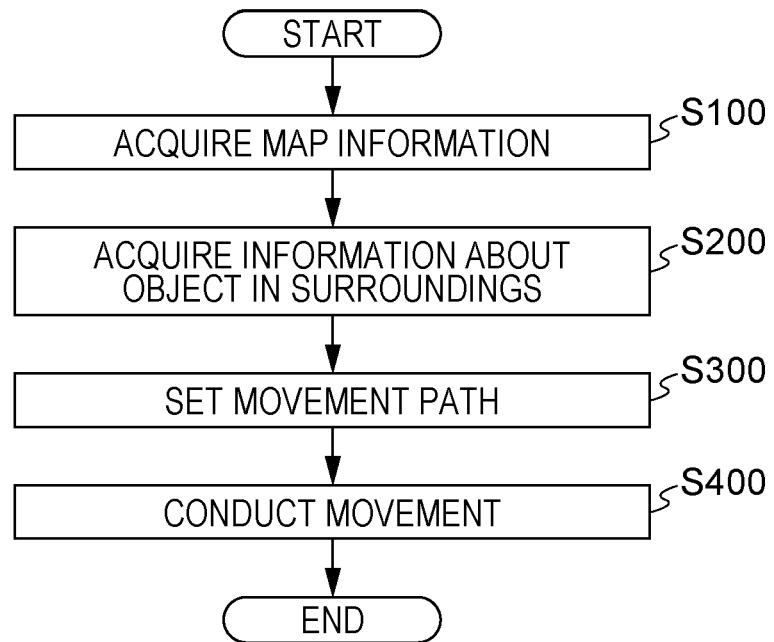
FIG. 13A is a flowchart illustrating a method for controlling the movement of the cleaner.

A method used by the control unit 70 to control the movement of the cleaner 10 is described below with reference to FIG. 13A.

The method for controlling the movement of the cleaner 10 includes the steps of:

acquiring the map information by using the control unit 70 (step S100), acquiring the information about an object in the surroundings by using the control unit 70 (step S200), setting the movement path P by using the control unit 70 (step S300), and moving the cleaner 10 by using the control unit 70 (step S400).

Note that an example of the map information is a two-dimensional map MP illustrated in FIG. 9. The two-dimensional map MP is recorded in the map database 99.

The object information includes at least the positions of the objects (including the target object) on the two-dimensional map MP, one of an image captured by the camera and the shape of the object, and the information about the name of the object. The object information is recorded in the memory 461. When the position of the object (including the target object) is recorded in the memory 461, the recording time stamp is also recorded in association with the position of the object. Note that the control unit 70 may acquire, as the map information, a map MP including the object information and associated with the object position from the map database 99 and the memory 461.

Step S100

The control unit 70 acquires, from the map database 99, the map information regarding the cleaning area CA. FIG. 9 illustrates, as an example of map information, an example of the map MP of the cleaning area CA in the cleaning space. At this time, after acquiring the map information by using the control unit 70, the cleaner main body 20 starts moving and cleaning while correcting the map information as necessary by using the image processing unit 463 that employs the SLAM. Alternatively, the cleaner main body 20 may simply acquire previously generated map information by using the control unit 70.

Step S200

The control unit 70 acquires, from the images captured by the cameras, the object information about objects in the cleaning area CA by using the image processing unit 463. For example, a rectangular frame indicated by reference numeral 131 in FIG. 9 is the target object 131, which is one of examples of objects.

A specific example is discussed below. As illustrated in FIGS. 11A and 11B, the control unit 70 acquires, from the images captured by the cameras, object information, such as the presence/absence and shape of each of the objects and name information about the objects present in the cleaning area CA, by using the image processing unit 463.

Step S300

The control unit 70 sets a movement path.

More specifically, the control unit 70 acquires the information about the path generation rule from the path database 102.

Subsequently, the control unit 70 generates a movement path in the cleaning area CA on the basis of the map information of the cleaning area CA acquired in step S100 and the path generation rule.

Figure 13B:
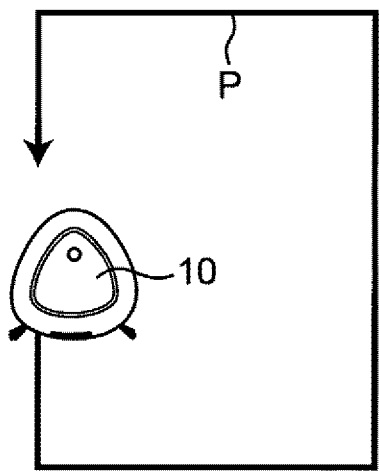
FIG. 13B illustrates a generated frame shape movement path.
Figure 13C:
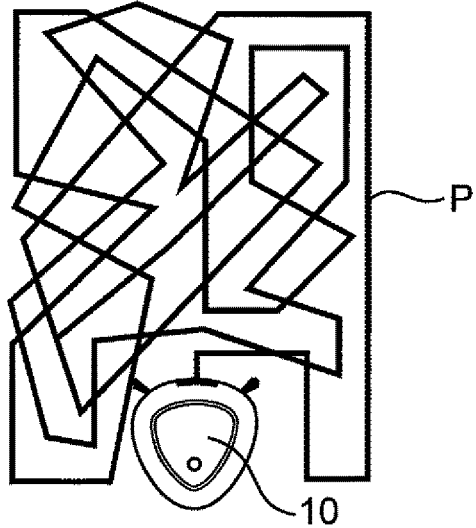
FIG. 13C illustrates a generated random walk movement path.
Figure 13D:
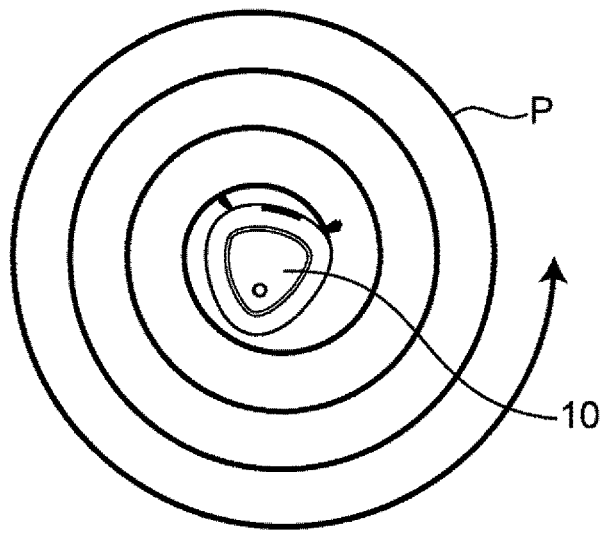
FIG. 13D illustrates a generated spiral shape movement path.

FIGS. 13B to 13D illustrate a specific example of movement paths P to be generated. As an example of the path generation rule, as illustrated in FIG. 13B, the control unit 70 moves the cleaner 10 in the cleaning area CA while controlling the movement so that the distance between the cleaner 10 and the wall of the room is maintained within a certain range by using the ranging sensor 72. In this manner, a frame shape movement path P can be generated that goes along the walls of the room. As another example of the path generation rule, as illustrated in FIG. 13C, the control unit 70 moves the cleaner 10 randomly within the cleaning area CA. Thus, a random walk movement path P can be generated. As still another example of the path generation rule, as illustrated in FIG. 13D, the control unit 70 controls the cleaner 10 to move in the cleaning area CA along a spiral-shape path starting at a specified position. Thus, the movement path P of a spiral shape can be generated.

The generated movement path P is stored in the path database 102 by the control unit 70.

Instead of generating the movement path P, the control unit 70 may acquire the information about the initial position of the cleaner main body 20 from the memory 461. Thereafter, the control unit 70 may generate a movement path P in the cleaning area CA on the basis of the information about the initial position, the map information regarding the cleaning area CA, and the path generation rule.

Note that an example of the information about the initial position is the current position of the cleaner main body 20 recorded in the memory 461. In this example, the current position is the position of the cleaner 10 that is stationary when the cleaning instruction is input to the cleaner 10.

The control unit 70 acquires the current position of the cleaner main body 20 from the sensor unit 426. At this time, the current position is the information about the position of the cleaner 10 that is moving. Alternatively, the control unit 70 acquires the information about the current position of the cleaner main body 20 from the memory 461 that stores the information acquired by the sensor unit 426. For example, the memory 461 stores the current position of the cleaner main body 20 in association with a time stamp. The control unit 70 acquires, from the memory 461, the current position of the cleaner main body 20 having the most recent time stamp as the initial position.

Another example of the information about the initial position is a predetermined position preset as the initial position of the cleaner main body 20 (for example, a charging location of the charging device). The control unit 70 acquires the information about the initial position of the cleaner main body 20 from the memory 461.

When generating and setting the movement path P in the cleaning area CA by using the information about the initial position, the control unit 70 can generate and set the above-mentioned frame shape movement path P, random walk movement path P, spiral shape movement path P, and the like which start at the initial position.

Detailed Processing Flow of Step S300

Figure 13E:
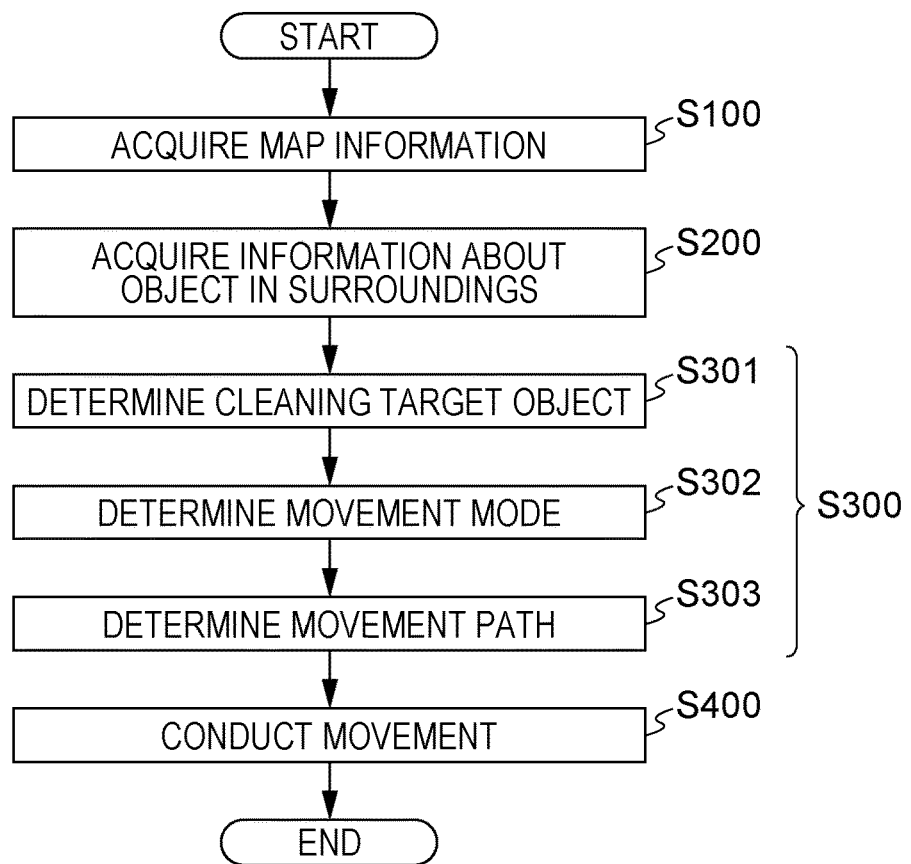
FIG. 13E is a flowchart illustrating a movement control method including detailed description of the movement path in step S300.

FIG. 13E illustrates a more detailed processing flow relating to generation of the movement path P to set the movement path P in step S300.

The setting of the movement path in step S300 by the control unit 70 has the following steps:
receiving the settings for cleaning a target object (step S301),
receiving a movement mode (step S302), and
receiving a movement path (step S303).

Note that the order of steps S301 to S303 is not limited thereto. For example, the operations of step S302 and step S303 may be reversed, or the operations may be performed in the order of step S303, then step S301, and then step S302.

Step S301

Figure 14A:
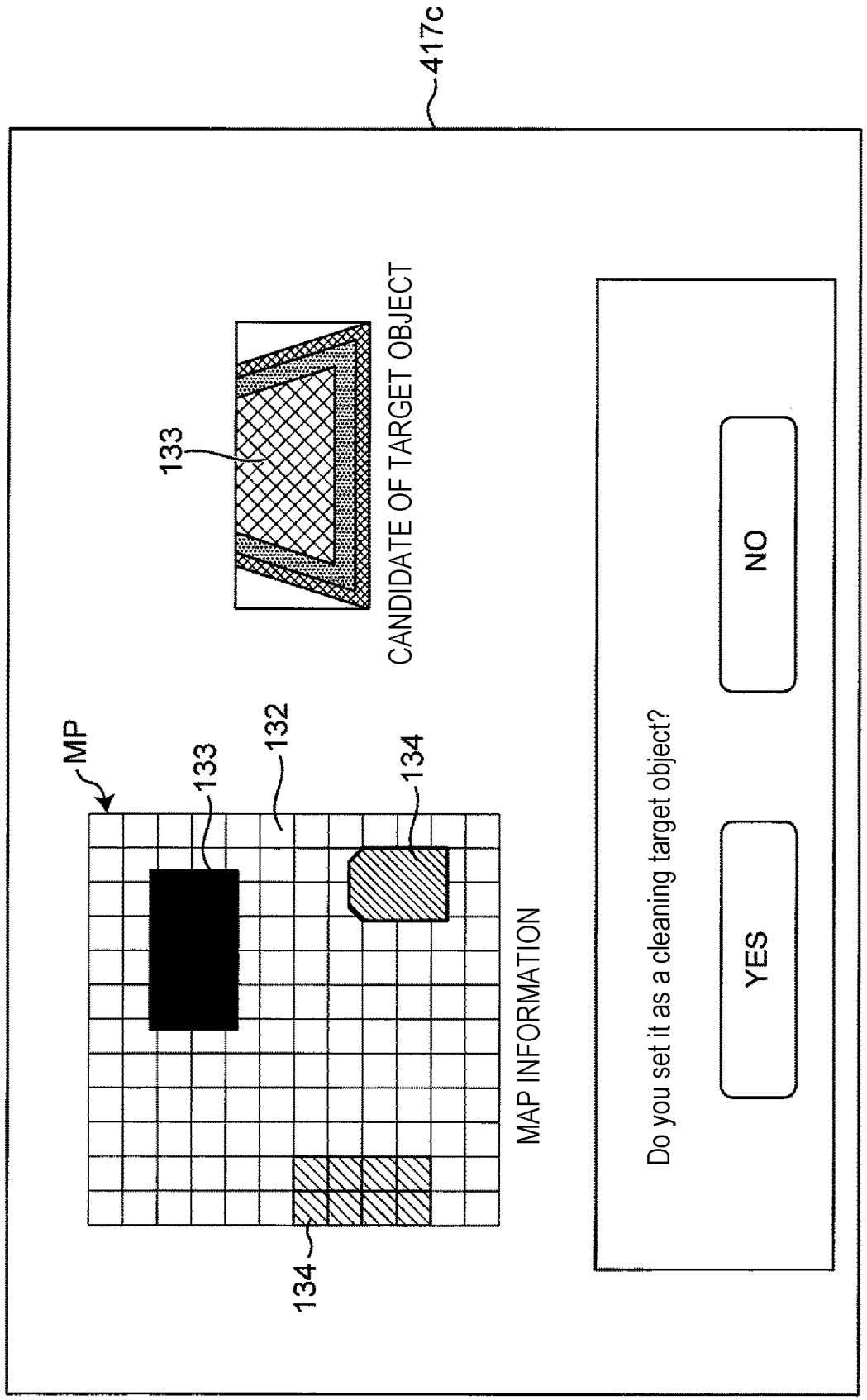
FIG. 14A illustrates a display screen of a display that prompts a user to select whether an object detected by an image processing unit is set as a cleaning target object and receives the result of selection.

The control unit 70 can receive the settings of the cleaning target object. In this step, the image processing unit 463 of the control unit 70 detects an object from the data of the images captured by the two cameras 92. Subsequently, the control unit 70 receives the selection instruction indicating whether each of the detected cleaning target objects 133 and 134 is actually to be cleaned. To receive the result of selection from the user, the display screen illustrated in FIG. 14A may be displayed on the display 417c. For example, the display screen illustrated in FIG. 14A includes two-dimensional map information, information regarding a candidate of the target object, and a display field for receiving the result of selection by the user. The two-dimensional map information illustrated in FIG. 14A includes the position information regarding the cleaning target object 133 and the cleaning target object 134 on the map. The information regarding a candidate of the target object includes the image of the cleaning target object 133. FIG. 14A illustrates the display screen for prompting the user to select whether to set a carpet, which is a rectangular object, as a cleaning target object. The control unit 70 receives the selection instruction from the user.

The user presses a "YES" button if setting the cleaning target object 133 as an object to be cleaned. However, the user presses a "NO" button if not setting the cleaning target object 133 as a target object to be cleaned. In this case, suppose that the control unit 70 receives a selection instruction to set the rectangular object on the upper side as an object to be cleaned. That is, the control unit 70 receives the setting indicating that the object is an object to be cleaned. Similarly, the control unit 70 receives a selection instruction indicating whether to set the object as an object to be cleaned. The object is displayed on the display screen of the display 417c in an information field of a candidate of the target object, and the control unit 70 receives the result of selection from the user. In this case, suppose that the control unit 70 receives, from the user, the result of selection indicating that the object is not set as an object to be cleaned. That is, the control unit 70 receives a setting indicating that the object is not an object to be cleaned.

FIG. 14B illustrates another example of the display screen of the display 417c. More specifically, FIG. 14B illustrates a display screen for receiving, from the user, a selection instruction indicating whether to clean the cleaning target object 133.

The user presses a "YES" button if the cleaning target object 133 is to be cleaned. However, the user presses a "NO" button if the cleaning target object 133 is not to be cleaned. In this case, suppose that the control unit 70 receives a selection instruction indicating that the cleaning target object 133 is to be cleaned. That is, the control unit 70 receives the setting indicating that the cleaning target object 133 is an object to be cleaned.

If all of the objects are not set as cleaning target objects, step S302 is skipped, and the processing proceeds to step S303 (not illustrated).

In the case where the cleaning target object 133 is previously set as an object to be cleaned, reception of selection as to whether the user wants to clean the cleaning target object 133 is not necessary. For example, the information as to whether the cleaning target object 133 is to be actually cleaned may be preset in accordance with the item type of the cleaning target object 133.

Step S302

Subsequently, the control unit 70 receives the movement mode. For example, the display screen of the display 417c in FIG. 14C illustrates a display screen for receiving, from the user, a selection instruction indicating whether to clean the cleaning target object 133 first.

The user presses a "YES" button if cleaning the cleaning target object 133 first. However, the user presses a "NO" button if not cleaning the cleaning target object 133 first. In this case, the example of the display screen of the display 417c illustrated in FIG. 14C includes the question "Do you clean the cleaning target object first?" and two options of answers ("YES" and "NO"). In this case, suppose that the control unit 70 has received a selection instruction indicating that the cleaning target object 133 is to be cleaned first when the display screen illustrated in FIG. 14C is displayed.

FIG. 14D illustrates another example of the display screen of the display 417c. The example of the display screen of the display 417c illustrated in FIG. 14D includes the question "When do you clean the cleaning target object?", the explanation of two options: "A: Clean it first" and "B: Clean it last", and the two options: "A" and "B". FIG. 14D illustrates the display screen for receiving, from the user, a selection instruction indicating one of option A indicating that the cleaning target object 133 is to be cleaned first and option B indicating that the cleaning target object 133 is to be cleaned last.

If the cleaning target object 133 is to be cleaned first, the user presses a button "A". However, if the cleaning target object 133 is to be cleaned last, the user presses the button "B". In this example, the control unit 70 receives, from the user, a selection instruction indicating that the cleaning target object 133 is to be cleaned first.

If the cleaning target object 133 is cleaned first in FIG. 14C and if the option A indicating that the cleaning target object 133 is to be cleaned first is selected in FIG. 14D, the cleaner 10 enters the second mode recorded in the memory 461. If the cleaning target object 133 is not cleaned first in FIG. 14C and if the option B indicating that the cleaning target object 133 is to be cleaned last is selected in FIG. 14D, the cleaner 10 enters the first mode recorded in the memory 461.

Step S303

Subsequently, the control unit 70 receives the movement path. For example, the user selects one from among the above-described frame shaped movement path P, random walk movement path P, and spiral movement path P which start at the initial position, and the control unit 70 receives a selection instruction. An example is illustrated in FIGS. 14F to 14H. FIG. 14F illustrates the case of cleaning along the frame shape movement path P illustrated in FIG. 13B in the cleaning area illustrated in FIG. 9. FIG. 14G illustrates the case of cleaning along the random walk movement path P illustrated in FIG. 13C in the cleaning area illustrated in FIG. 9. FIG. 14H illustrates the case of cleaning along the spiral shape movement path P illustrated in FIG. 13D in the cleaning area illustrated in FIG. 9. As a result, the control unit 70 receives any one of the three movement paths P illustrated in FIGS. 14F to 14H.

Step S400

Subsequently, the control unit 70 controls the drive unit 30 by using the movement control unit 466 and moves the cleaner main body 20 along the selected movement path P that starts at the initial position. In addition, while moving the cleaner main body 20 along the movement path P, the control unit 70 controls the cleaning control unit 467 to drive the cleaning unit 40 so that the cleaning area CA is cleaned.

At this time, the control unit 70 acquires the position information regarding the cleaner main body 20 from the data of the images captured by the two cameras 92. The control unit 70 acquires the current position of the cleaner main body 20 on the map MP of the cleaning area CA on the basis of the position information acquired by the cleaner main body 20 and the map MP of the cleaning area CA stored in the map database 99.

That is, the control unit 70 acquires the initial position of the cleaner main body 20 from the data of the images captured by the two cameras 92 as the position information regarding the cleaner main body 20. In addition, the control unit 70 causes the calculation unit 469 to perform odometry calculation on the basis of the rotational frequency detected by the rotational frequency sensor 455 and obtains information about the movement amount of the cleaner main body 20 moved from the initial position by the drive unit 30. The acquired initial position and the movement amount can be recorded in the memory 461 or the map database 99.

In this manner, the calculation unit 469 can obtain the current position of the cleaner main body 20 that is moving by adding the movement amount of the cleaner main body 20 to the initial position of the cleaner main body 20.

For example, the control unit 70 may record the current position of the cleaner main body 20 on the map MP of the cleaning area CA stored in the map database 99. In addition, the control unit 70 can record the current position of the cleaner main body 20 on the map MP in the map database 99 at predetermined time intervals.

The control unit 70 controls driving of the drive unit 30 by using the movement control unit 466 to move the cleaner main body 20 so that the movement trajectory of the current position of the cleaner main body 20 and the generated movement path P are the same. In this manner, the control unit 70 can move the cleaner main body 20 from the starting point (the initial position) along the selected movement path P by using the movement control unit 466 that controls the drive unit 30.

Method for Cleaning by Cleaner

Figure 15A:
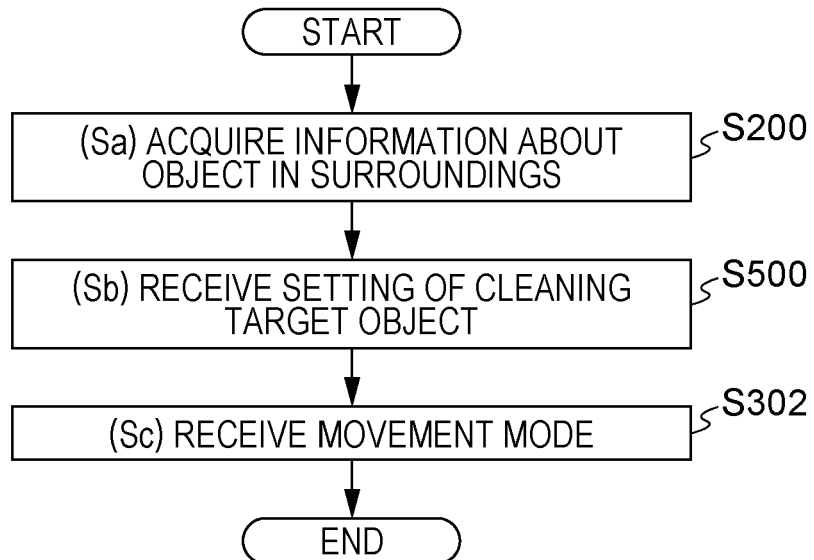
FIG. 15A is a flowchart illustrating the minimum required steps of the method for cleaning by the cleaner according to Embodiment 1.

The overall movement operation performed by the cleaner 10 has been described above. A method for cleaning by the cleaner is described below with reference to FIG. 15A.

The method for cleaning by the cleaner includes at least the following steps:

acquiring information about objects in the surroundings by using the control unit 70 (step S200), receiving setting of a cleaning target object by using the control unit 70 (step S500), and receiving the movement mode by using the control unit 70 (step S302).

Step S200

The image processing unit 463 acquires information about a first target object in the cleaning area CA of a predetermined space first (Sa). That is, as described above, the control unit 70 acquires, from the images captured by the cameras, the object information about the cleaning area CA by using the image processing unit 463. Note that in this example, the first target object is a target object that is likely to prevent the movement of the cleaner main body 20. More specifically, the memory 461 or the map database 99 has, recorded therein, information indicating that the first target object is a target object that caused the cleaner main body 20 to enter a stuck state in the past.

Step S500

Subsequently, the control unit 70 receives information about the setting of a cleaning target object (Sb). The setting information indicates whether a first target object is a target object to be cleaned. A particular example of an operation for receiving the setting information is the operation described above in step S301 and FIG. 14C. The technique is also applied to Modification 2 below. Alternatively, the control unit 70 may receive the setting of the cleaning target object on the basis of a voice command given by the user. For example, the memory 461 holds the information about the cleaning target object associated with the sound data. The control unit 70 may receive the setting information about the cleaning target object by referring to the voice command given by the user and the voice data recorded in the memory 461.

Step S302

The method is further described with reference to an example in which after the information indicating that the first target object is a target object to be cleaned is received by the control unit 70, the cleaning area CA is cleaned, as illustrated in FIG. 14D (Sc).

The control unit 70 displays a first display screen on the display 417*c* or 417*d*. The first display screen enables the user to select one of the following movement modes:

(i) a first movement mode for cleaning the cleaning area CA excluding the first target object and, subsequently, running over the first target object to clean the first target object, and (ii) a second movement mode for running over the first target object to clean the first target object first and, subsequently, cleaning the cleaning area CA excluding the first target object.

Note that when the control unit 70 receives information indicating that the first target object is not a target object to be cleaned, the control unit 70 cleans the cleaning area CA excluding the first target object first and, subsequently, ends the cleaning operation. After the cleaner 10 ends the cleaning operation, the cleaner 10 returns to the reference position, for example.

Modification 2

According to Modification 2 of Embodiment 1, the following operations are performed.

Figure 15B:
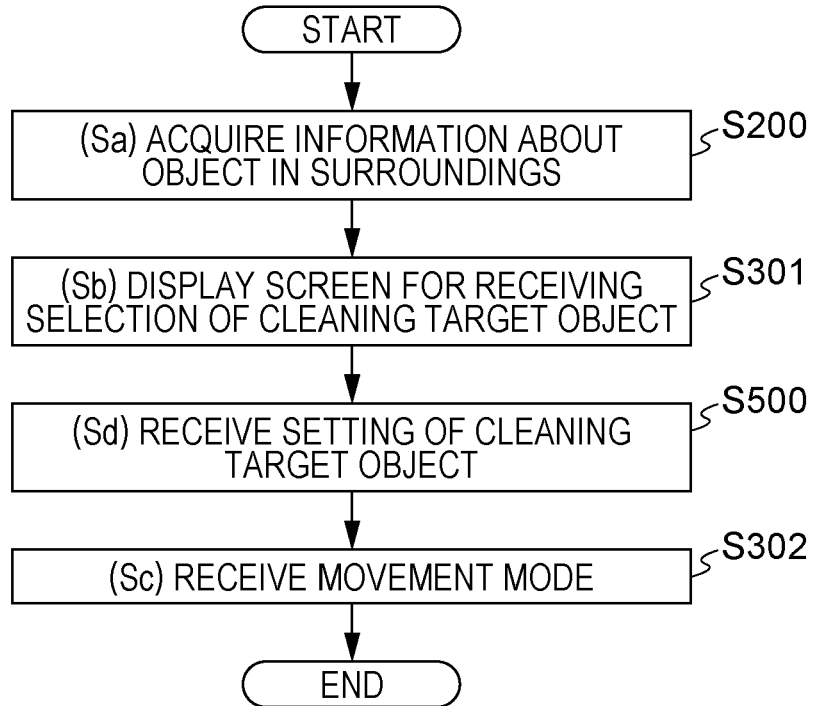
FIG. 15B is a flowchart illustrating the steps of the method for cleaning by a cleaner according to Modification 2 of Embodiment 1.

That is, as illustrated in FIG. 15B, the control unit 70 displays a second display screen on the display 417c or 417d at a time point between the above-described operation (Sa) in step S200 and operation (Sb) in step S500 (Sd). As illustrated in the above-described step S301 and FIG. 14B, the second display screen enables the user to select whether the first target object is a target object to be cleaned (refer to FIG. 14B).

Subsequently, in the above-described operation (Sb) in step S500, when as illustrated in FIG. 14B, the second display screen is displayed on the display 417c or 417d, the control unit 70 receives the information as to whether the first target object is the target object to be cleaned. In this manner, the reception operation of setting of the cleaning target object is performed.

Modification 3

Figure 14E:
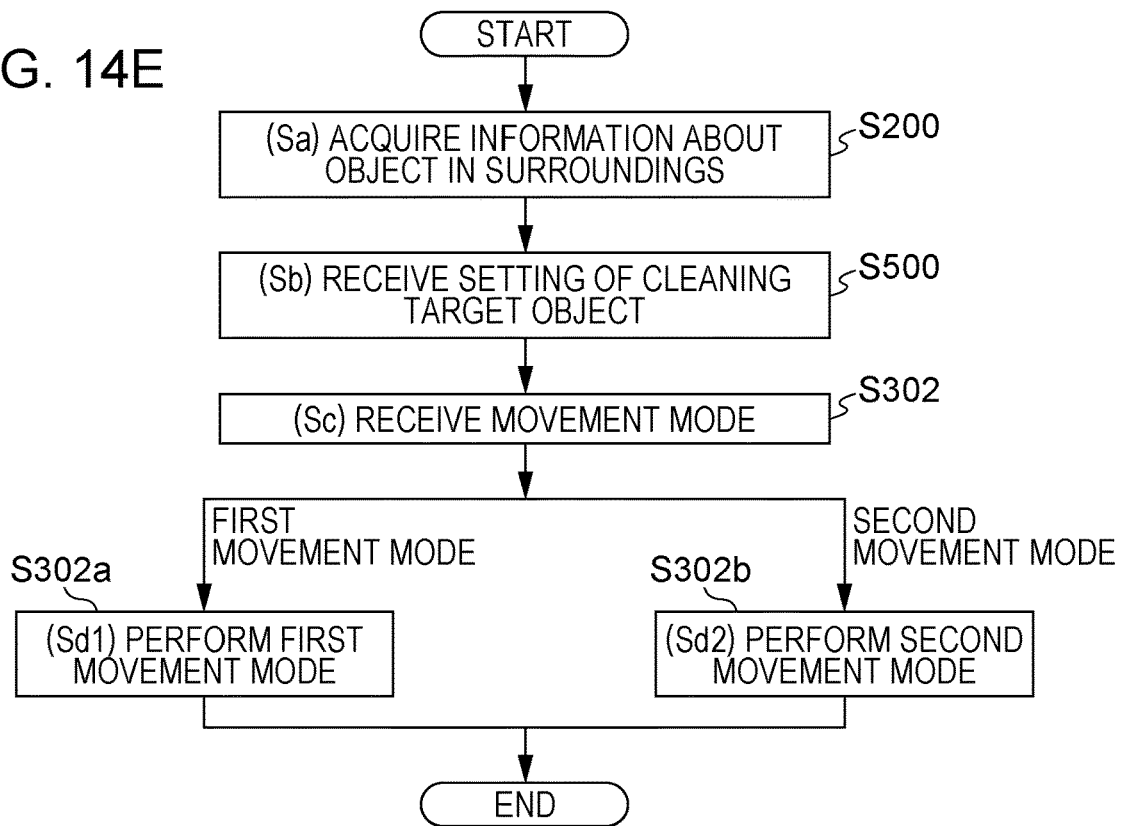
FIG. 14E is a flowchart illustrating the steps of a method for cleaning by the cleaner according to Modification 3 of Embodiment 1.
Figure 14F:
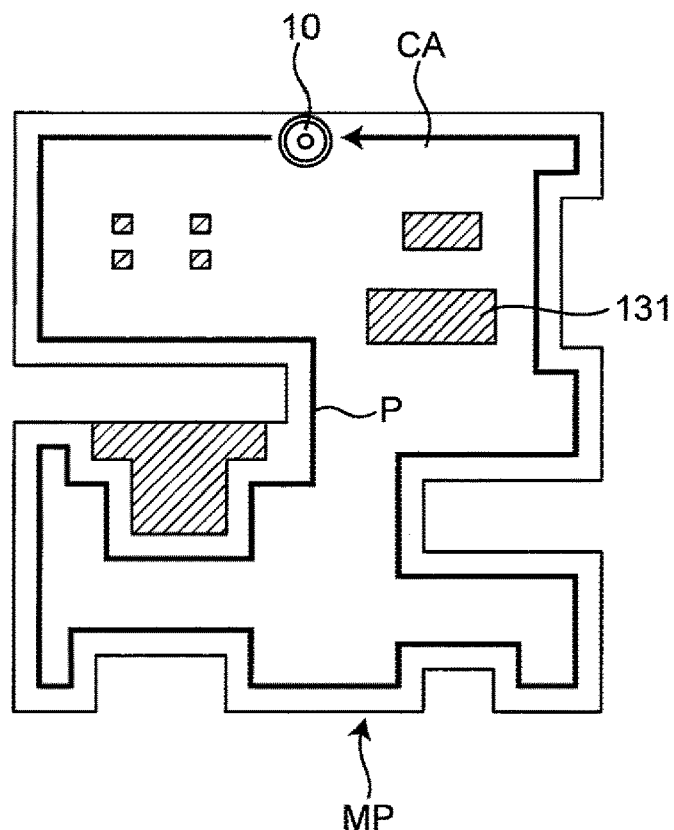
FIG. 14F illustrates a cleaning operation performed on the cleaning area illustrated in FIG. 9 along the frame shape movement path illustrated in FIG. 13B.
Figure 14G:
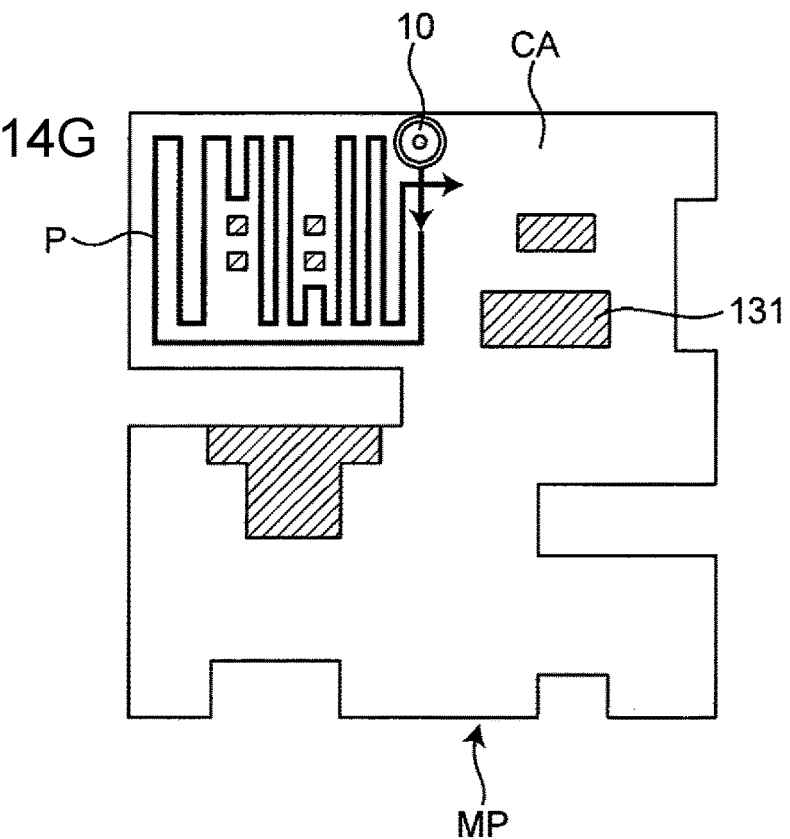
FIG. 14G illustrates a cleaning operation performed on the cleaning area illustrated in FIG. 9 along the random walk movement path illustrated in FIG. 13C.
Figure 14H:
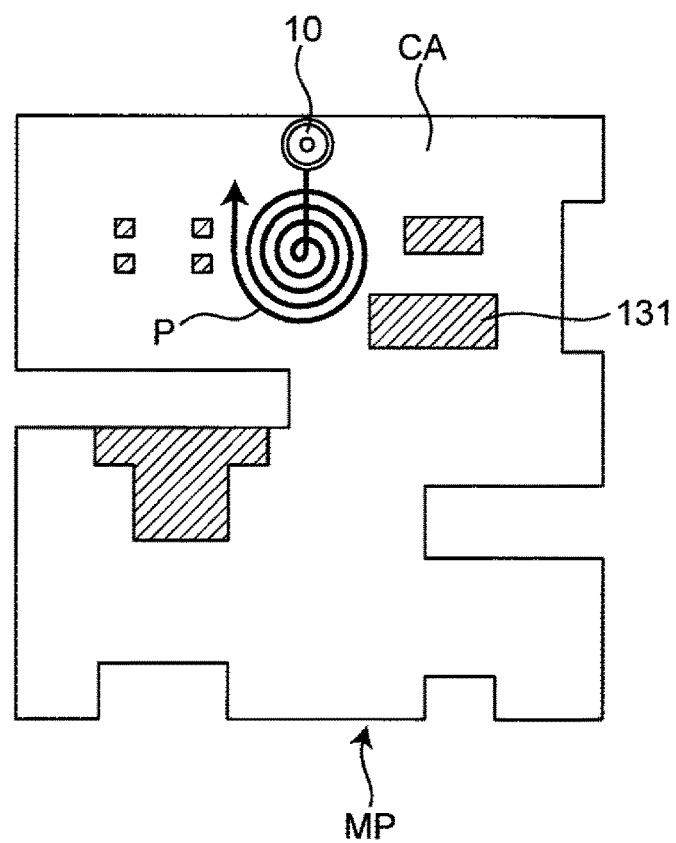
FIG. 14H illustrates a cleaning operation performed on the cleaning area illustrated in FIG. 9 along the spiral shape movement path illustrated in FIG. 13D.

According to Modification 3 of Embodiment 1, as illustrated in FIG. 14E, the following operation is performed.

That is, if the control unit 70 receives information indicating that the first movement mode is selected when the first display screen illustrated in FIG. 14D is displayed on the display 417c or 417d, the control unit 70 moves the cleaner main body 20 in the first movement mode under the control of the movement control unit 466 in step S302a (Sd1).

However, if the control unit 70 receives information indicating that the second movement mode is selected with the first display screen displayed on the display 417c or 417d as illustrated in FIG. 14D, the control unit 70 moves the cleaner main body 20 in the second movement mode in step S302b under the control of the movement control unit 466 (Sd2).

Modification 4 of Embodiment 1

Stuck State

Note that as illustrated in FIGS. 7A to 7C and FIGS. 8A and 8B, when cleaning the cleaning target object 133, the cleaner 10 may enter a stuck state during the movement operation performed in the above-described step S302a or S302b after the operation in step S302, depending on the cleaning target object 133. A movement control technique employed when the cleaner 10 enters a stuck state is described below.

Figure 15C:
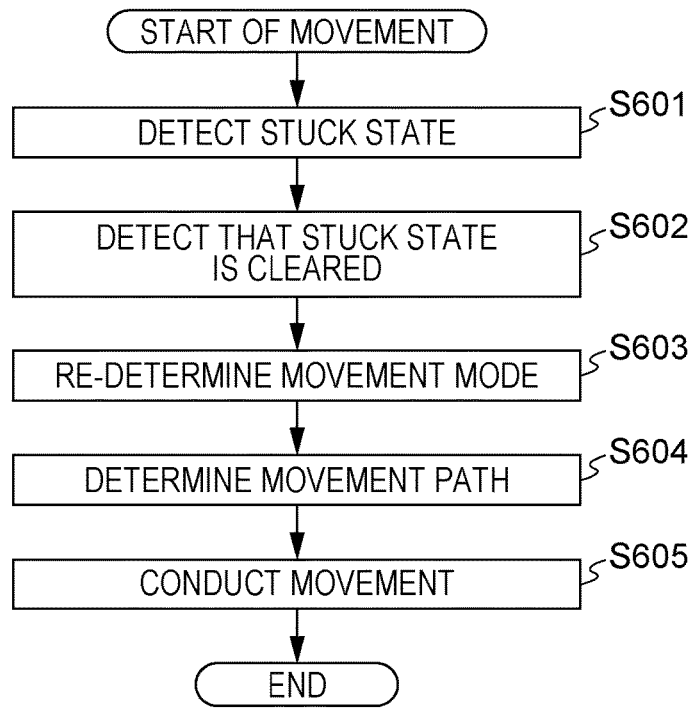
FIG. 15C is a flowchart of a method for controlling the movement of a cleaner when the cleaner enters a stuck state.

As illustrated in FIG. 15C, in such a case, the movement control technique employed by the control unit 70 includes the steps of:
  detecting the stuck state (step S601),
  detecting that the stuck state is cleared (step S602),
  re-determining the movement mode (step S603),
  determining the movement path (step S604), and
  performing movement (step S605).

Step S601

Detection of a stuck state by the control unit 70 in step S601 is described first.

The control unit 70 detects that the rotational frequency detected by the rotational frequency sensor 455 is zero or a value close to zero although the control unit 70 instructs the movement motor 31 to rotate. In this way, the control unit 70 can detect stoppage or near stoppage of the rotation of the movement motor 31. As described above, by detecting stoppage or near stoppage of the rotation of the movement motor 31 although the control unit 70 instructs the movement motor 31 to rotate, the control unit 70 can detect that the cleaner 10 enters a stuck state. Note that the rotational frequency sensor 455 functions as an example of the second sensor.

Figure 15D:
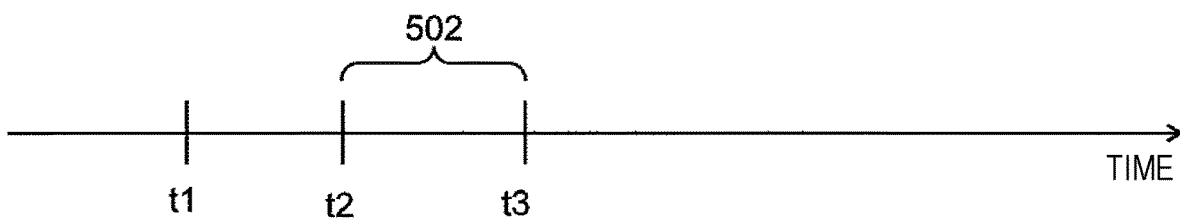
FIG. 15D illustrates the time course of cleaning when the cleaner enters a stuck state.

At this time, in FIG. 15D, the cleaner 10 moves closer to the carpet 131b, which is an example of the cleaning target object, at a time t1 (refer to FIGS. 7A and 11B). Subsequently, at a time t2, the cleaner 10 fails to climb the edge of the carpet 131b and enters a stuck state (refer to FIGS. 7B and 7C). Subsequently, suppose that the control unit 70 detects that the cleaner 10 is in a stuck state at time t3.

The control unit 70 acquires, by using the image processing unit 463, the images captured by the cameras a predetermined time (e.g., several seconds) before the time t3 at which the stuck state is detected (in this example, the images are captured at the time t1). In FIG. 15D, the predetermined time is indicated by reference numeral 502. The image captured by the camera at the time t1 should include the image of the cleaning target object that caused the cleaner 10 to enter the stuck state. That is, for example, as illustrated in FIG. 11B, the image captured by the camera at the time t1 includes the image of the carpet 131b located in front of the cleaner 10 at a position away from the cleaner 10 in the movement direction. In addition, at the time t2 between the time t1 and the time t3, as illustrated in FIGS. 7B and 7C, since the cleaner 10 fails to climb the edge of the carpet 131b and enters a stuck state, the image captured by the camera at the time t3 is almost the same as the image captured by the camera at the time t2.

The control unit 70 compares the images captured by the camera at the time t3 and at the time t1 with each other by using the image processing unit 463 and determines that the carpet 131b is the object to be cleaned that caused the cleaner main body 20 to enter the stuck state. Thereafter, the control unit 70 identifies the position and the shape of the carpet 131b. That is, the control unit 70 acquires the information about the first target object on the basis of the information about the stuck state of the cleaner main body 20 detected by the rotational frequency sensor 455. The acquired information about the first target object can be recorded in the memory 461 or a recording unit (not illustrated) and, thereafter, can be read out and used as needed.

Step S602

Detection of clearance of the stuck state performed by the control unit 70 in step S602 is described below. If the cleaner 10 is unable to move due to the carpet 131b, the user lifts the cleaner 10 from the carpet 131b and places the cleaner 10 at a different position, for example. At this time, when the cleaner 10 is lifted from the carpet 131*b* or the floor surface 132, a wheel lift detection switch 75 of the cleaner 10 operates and, thus, the cleaner 10 stops moving.

More specifically, as illustrated in FIG. 2, the wheel lift detection switch 75 is attached to the upper portion of a wheel house of each of the wheels 33. The wheel lift detection switch 75 constitutes a part of the sensor unit 426. The wheel lift detection switch 75 is pushed in by a spring hooking portion (not illustrated) if the drive unit 30 is lifted from the floor surface 132. The spring hooking portion detects that the wheel 33 is normally being urged by the urging force of the spring toward the floor surface 132 by using the wheel lift detection switch 75. Therefore, if the spring hooking portion detects the absence of a repulsive force against the urging force of the spring by using the wheel lift detection switch 75, the spring hooking portion detects that the wheel 33 of the cleaner 10 is lifted or someone lifts the cleaner 10. Thus, the wheel lift detection switch 75 outputs a signal to the control unit 70. The control unit 70 stops the movement of the cleaner 10 on the basis of the signal. At this time, upon receiving the signal, the control unit 70 detects that the stuck state of the cleaner main body 20 has been cleared.

Step S603

Subsequently, in the re-determination of the movement mode made by the control unit 70 in step S603, as indicated by the display screen of the display 417*c* in FIG. 15E, the user is prompted to select when to clean up the cleaning target object 133 which caused the cleaner 10 to enter the stuck state. Thereafter, the control unit 70 receives the selection instruction from the user. That is, the control unit 70 prompts the user to select one of the two options "A: the cleaning target object 133 is cleaned first again" and "B: the cleaning target object 133 is cleaned last" and receives a selection instruction from the user.

If, in FIG. 15E, "A" is selected and, thus, the cleaning target object 133 is to be cleaned first again, the operation in the second movement mode recorded in the memory 461 is performed again. However, if, in FIG. 15E, "B" is selected and, thus, the cleaning target object 133 is to be cleaned last, the operation in the first movement mode recorded in the memory 461 is performed.

Note that in the re-determination of the movement mode in step S603, the control unit 70 may automatically select the second movement mode without prompting the user to make selection and receiving the selection instruction. Thus, the cleaning target object 133 may be cleaned first again (not illustrated).

As is described below with reference to FIG. 16A, if the cleaner 10 moves in the second movement mode and, then, enters a stuck state, the control unit 70 may automatically select the first movement mode and clean up the cleaning target object 133 last again.

In the re-determination of the movement mode made in step S603, the following operations can be further performed.

That is, when cleaning the cleaning target object 133 that caused the cleaner 10 to enter the stuck state once again, it is highly likely that the cleaner 10 enters the stuck state again if the cleaner 10 cleans the cleaning target object 133 at the same speed and in the same direction. Accordingly, the control unit 70 sets an operation control mode in which at least one of an increase in the moving speed, a change in the entry angle into the edge of the cleaning target object 133 (for example, 45 degrees), and stoppage of the rotation of the side brushes 44 is selected to change the operation performed by the cleaner 10. FIG. 16B illustrates an example of the operation control modes each applied at the same time as the first movement mode or the second movement mode is applied.

Figure 7D:
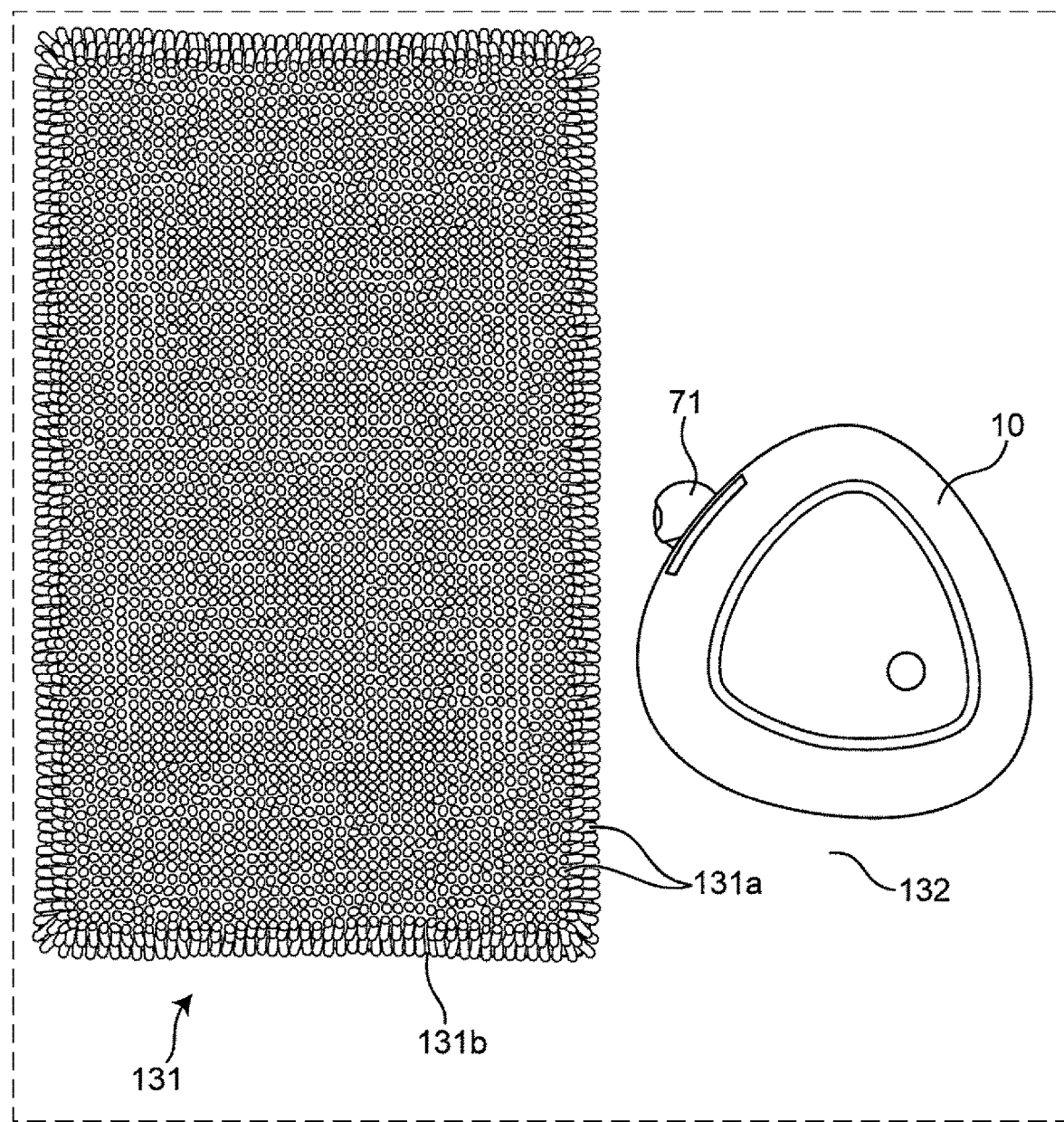
FIG. 7D is a plan view illustrating a state where the cleaner moves in a direction diagonal to the edge of the target object illustrated in FIG. 7A in order to avoid a stuck state.
Figure 7E:
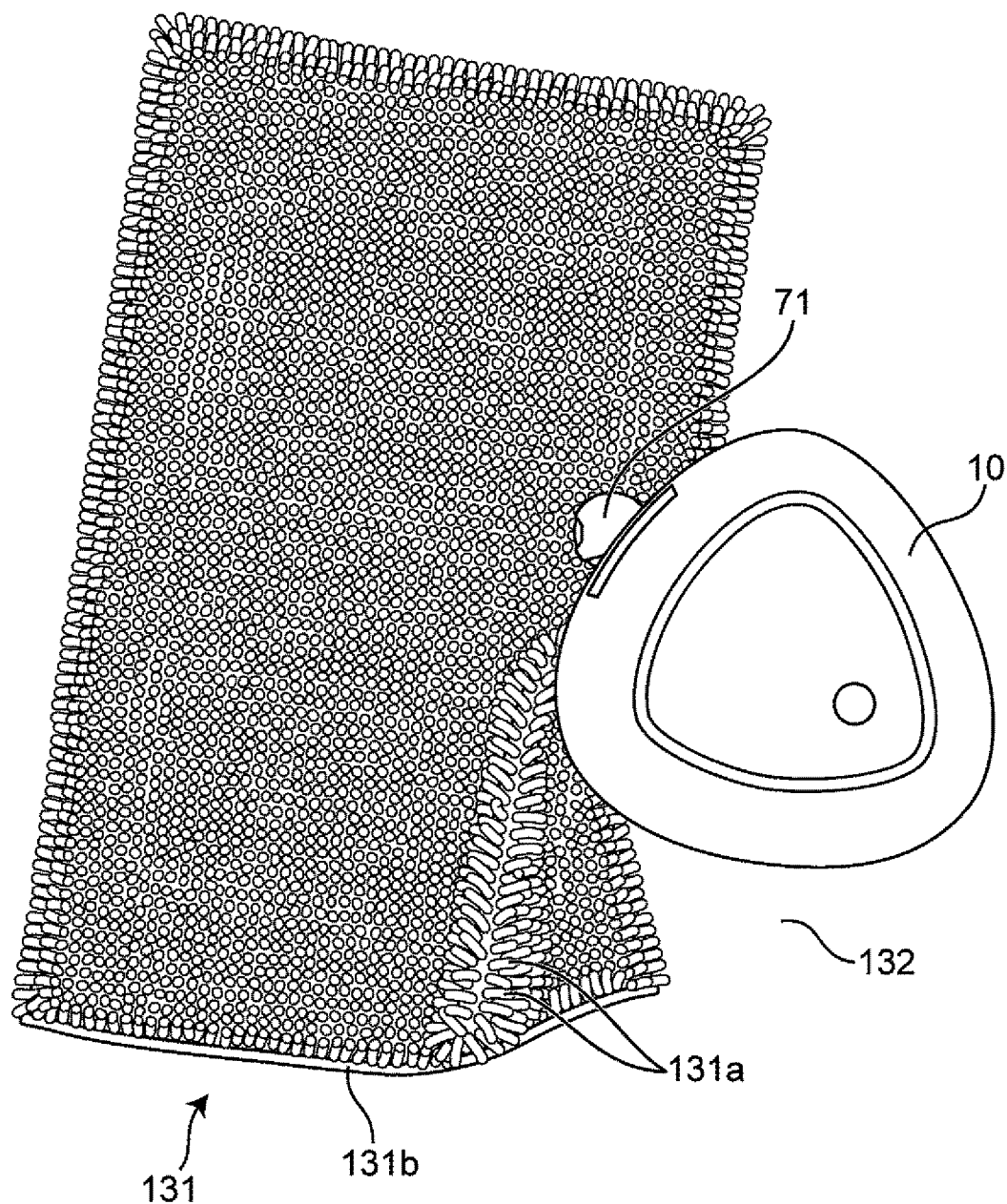
FIG. 7E is a plan view illustrating a state where the cleaner climbs the edge of the target object and moves after the state illustrated in FIG. 7D.

That is, if, for example, the moving speed is set to the moving speed "High" which is higher than the moving speed "Medium" used for normal cleaning, the cleaner 10 is occasionally able to climb the edge of the cleaning target object 133 due to the momentum and, thus, does not enter a stuck state at the edge of the cleaning target object 133. In addition, if the entry angle of the cleaner 10 into the edge of the cleaning target object 133 is changed from 90 degrees, which is a normal angle, to 30 or 60 degrees (that is, if the cleaner 10 climbs the edge in the diagonal direction), the cleaner 10 is occasionally able to climb the edge of the cleaning target object 133, as illustrated in FIGS. 7D and 7E and FIG. 8C. Furthermore, by stopping the rotation of the side brushes 44, the cleaner 10 is occasionally able to climb the edge of the cleaning target object 133 because the side brush 44 does not get entangled with the pile 131*a* of the carpet 131*b*.

The control unit 70 may automatically select one of the operation control modes illustrated in FIG. 16B. Alternatively, like the selection of one of the first movement mode and the second movement mode, the control unit 70 may display the candidates of the operation control mode on the display 417*c* or 417*d* and, thereafter, receive the selection instruction from the user.

Figure 16A:
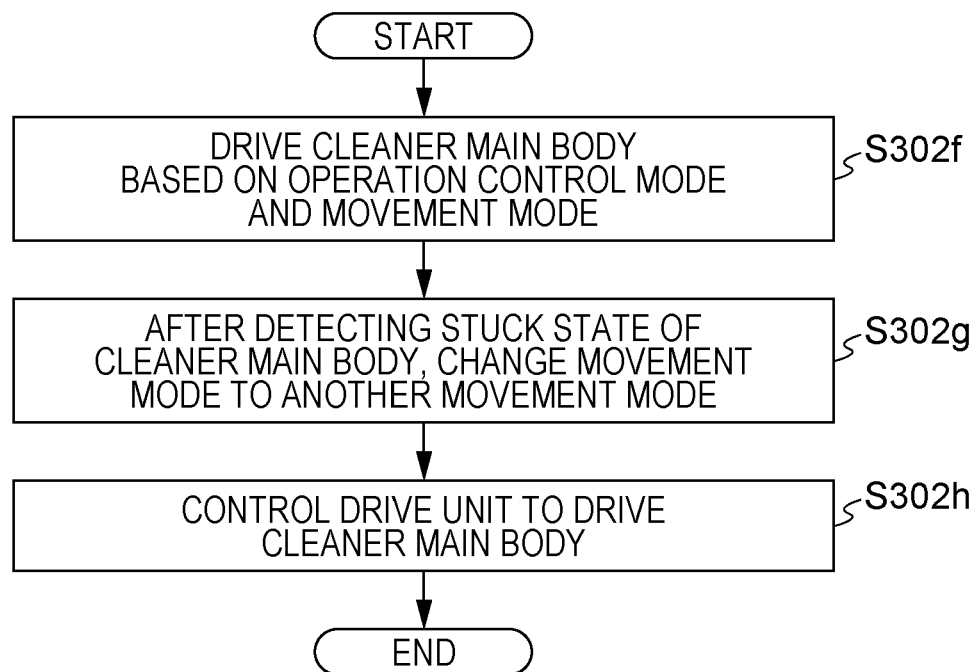
FIG. 16A is a flowchart illustrating an example of the processes performed in step S302f and subsequent steps of the method for cleaning by the cleaner.
Figure 16C:
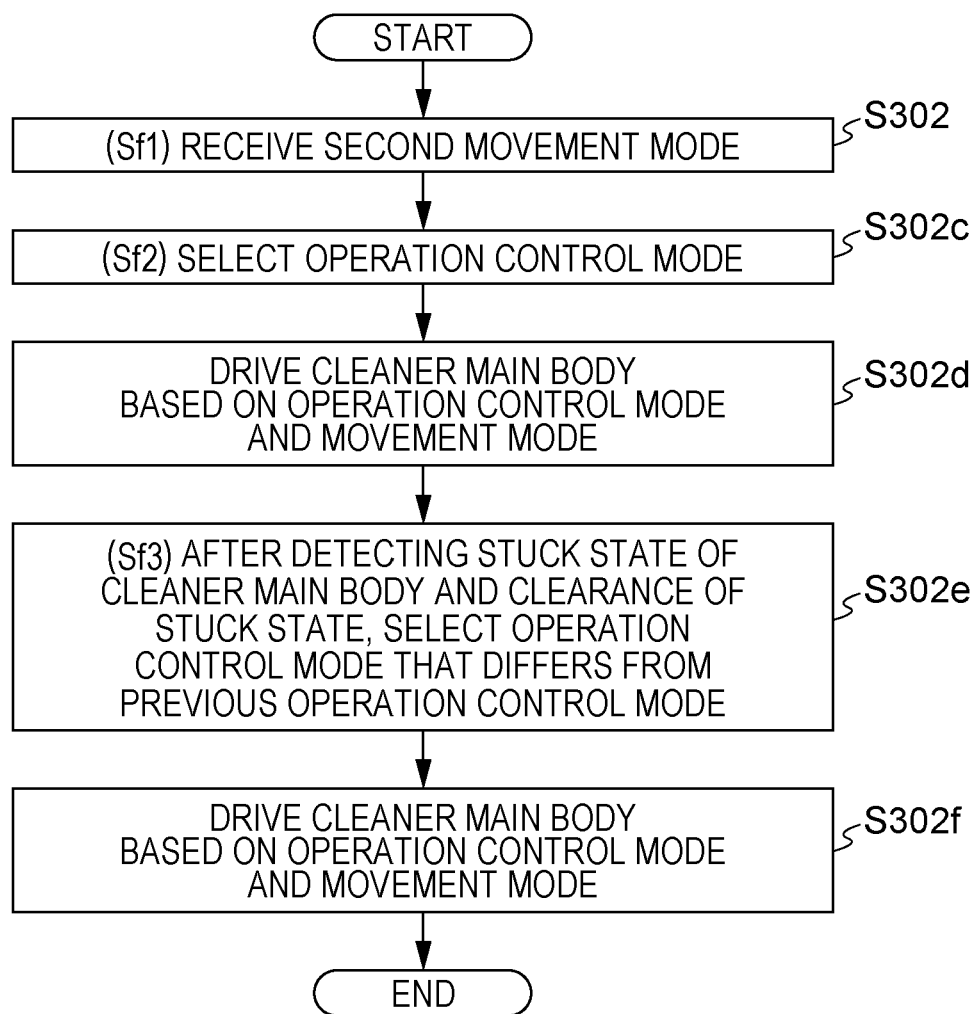
FIG. 16C is a flowchart illustrating another example of the processes performed in step S302f and subsequent steps of the method for cleaning by the cleaner.

In addition, as illustrated in FIG. 16C, the following operations can be performed after step S302 of the above-described operation:

receiving selection of the second movement mode when the first display screen is being displayed in step S302 (Sf1), selecting, as a first operation control mode, any one of the operation control modes by using the control unit 70 in step S302*c* (Sf2), controlling, by using the movement control unit 466, the drive unit 30 to drive the cleaner main body 20 on the basis of the first operation control mode and the second movement mode in step S302*d*, selecting, from among the operation control modes, one that differs from the first operation control mode as a second operation control mode by using the control unit 70 if the stuck state of the cleaner main body 20 is detected by the rotational frequency sensor 455 and, subsequently, clearance of the stuck state of the cleaner main body 20 is detected by the wheel lift detection switch 75 in step S302*e* (Sf3), and controlling, by using the movement control unit 466, the drive unit 30 to drive the cleaner main body 20 on the basis of the second operation control mode and the second movement mode in step S302*f*.

Note that the second operation control mode provides the moving speed, the movement direction, or the presence/absence of the rotation of the side brush of the cleaner main body 20 which differs from that in the first operation control mode.

In addition, as illustrated in FIG. 16A, the following operations can be performed after step S302*f* of the above-described operation:

driving the cleaner main body 20 on the basis of the second operation control mode and the second movement mode in step S302*f* (Sf4), changing the second movement mode to the first movement mode by using the control unit 70 if the stuck state of the cleaner main body 20 is detected by the rotational frequency sensor 455 in step S302*g*, and controlling the drive unit to drive the cleaner main body 20 in step S302*h*.

Step S604

Subsequently, the determination of the movement path is made by the control unit 70 in step S604 in the same manner as in step S300.

Step S605

Subsequently, the movement by the control unit 70 in step S605 is conducted in the same manner as in step S400.

Minimum Required Steps

While the movement control method used for the overall movement operation of the cleaner 10 and the movement control method used when the cleaner 10 enters a stuck state have been described above, all of the described steps are not needed for Embodiment 1. A step (step S700) having the minimum configuration required for the method for cleaning by the cleaner 10 according to Embodiment 1 is described below with reference to FIG. 16D.

Step S700 of the method for cleaning by the cleaner 10 includes operations in at least the following steps S701, S702, S713, S714, and S715.

In step S701, as in step S601, the control unit 70 identifies the first target object that caused the cleaner 10 to be unable to move (a). That is, for example, as described in step S601, the control unit 70 detects that the cleaner 10 has entered a stuck state by detecting stoppage or near stoppage of the rotation of the movement motor 31. At this time, the control unit 70 assumes that an object present in front of the cleaner 10 in the image captured by the camera a predetermined time (e.g., several seconds) before the time at which the stuck state is detected is the first target object. Thereafter, the control unit 70 acquires the information about the first target object, such as the shape and the position of the first target object. The acquired information about the first target object is stored in the memory 461 or a recording unit (not illustrated). In this way, the control unit 70 can read out and use the information as needed.

Subsequently, in step S702, as in step S301, the control unit 70 receives information as to whether the first target object is a target object to be cleaned even after the cleaner 10 climbs the target object (b). That is, as described in step S301, the control unit 70 displays the acquired information about the first target object in a display screen of the display 417c (refer to FIG. 14B) and prompts the user to select whether the first target object detected by the image processing unit 463 is a cleaning target object. In this way, the control unit 70 receives the selection instruction from the user.

If, in step S702, the user presses the "NO" button in FIG. 14B to clean the first target object and, thereafter, the control unit 70 has received information indicating that the first target object is not a cleaning target object, the control unit 70 sets a mode for cleaning an area other than the first target object and ends the process flow in step S700. Thereafter, the control unit 70 performs a widely known cleaning reservation operation or a cleaning start operation.

However, if, in step S702, the user presses the "YES" button in FIG. 14B to clean the first target object and, thereafter, the control unit 70 has received information indicating that the first target object is a cleaning target object, the control unit 70 performs a person detecting operation in step S713 and, thereafter, performs a cleaning operation in steps S714 and S715.

Step S713

The person detecting operation is performed by the third sensor. More specifically, an image including the shape of a pair of legs 233 of a person is used for the information detected by the obstacle detection sensor 71 or the image captured by the two cameras 92. For example, when using an image, the image processing unit 463 (described below) and the like determines whether the shape of a pair of legs 233 of the person (refer to reference numeral 233 in FIG. 11C, for example) can be detected by pattern matching. The image processing unit 463 performs pattern matching by calculating the similarity between a reference image and the image captured by the cameras 92. The reference image includes the image information regarding the person. The image information of the person includes the image of the entire body of the person or the image of part of the body of the person. In this example, the image information regarding the person is the image of the pair of legs 233 of the person.

If the image processing unit 463 determines that the shape of the pair of legs 233 of the person is not detected, the processing proceeds to step S714. However, if the image processing unit 463 determines that the shape of the pair of legs 233 of the person is detected, the processing proceeds to step S715.

Step S714

If the pair of legs 233 of the person is not detected and, thus, a person is not detected, the control unit 70 performs control in a first mode. In the first mode, the cleaning area CA excluding the first target object is cleaned first and, thereafter, the first target object is climbed and cleaned. More specifically, as indicated by steps S302, S303, and S400, the movement control unit 466 of the control unit 70 controls the drive unit 30. The drive unit 30 moves the cleaner main body 20 under the control of the movement control unit 466 in order to perform a cleaning operation in the first mode in which the cleaner main body 20 cleans the cleaning area CA excluding the first target object and, thereafter, climbs and cleans the first target object 133. Note that in step S400, the cleaning job is started at the initial position (that is, the position at which the cleaner 10 is located at the setting time of the cleaning reservation or at the start time of cleaning). However, the start position is not limited thereto. The cleaning job may be started at the reference position.

Step S715

If the pair of legs 233 of the person is detected and, thus, a person is detected, the control unit 70 immediately starts cleaning. That is, the control unit 70 performs control in a second mode. In the second mode, the first target object is climbed and cleaned first and, thereafter, the cleaning area CA excluding the first target object is cleaned. More specifically, as indicated by steps S302, S303, and S400, the movement control unit 466 of the control unit 70 controls the drive unit 30. The drive unit 30 moves the cleaner main body 20 in order to perform a cleaning operation in the second mode in which the cleaner main body 20 climbs and cleans the first target object first and, thereafter, cleans the cleaning area CA excluding the first target object. Note that in step S400, the cleaning job is started at the initial position (that is, the position at which the cleaner 10 is located at the setting time of the cleaning reservation or at the start time of cleaning). However, the start position is not limited thereto. The cleaning job may be started at the reference position.

As described above, the reason why a cleaning job is performed in the first mode when a person is not detected is that it is highly likely that the user is not present in the vicinity of the cleaner 10 when a person is not detected. Consequently, it is highly likely that the cleaner 10 cannot escape the stuck state even when the cleaner 10 becomes unable to move due to the first target object, since the user is not around. For this reason, a cleaning path is designed such that the first target object that might make the cleaner 10 unable to move is cleaned last. That is, in the first mode, even when the cleaner 10 enters the stuck state, the cleaning area CA excluding the first target object is already cleaned. Accordingly, most of the cleaning area CA has already been cleaned. However, when a person is not detected and if the first target object is cleaned first and, then, the cleaner 10 enters the stuck state, most of the cleaning area CA has not been cleaned.

In contrast, the reason why a cleaning job is performed in the second mode when a person is detected is that it is highly likely that the user is present in the vicinity of the cleaner 10 since a person is detected. Consequently, it is highly likely that even if the cleaner 10 becomes unable to move due to the first target object, the cleaner 10 can escape the stuck state since the user is around. For this reason, the first target object that might make the cleaner 10 unable to move is cleaned first.

As described above, according to the above-described embodiment, the movement mode can be automatically generated while taking into account the order in which a target object that may make the cleaner 10 unable to move and the other target objects are cleaned, and the generated movement mode can be provided to the user.

While the present disclosure has been described with reference to the above embodiments and modifications, it should be noted that the present disclosure is not limited to the above embodiments and modifications. The configurations described below are also encompassed within the scope of the present disclosure. Note that in the example of step S601, the control unit 70 detects that the cleaner 10 enters a stuck state by detecting stoppage or near stoppage of the rotation of the movement motor 31 although the control unit 70 instructs the movement motor 31 to rotate. Alternatively, if the control unit 70 detects that the movement motor 31 is rotating and if the obstacle detection sensors 71 or the ranging sensors 72 detect that the distance between the target object 131 and the cleaner main body 20 has not changed, the control unit 70 may detect that the cleaner 10 has entered a stuck state. For example, this situation corresponds to an example of the stuck state that meets Condition (2) illustrated in FIGS. 8A and 8B.

Figure 17A:
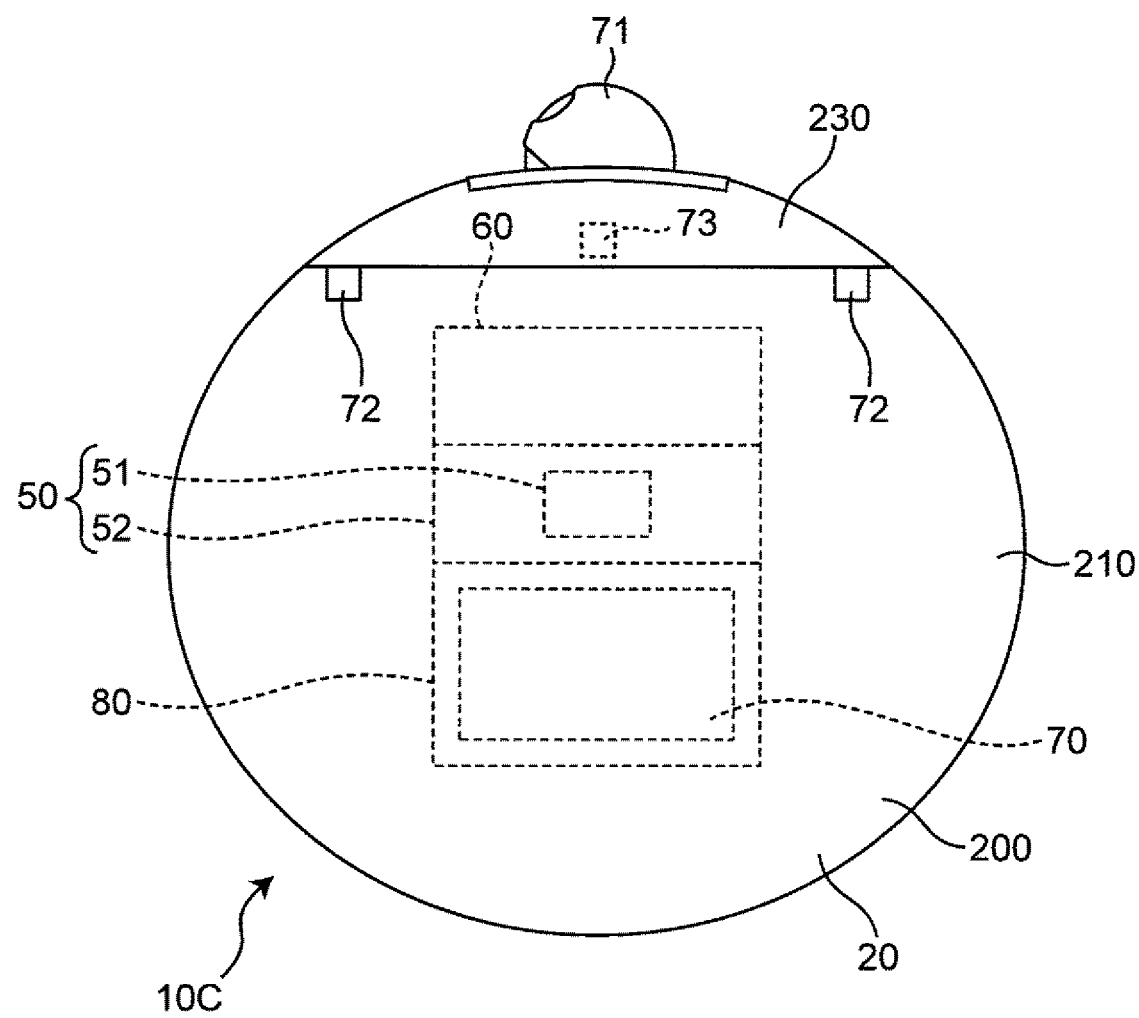
FIG. 17A is a plan view of a self-driving cleaner of a circular shape according to the present disclosure.
Figure 17B:
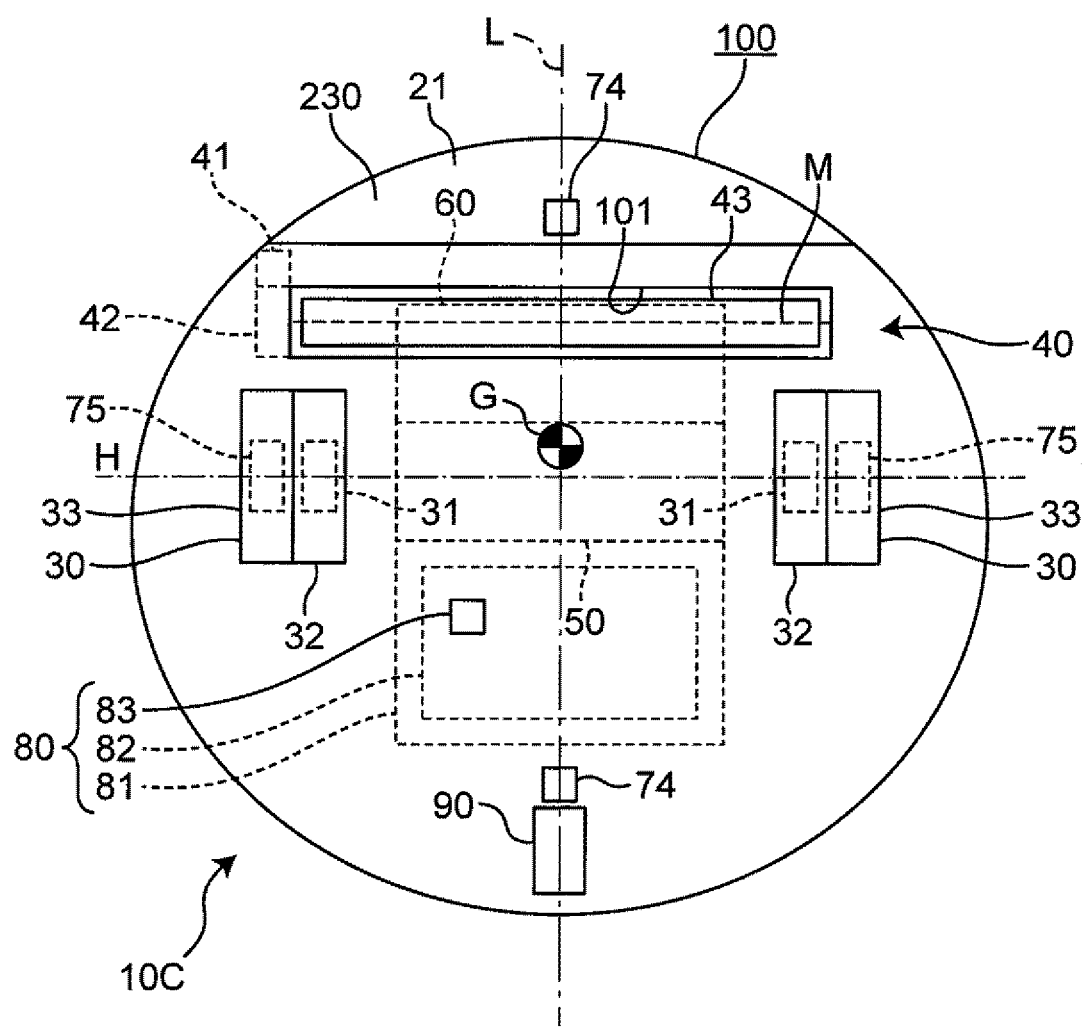
FIG. 17B is a bottom view of the cleaner illustrated in FIG. 17A.

According to the embodiment or the modification of the present disclosure, the shape of the cleaner 10 is not limited to a Reuleaux triangular or polygonal planar shape. For example, as illustrated in FIGS. 17A and 17B, the cleaner 10 may be a cleaner 10C having a circular planar shape. The person detecting operation in step S713 may be performed at a point in time predetermined by the user. For example, the user may instruct the cleaner 10 to start a person detecting operation in step S713 at a particular date and time (for example, 10:00 am on Dec. 1, 2018) by using a smartphone 147 or a PC 147. The memory 461 may store the predetermined point in time. The control unit 70 may perform a person detecting operation at the predetermined point in time. The point in time predetermined by the user need not be a point in time immediately after detection of the stuck state. For example, information that is used for detection of a person may be updated at a predetermined point in time. For example, when a person is detected on the basis of an image, the image may be newly captured at a predetermined point in time. For example, if a home appliance (e.g., an air conditioner) having a capability of detecting the presence of a person on the basis of an infrared image generated by using an infrared sensor is present in the space where the cleaner 10 is located, the cleaner 10 may instruct the home appliance to detect the presence/absence of a person at a predetermined point in time and immediately send the result. In this way, the cleaner 10 can acquire the result of detection of the presence/absence of a person based on the infrared image captured at the predetermined point in time.

Note that part or the entirety of the control unit is a computer system including a microprocessor, a ROM, a RAM, a hard disk unit, a display unit, a keyboard, a mouse, and the like. The RAM or the hard disk unit stores a computer program. The microprocessor operates in accordance with the computer program, so that each of the units achieves its function. Note that the computer program is formed by combining instruction codes representing instructions to the computer in order to achieve a predetermined function.

For example, a program execution unit, such as a CPU, reads and executes a software program recorded on a recording medium, such as a hard disk or a semiconductor memory, so that each of the constituent elements is achieved. Note that according to the embodiment or the modification, the software that provides some or all of the elements constituting the control unit is the following program. That is, the program is a program for use in a self-driving cleaner that autonomously moves in a predetermined space and cleans the predetermined space. The self-driving cleaner includes a cleaner main body having a suction port in a bottom surface, a suction unit disposed in the cleaner main body, a drive unit that is disposed in the cleaner main body and that drives movement of the cleaner main body, a control circuit that is disposed in the cleaner main body and that controls the suction unit and the drive unit, a camera that is disposed in the cleaner main body and that captures an image including surrounding information in front of the cleaner main body, a first sensor that is disposed in the cleaner main body and that detects an object, a second sensor that detects a state in which the cleaner main body is unable to move, and a third sensor that detects a person. The program causes a computer to perform the steps of:

(a) upon detecting by the second sensor the state in which the cleaner main body is unable to move, identifying by the control circuit a first target object that caused the cleaner main body to enter the state in which the cleaner main body is unable to move, by using the image captured by the camera or information about the object detected by the first sensor, (b) after the step (a), receiving by the control circuit information as to whether the first target object is a target object to be climbed, and (c) when receiving in the step (b) by the control circuit the information indicating that the first target object is a target object to be climbed and when cleaning the predetermined space, controlling the drive unit to move the cleaner main body in a first mode in which the predetermined space excluding the first target object is cleaned first and thereafter the first target object is climbed if the third sensor does not detect the person and controlling the drive unit to move the cleaner main body in a second mode in which the first target object is climbed first and thereafter the predetermined space excluding the first target object is cleaned if the third sensor detects the person.

Furthermore, the program may be executed after being downloaded from a server or the like. Alternatively, the program may be stored in a predetermined recording medium (for example, an optical disk, such as a CD-ROM, a magnetic disk, or a semiconductor memory) and may be read out from the recording medium. In this manner, the program may be executed.

In addition, a single computer or multiple computers may execute the program. That is, centralized processing or distributed processing may be performed.

It is to be noted that by combining the above-described various embodiments and modifications in any way, the effects of the combined embodiments and modifications can be provided. In addition, the embodiments can be combined with one another, the examples can be combined with one another, and the embodiment can be combined with the example. Furthermore, the features of different embodiments or different examples can be combined with one another.

The self-driving cleaner, the method for cleaning by a self-driving cleaner, and the program for the self-driving cleaner according to the present disclosure are applicable to a home use self-driving cleaner or a business use self-driving cleaner. In addition, the self-driving cleaner, the method for cleaning by a self-driving cleaner, and the program for the self-driving cleaner according to the present disclosure are applicable to those used in various kinds of environments.

What is claimed is:

1. A self-driving cleaner configured to autonomously move in a predetermined space, the self-driving cleaner comprising:
   a cleaner main body having a suction port in a bottom surface;
   a suction unit that is disposed in the cleaner main body configured to suck dust and dirt, wherein the suction unit includes an electric fan disposed in a fan case;
   a motor that is disposed in the cleaner main body, the motor being configured to drive movement of the cleaner main body;
   a control circuit that is disposed in the cleaner main body, the control circuit being configured to control the suction unit and the motor;
   a camera that is disposed in the cleaner main body, the camera being configured to capture an image including surrounding information in front of the cleaner main body;
   a first sensor that is disposed in the cleaner main body, the first sensor being configured to detect an object;
   a second sensor that is configured to detect a state in which the cleaner main body is unable to move; and
   a third sensor,
   wherein:
   (a) upon detecting, by the second sensor, the state in which the cleaner main body is unable to move, the control circuit is configured to identify a first target object that caused the cleaner main body to enter the state in which the cleaner main body is unable to move, by using the image captured by the camera or information about the object detected by the first sensor, wherein the predetermined space includes a first space which is occupied by the first target object and a second space which is not occupied by the first target object, the first space and the second space having no common space and a location of the first space being unchanged;
   (b) after identifying the first target object in (a), the control circuit is configured to receive information as to whether the first target object is a target object to be climbed,
   (c) when receiving in (b) the information indicating that the first target object is a target object to be climbed and when the self-driving cleaner cleans the predetermined space, the control circuit is configured to determine, for controlling the motor to move the cleaner main body, (i) a first mode in which the self-driving cleaner is configured to clean the second space before the first space, or (ii) a second mode in which the self-driving cleaner is configured to clean the first space before the second space;
   the control circuit is configured to take the first mode when the third sensor detects a person; and
   the control circuit is configured to take the second mode when the third sensor does not detect the person.

2. The self-driving cleaner according to claim 1, further comprising:
   a display,
   wherein:
   (d) the control circuit is configured to cause the display to display, between (a) and (b), a first display screen in which whether or not the first target object is a target object to be cleaned is selected; and
   while the first display screen is being displayed, the control circuit is configured to receive in (b) information as to whether the first target object is a target object to be cleaned.

3. A method for cleaning by a self-driving cleaner that autonomously moves in a predetermined space and cleans the predetermined space, the self-driving cleaner including a cleaner main body having a suction port in a bottom surface, a suction unit disposed in the cleaner main body configured to suck dust and dirt, wherein the suction unit includes an electric fan disposed in a fan case, a motor that is disposed in the cleaner main body and that drives movement of the cleaner main body, a control circuit that is disposed in the cleaner main body and that controls the suction unit and the motor, a camera that is disposed in the cleaner main body and that captures an image including surrounding information in front of the cleaner main body, a first sensor that is disposed in the cleaner main body and that detects an object, a second sensor that detects a state in which the cleaner main body is unable to move, and a third sensor, the method comprising:
   (a) upon detecting, by the second sensor, the state in which the cleaner main body is unable to move, identifying, by the control circuit, a first target object that caused the cleaner main body to enter the state in which the cleaner main body is unable to move, by using the image captured by the camera or information about the object detected by the first sensor, wherein the predetermined space includes a first space which is occupied by the first target object and a second space which is not occupied by the first target object, the first space and the second space having no common space and a location of the first space being unchanged;
   (b) after the identifying the first target object in (a), receiving, by the control circuit, information as to whether the first target object is a target object to be climbed; and
   (c) when receiving in (b), by the control circuit, the information indicating that the first target object is a target object to be climbed and when the self-driving cleaner cleans the predetermined space, determining, by the control circuit for controlling the motor to move the cleaner main body, (i) a first mode in which the self-driving cleaner cleans the second space before the first space, or (ii) a second mode in which the self-driving cleaner cleans the first space before the second space, wherein:
when the third sensor detects a person, the control circuit takes the first mode; and
when the third sensor does not detect the person, the control circuit takes the second mode.

4. The method according to claim 3, wherein:
the self-driving cleaner further includes a display; and
the method further comprises:
(d) causing, by the control circuit, the display to display, between (a) and (b), a first display screen in which whether or not the first target object is a target object to be cleaned is selected, and receiving in (b), by the control circuit, information as to whether the first target object is a target object to be cleaned while the first display screen is being displayed.

5. A non-transitory computer-readable recording medium storing a program that causes a computer to perform a method for cleaning by a self-driving cleaner that autonomously moves in a predetermined space and cleans the predetermined space, the self-driving cleaner including a cleaner main body having a suction port in a bottom surface, a suction unit disposed in the cleaner main body configured to suck dust and dirt, wherein the suction unit includes an electric fan disposed in a fan case, a motor that is disposed in the cleaner main body and that drives movement of the cleaner main body, a control circuit that is disposed in the cleaner main body and that controls the suction unit and the motor, a camera that is disposed in the cleaner main body and that captures an image including surrounding information in front of the cleaner main body, a first sensor that is disposed in the cleaner main body and that detects an object, a second sensor that detects a state in which the cleaner main body is unable to move, and a third sensor, the method comprising:

(a) upon detecting, by the second sensor, the state in which the cleaner main body is unable to move, identifying, by the control circuit, a first target object that caused the cleaner main body to enter the state in which the cleaner main body is unable to move, by using the image captured by the camera or information about the object detected by the first sensor,
wherein the predetermined space includes a first space which is occupied by the first target object and a second space which is not occupied by the first target object, the first space and the second space having no common space and a location of the first space being unchanged;
(b) after the identifying the first target object in (a), receiving, by the control circuit, information as to whether the first target object is a target object to be climbed; and
(c) when receiving in (b), by the control circuit, the information indicating that the first target object is a target object to be climbed and when the self-driving cleaner cleans the predetermined space, determining, by the control circuit for controlling the motor to move the cleaner main body, (i) a first mode in which the self-driving cleaner cleans the second space before the first space, or (ii) a second mode in which the self-driving cleaner cleans the first space before the second space,
wherein:
when the third sensor detects a person, the control circuit takes the first mode; and
when the third sensor does not detect the person, the control circuit takes the second mode.

\* \* \* \* \*

UNITED STATES PATENT AND TRADEMARK OFFICE
CERTIFICATE OF CORRECTION

Page 1 of 1

PATENT NO. : 11,224,325 B2
APPLICATION NO. : 16/359459
DATED : January 18, 2022
INVENTOR(S) : Yuki Takaoka et al.

It is certified that error appears in the above-identified patent and that said Letters Patent is hereby corrected as shown below:

On the Title Page

Add item (30):
--(30) Foreign Application Priority Data
Mar. 29, 2018 (JP) ..................................... JP2018-065733--.

Signed and Sealed this
Nineteenth Day of April, 2022

Katherine Kelly Vidal
*Director of the United States Patent and Trademark Office*